(12) United States Patent
Mak et al.

(10) Patent No.: US 12,215,922 B2
(45) Date of Patent: *Feb. 4, 2025

(54) INTEGRATED HEAVY HYDROCARBON AND BTEX REMOVAL IN LNG LIQUEFACTION FOR LEAN GASES

(71) Applicant: Fluor Technologies Corporation, Sugar Land, TX (US)

(72) Inventors: John Mak, Santa Ana, CA (US); Jacob Thomas, Sugar Land, TX (US); Dhirav Patel, Sugar Land, TX (US); Curt Graham, Mission Viejo, CA (US); Irene Zhang, Sugar Land, TX (US)

(73) Assignee: Fluor Technologies Corporation, Sugar Land, TX (US)

( * ) Notice: Subject to any disclaimer, the term of this patent is extended or adjusted under 35 U.S.C. 154(b) by 1512 days.

This patent is subject to a terminal disclaimer.

(21) Appl. No.: 16/421,138

(22) Filed: May 23, 2019

(65) Prior Publication Data
US 2020/0370824 A1 Nov. 26, 2020

(51) Int. Cl.
F25J 3/00 (2006.01)
F25J 3/02 (2006.01)

(52) U.S. Cl.
CPC .......... *F25J 3/0209* (2013.01); *F25J 3/0242* (2013.01); *F25J 2205/04* (2013.01);
(Continued)

(58) Field of Classification Search
CPC ........ F25J 3/0209; F25J 3/0233; F25J 3/0238; F25J 3/0242; F25J 3/0247; F25J 1/0216; F25J 2215/62
See application file for complete search history.

(56) References Cited

U.S. PATENT DOCUMENTS

| 33,408 A | 10/1891 | Turner et al. |
| 2,603,310 A | 7/1952 | Gilmore |

(Continued)

FOREIGN PATENT DOCUMENTS

| AR | 0103703 | 5/2017 |
| AR | 115412 A1 | 1/2021 |

(Continued)

OTHER PUBLICATIONS

Natural Gas Liquid Recovery of the Handbook of Natural Gas Transmission and Processing (Elsevier, 2006, pp. 365-400) (Year: 2006).*

(Continued)

*Primary Examiner* — Brian M King
(74) *Attorney, Agent, or Firm* — Conley Rose, P.C.

(57) ABSTRACT

A method for removing heavy hydrocarbons from a feed gas by: feeding, into an absorber, a top reflux stream and a second reflux stream below the top reflux stream, wherein the absorber produces an absorber bottom product stream and an absorber overhead product stream; depressurizing and feeding the absorber bottom product stream to a stripper to produce a stripper bottom product stream and a stripper overhead product stream; cooling and feeding a portion of the absorber overhead product stream back to the absorber as the top reflux stream; and pressurizing and feeding the stripper overhead product stream back to the absorber as the second reflux stream. Systems for carrying out the method are also provided.

36 Claims, 5 Drawing Sheets

(52) U.S. Cl.
CPC ........ *F25J 2205/50* (2013.01); *F25J 2210/06* (2013.01); *F25J 2210/60* (2013.01); *F25J 2220/64* (2013.01)

(56) References Cited

U.S. PATENT DOCUMENTS

| | | |
|---|---|---|
| 2,771,149 A | 11/1956 | Miller et al. |
| 3,320,754 A | 5/1967 | Tucker et al. |
| 3,421,610 A | 1/1969 | Marshall |
| 3,421,984 A | 1/1969 | Jensen et al. |
| 3,793,157 A | 2/1974 | Hobbs et al. |
| 4,004,430 A | 1/1977 | Solomon et al. |
| 4,061,481 A | 12/1977 | Campbell et al. |
| 4,102,659 A | 7/1978 | Martin |
| 4,164,452 A | 8/1979 | Funk et al. |
| 4,203,742 A | 5/1980 | Agnihotri |
| 4,278,457 A | 7/1981 | Campbell et al. |
| 4,453,958 A | 6/1984 | Gulsby et al. |
| 4,474,591 A | 10/1984 | Arand et al. |
| 4,496,380 A | 1/1985 | Harryman |
| 4,507,133 A | 3/1985 | Khan et al. |
| 4,509,967 A | 4/1985 | Sweet |
| 4,519,824 A | 5/1985 | Huebel |
| 4,617,039 A | 10/1986 | Buck |
| 4,657,571 A | 4/1987 | Gazzi |
| 4,676,812 A | 6/1987 | Kummann |
| 4,695,349 A | 9/1987 | Becker et al. |
| 4,854,955 A | 8/1989 | Campbell et al. |
| 4,895,584 A | 1/1990 | Buck et al. |
| 5,220,797 A | 6/1993 | Krishnamurthy et al. |
| 5,291,736 A | 3/1994 | Paradowski et al. |
| 5,462,583 A | 10/1995 | Wood et al. |
| 5,555,748 A | 9/1996 | Campbell et al. |
| 5,657,643 A | 8/1997 | Price |
| 5,669,238 A | 9/1997 | Devers |
| 5,685,170 A | 11/1997 | Sorensen |
| 5,687,584 A | 11/1997 | Mehra |
| 5,746,066 A | 5/1998 | Manley |
| 5,771,712 A | 6/1998 | Campbell et al. |
| 5,881,569 A | 3/1999 | Campbell et al. |
| 5,890,377 A | 4/1999 | Foglietta |
| 5,890,378 A | 4/1999 | Rambo et al. |
| 5,953,935 A | 9/1999 | Sorensen |
| 5,983,664 A | 11/1999 | Campbell et al. |
| 5,992,175 A | 11/1999 | Yao et al. |
| 6,006,546 A | 12/1999 | Espie |
| 6,112,549 A | 9/2000 | Yao et al. |
| 6,116,050 A * | 9/2000 | Yao .................. F25J 3/0219 62/631 |
| 6,116,051 A | 9/2000 | Agrawal et al. |
| 6,125,653 A | 10/2000 | Shu et al. |
| 6,182,469 B1 | 2/2001 | Campbell et al. |
| 6,244,070 B1 | 6/2001 | Lee et al. |
| 6,308,532 B1 | 10/2001 | Hopewell |
| 6,311,516 B1 | 11/2001 | Key et al. |
| 6,336,344 B1 | 1/2002 | O'Brien |
| 6,354,105 B1 | 3/2002 | Lee et al. |
| 6,363,744 B2 | 4/2002 | Finn |
| 6,368,385 B1 | 4/2002 | Paradowski |
| 6,401,486 B1 | 6/2002 | Lee et al. |
| 6,405,561 B1 | 6/2002 | Mortko et al. |
| 6,453,698 B2 | 9/2002 | Jain et al. |
| 6,516,631 B1 | 2/2003 | Trebble |
| 6,601,406 B1 | 8/2003 | Deng et al. |
| 6,658,893 B1 | 12/2003 | Mealy |
| 6,712,880 B2 | 3/2004 | Foglietta et al. |
| 6,755,965 B2 | 6/2004 | Pironti et al. |
| 6,823,692 B1 | 11/2004 | Patel et al. |
| 6,837,070 B2 | 1/2005 | Mak |
| 6,915,662 B2 | 7/2005 | Wilkinson et al. |
| 6,925,837 B2 | 9/2005 | Eaton |
| 7,051,552 B2 | 5/2006 | Mak |
| 7,051,553 B2 | 5/2006 | Mak et al. |
| 7,069,744 B2 | 7/2006 | Patel et al. |
| 7,073,350 B2 | 7/2006 | Mak |
| 7,100,399 B2 | 9/2006 | Eaton |
| 7,107,788 B2 | 9/2006 | Patel et al. |
| 7,159,417 B2 | 1/2007 | Foglietta et al. |
| 7,192,468 B2 | 3/2007 | Mak et al. |
| 7,216,507 B2 | 5/2007 | Cuellar et al. |
| 7,219,513 B1 | 5/2007 | Mostafa |
| 7,310,971 B2 | 12/2007 | Eaton et al. |
| 7,377,127 B2 | 5/2008 | Mak |
| 7,424,808 B2 | 9/2008 | Mak |
| 7,437,891 B2 | 10/2008 | Reyneke et al. |
| 7,574,856 B2 | 10/2009 | Mak et al. |
| 7,597,746 B2 | 10/2009 | Mak et al. |
| 7,600,395 B2 | 10/2009 | Eaton et al. |
| 7,600,396 B2 | 10/2009 | Mak |
| 7,635,408 B2 | 12/2009 | Mak et al. |
| 7,637,987 B2 | 12/2009 | Mak |
| 7,674,444 B2 | 3/2010 | Mak |
| 7,713,497 B2 | 5/2010 | Mak |
| 7,856,847 B2 | 12/2010 | Patel et al. |
| 7,856,848 B2 | 12/2010 | Lu |
| 8,110,023 B2 | 2/2012 | Mak et al. |
| 8,117,852 B2 | 2/2012 | Mak |
| 8,142,648 B2 | 3/2012 | Mak |
| 8,147,787 B2 | 4/2012 | Mak et al. |
| 8,192,588 B2 | 6/2012 | Mak |
| 8,196,413 B2 | 6/2012 | Mak |
| 8,209,996 B2 | 7/2012 | Mak |
| 8,316,665 B2 | 11/2012 | Mak |
| 8,377,403 B2 | 2/2013 | Mak |
| 8,398,748 B2 | 3/2013 | Mak |
| 8,424,340 B2 | 4/2013 | Eaton et al. |
| 8,480,982 B2 | 7/2013 | Mak et al. |
| 8,505,312 B2 | 8/2013 | Mak et al. |
| 8,505,333 B2 | 9/2013 | Evans et al. |
| 8,528,361 B2 | 9/2013 | Nanda et al. |
| 8,567,213 B2 | 10/2013 | Mak |
| 8,635,885 B2 | 1/2014 | Mak |
| 8,661,820 B2 | 3/2014 | Mak |
| 8,677,780 B2 | 3/2014 | Mak |
| 8,695,376 B2 | 4/2014 | Mak |
| 8,696,798 B2 | 4/2014 | Mak |
| 8,840,707 B2 | 9/2014 | Mak |
| 8,845,788 B2 | 9/2014 | Mak |
| 8,850,849 B2 | 10/2014 | Martinez et al. |
| 8,876,951 B2 | 11/2014 | Mak |
| 8,893,515 B2 | 11/2014 | Mak |
| 8,910,495 B2 | 12/2014 | Mak |
| 8,919,148 B2 | 12/2014 | Wilkinson et al. |
| 8,950,196 B2 | 2/2015 | Mak |
| 9,103,585 B2 | 8/2015 | Mak |
| 9,114,351 B2 | 8/2015 | Mak |
| 9,132,379 B2 | 9/2015 | Mak |
| 9,248,398 B2 | 2/2016 | Mak |
| 9,377,239 B2 | 6/2016 | Mock et al. |
| 9,423,175 B2 | 8/2016 | Mak |
| 9,557,103 B2 | 1/2017 | Mak |
| 9,631,864 B2 | 4/2017 | Chen et al. |
| 9,752,825 B2 | 9/2017 | Bauer |
| 9,841,231 B2 | 12/2017 | Qualls et al. |
| 9,920,985 B2 | 3/2018 | Mock et al. |
| 10,006,701 B2 | 6/2018 | Mak |
| 10,077,938 B2 | 9/2018 | Mak |
| 10,330,382 B2 | 6/2019 | Mak et al. |
| 10,451,344 B2 | 10/2019 | Mak |
| 10,704,832 B2 | 7/2020 | Mak |
| 10,760,851 B2 | 9/2020 | Thiebault et al. |
| 11,112,175 B2 | 9/2021 | Mak |
| 11,365,933 B2 | 6/2022 | Mak et al. |
| 11,725,879 B2 | 8/2023 | Mak |
| 2002/0042550 A1 | 4/2002 | Pironti et al. |
| 2002/0157538 A1 * | 10/2002 | Foglietta ................ F25J 3/0219 95/228 |
| 2003/0005722 A1 | 1/2003 | Wilkinson et al. |
| 2003/0089126 A1 | 5/2003 | Stringer et al. |
| 2004/0079107 A1 | 4/2004 | Wilkinson et al. |
| 2004/0148964 A1 | 8/2004 | Patel et al. |
| 2004/0159122 A1 | 8/2004 | Patel et al. |
| 2004/0172967 A1 | 9/2004 | Patel et al. |
| 2004/0206112 A1 | 10/2004 | Mak |

(56) References Cited

U.S. PATENT DOCUMENTS

| | | |
|---|---|---|
| 2004/0237580 A1 | 12/2004 | Mak |
| 2004/0250569 A1 | 12/2004 | Mak |
| 2004/0261452 A1 | 12/2004 | Mak |
| 2005/0047995 A1 | 3/2005 | Wylie |
| 2005/0201410 A1 | 9/2005 | Sekine |
| 2005/0218041 A1 | 10/2005 | Yoshida et al. |
| 2005/0247078 A1 | 11/2005 | Wilkinson |
| 2005/0255012 A1 | 11/2005 | Mak |
| 2005/0268649 A1 | 12/2005 | Wilkinson et al. |
| 2006/0000234 A1* | 1/2006 | Cuellar .......... F25J 3/0238 62/620 |
| 2006/0021379 A1 | 2/2006 | Ronczy |
| 2006/0032269 A1* | 2/2006 | Cuellar .......... F25J 3/0238 62/620 |
| 2006/0221379 A1 | 10/2006 | Noda |
| 2006/0260355 A1 | 11/2006 | Roberts |
| 2006/0283207 A1* | 12/2006 | Pitman .......... F25J 3/0209 62/620 |
| 2007/0157663 A1 | 7/2007 | Mak et al. |
| 2007/0240450 A1 | 10/2007 | Mak |
| 2008/0016909 A1 | 1/2008 | Lu |
| 2008/0190136 A1 | 8/2008 | Pitman |
| 2008/0271480 A1 | 11/2008 | Mak |
| 2009/0100862 A1 | 4/2009 | Wilkinson |
| 2009/0113931 A1 | 5/2009 | Patel et al. |
| 2009/0277217 A1 | 11/2009 | Ransbarger et al. |
| 2010/0000255 A1 | 1/2010 | Mak |
| 2010/0011809 A1 | 1/2010 | Mak |
| 2010/0011810 A1 | 1/2010 | Mak |
| 2010/0043488 A1 | 2/2010 | Mak |
| 2010/0126187 A1 | 5/2010 | Mak |
| 2010/0206003 A1 | 8/2010 | Mak et al. |
| 2010/0275647 A1 | 11/2010 | Johnke et al. |
| 2010/0287984 A1 | 11/2010 | Johnke et al. |
| 2011/0067442 A1 | 3/2011 | Martinez et al. |
| 2011/0067443 A1 | 3/2011 | Martinez et al. |
| 2011/0174017 A1 | 7/2011 | Victory et al. |
| 2011/0226014 A1 | 9/2011 | Johnke et al. |
| 2011/0265511 A1 | 11/2011 | Fischer et al. |
| 2012/0000245 A1 | 1/2012 | Currence et al. |
| 2012/0036890 A1 | 2/2012 | Kimble et al. |
| 2012/0085127 A1 | 4/2012 | Nanda et al. |
| 2012/0096896 A1 | 4/2012 | Patel |
| 2012/0137726 A1 | 6/2012 | Currence et al. |
| 2013/0061632 A1* | 3/2013 | Brostow .......... F25J 1/0216 62/611 |
| 2013/0061633 A1 | 3/2013 | Mak |
| 2013/0186133 A1 | 7/2013 | Ploeger et al. |
| 2013/0298602 A1 | 11/2013 | Prim |
| 2014/0013797 A1 | 1/2014 | Butts |
| 2014/0026615 A1 | 1/2014 | Mak |
| 2014/0033762 A1 | 2/2014 | Chen et al. |
| 2014/0060114 A1 | 3/2014 | Mak |
| 2014/0075987 A1 | 3/2014 | Mak |
| 2014/0182331 A1 | 7/2014 | Burmberger et al. |
| 2014/0260420 A1 | 9/2014 | Mak |
| 2014/0290307 A1 | 10/2014 | Gahier et al. |
| 2014/0345319 A1 | 11/2014 | Santos |
| 2015/0184931 A1 | 7/2015 | Mak |
| 2015/0322350 A1 | 11/2015 | Iyer |
| 2016/0231052 A1 | 2/2016 | Mak |
| 2016/0069610 A1 | 3/2016 | Anguiano et al. |
| 2016/0327336 A1 | 11/2016 | Kennedy et al. |
| 2017/0051970 A1 | 2/2017 | Mak |
| 2017/0058708 A1 | 3/2017 | Noureldin et al. |
| 2017/0176099 A1 | 6/2017 | Gaskin et al. |
| 2017/0336137 A1 | 11/2017 | Mak et al. |
| 2017/0370641 A1 | 12/2017 | Mak et al. |
| 2018/0017319 A1 | 1/2018 | Mak et al. |
| 2018/0023889 A1 | 1/2018 | Chen et al. |
| 2018/0066889 A1 | 3/2018 | Gaskin et al. |
| 2018/0149425 A1 | 5/2018 | Oneal et al. |
| 2018/0058754 A1 | 8/2018 | Lynch et al. |
| 2018/0231305 A1 | 8/2018 | Pierre, Jr. |
| 2018/0306498 A1 | 10/2018 | Rovers et al. |
| 2018/0320960 A1 | 11/2018 | Terrien et al. |
| 2018/0347899 A1 | 12/2018 | Cuellar et al. |
| 2019/0011180 A1 | 1/2019 | Mostafa |
| 2019/0086147 A1 | 3/2019 | Brown, III et al. |
| 2019/0120550 A1 | 4/2019 | Mak |
| 2019/0154333 A1 | 5/2019 | Mak |
| 2019/0242645 A1 | 8/2019 | Mak |
| 2019/0271503 A1 | 9/2019 | Terrien et al. |
| 2020/0064064 A1 | 2/2020 | Butts |
| 2020/0072546 A1 | 3/2020 | Thom et al. |
| 2020/0141639 A1 | 5/2020 | Mak et al. |
| 2020/0199046 A1 | 6/2020 | Simon |
| 2020/0370824 A1 | 11/2020 | Mak et al. |
| 2021/0095921 A1 | 4/2021 | Mak et al. |
| 2021/0381760 A1 | 12/2021 | Mak |

FOREIGN PATENT DOCUMENTS

| | | |
|---|---|---|
| AT | 383557 T | 1/2010 |
| AU | 2002303849 B2 | 12/2003 |
| AU | 200287322 A1 | 2/2009 |
| AU | 2011349713 B2 | 7/2013 |
| AU | 2016407529 A1 | 11/2018 |
| CA | 2176430 A1 | 4/1997 |
| CA | 2484085 C | 8/2008 |
| CA | 2694149 A1 | 2/2009 |
| CA | 3084911 A1 | 12/2012 |
| CA | 289132 C | 9/2020 |
| CA | 2976071 C | 10/2020 |
| CA | 3008229 C | 1/2022 |
| CA | 3022085 C | 5/2023 |
| CN | 2004800385528 | 12/2009 |
| CN | 101815915 B | 4/2014 |
| CN | 113795461 A | 12/2021 |
| DE | 60224585 T2 | 4/2009 |
| DE | 102009004109 A1 | 7/2010 |
| EA | 007771 B1 | 2/2007 |
| EA | 20139957 A1 | 12/2013 |
| EP | 0010939 A1 | 5/1980 |
| EP | 1508010 B1 | 1/2008 |
| EP | 2185878 T | 5/2010 |
| EP | 2655992 | 6/2012 |
| EP | 2521761 B1 | 11/2015 |
| EP | 3256550 A1 | 12/2017 |
| EP | 3400278 A1 | 11/2018 |
| EP | 3894047 A1 | 10/2021 |
| GC | 0004114 A | 4/2016 |
| JP | 2007510124 A | 4/2007 |
| MX | PA04011219 A | 2/2005 |
| MX | 201000472 A | 3/2010 |
| MX | 2013007136 A | 8/2013 |
| MX | 391995 | 5/2022 |
| WO | 99023428 A1 | 5/1999 |
| WO | 0188447 A1 | 11/2001 |
| WO | 2002014763 A1 | 2/2002 |
| WO | 2002079706 A1 | 10/2002 |
| WO | 2003095913 A1 | 11/2003 |
| WO | 2003100334 A1 | 12/2003 |
| WO | 2004017002 A1 | 2/2004 |
| WO | 2004065868 A2 | 8/2004 |
| WO | 2004076946 A2 | 9/2004 |
| WO | 2004080936 A2 | 9/2004 |
| WO | 20044580 A | 12/2004 |
| WO | 2005045338 A1 | 5/2005 |
| WO | 2007001669 A2 | 1/2007 |
| WO | 2007014069 A2 | 2/2007 |
| WO | 2007014209 A1 | 2/2007 |
| WO | 2008002592 A2 | 1/2008 |
| WO | 2009023252 A1 | 2/2009 |
| WO | 2011123278 A1 | 10/2011 |
| WO | 2012087740 A1 | 6/2012 |
| WO | 2012177749 A1 | 12/2012 |
| WO | 2014047464 A1 | 3/2014 |
| WO | 2016130574 A1 | 8/2016 |
| WO | 2017119913 A1 | 7/2017 |
| WO | 2014151908 A1 | 9/2017 |
| WO | 2017200557 A1 | 11/2017 |
| WO | 2018049128 A1 | 3/2018 |

(56) References Cited

FOREIGN PATENT DOCUMENTS

| WO | 2019078892 A1 | 4/2019 |
|---|---|---|
| WO | 2019226156 A1 | 11/2019 |
| WO | 20200123814 A1 | 6/2020 |

OTHER PUBLICATIONS

Australia Application No. 2011349713, Notice of Acceptance, dated Mar. 31, 2015, 2 pages.
Restriction Requirement dated Sep. 12, 2018, U.S. Appl. No. 15/259,354, filed Sep. 8, 2016.
Office Action dated Mar. 1, 2019, U.S. Appl. No. 15/259,354, filed Sep. 8, 2016.
Notice of Allowance dated Jun. 19, 2019, U.S. Appl. No. 15/259,354, filed Sep. 8, 2016.
Corrected Notice of Allowability dated Jul. 2, 2019, U.S. Appl. No. 15/259,354, filed Sep. 8, 2016.
Restriction Requirement dated Jan. 8, 2014, U.S. Appl. No. 13/528,332, filed Jun. 20, 2012.
Notice of Allowance dated Aug. 15, 2014, U.S. Appl. No. 13/528,332, filed Jun. 20, 2012.
Examination Report dated Mar. 17, 2016, AU Application No. 2012273028, priority date Jun. 20, 2011.
Office Action dated Jun. 28, 2018, CA Application No. 2,839,132, filed on Dec. 11, 2013.
Office Action dated Jun. 14, 2019, Canadian Application No. 2,839,132, filed on Dec. 11, 2013.
Office Action dated Jun. 29, 2018, MX Application No. MX/A/2013/014864, filed on Dec. 13, 2013.
Notice of Allowance dated Oct. 18, 2018, MX Application No. MX/A/2013/014864, filed on Dec. 13, 2013.
Restriction Requirement dated Nov. 19, 2015, U.S. Appl. No. 14/033,096, filed Sep. 20, 2013.
Office Action dated Jun. 2, 2016, U.S. Appl. No. 14/033,096, filed Sep. 20, 2013.
Final Office Action dated Dec. 9, 2016, U.S. Appl. No. 14/033,096, filed Sep. 20, 2013.
Advisory Action dated Feb. 28, 2017, U.S. Appl. No. 14/033,096, filed Sep. 20, 2013.
Office Action dated May 11, 2017, U.S. Appl. No. 14/033,096, filed Sep. 20, 2013.
Final Office Action dated Nov. 15, 2017, U.S. Appl. No. 14/033,096, filed Sep. 20, 2013.
Advisory Action dated Feb. 6, 2018, U.S. Appl. No. 14/033,096, filed Sep. 20, 2013.
Office Action dated Mar. 26, 2018, U.S. Appl. No. 14/033,096, filed Sep. 20, 2013.
Final Office Action dated Oct. 17, 2018, U.S. Appl. No. 14/033,096, filed Sep. 20, 2013.
Office Action dated Apr. 4, 2019, U.S. Appl. No. 14/033,096, filed Sep. 20, 2013.
Office Action dated Nov. 25, 2015, U.S. Appl. No. 14/210,061, filed Mar. 14, 2014.
Notice of Allowance dated Mar. 26, 2016, U.S. Appl. No. 14/210,061, filed Mar. 14, 2014.
Notice of Decision dated Sep. 30, 2019, United Arab Emirates Patent Application No. P1023/2015 filed Mar. 14, 2014.
Office Action dated Sep. 26, 2017, U.S. Appl. No. 15/019,570, filed Feb. 6, 2016.
Notice of Allowance dated May 18, 2018, U.S. Appl. No. 15/019,570, filed Feb. 6, 2016.
Office Action dated Mar. 21, 2019, Canadian Patent Application No. 2976071 filed Feb. 9, 2016.
Office Action dated Dec. 3, 2019, Canadian Patent Application No. 2976071 filed Feb. 9, 2016.
Notice of Allowance dated May 19, 2020, Canadian Patent Application No. 2976071 filed Feb. 9, 2016.
Extended European Search Report dated Aug. 1, 2018, European Patent Application filed Feb. 9, 2016.
Communication Pursuant to Rules 70(2) and 70a(2) EPC dated Aug. 20, 2018, European Patent Application filed Feb. 9, 2016.
Examination Report dated Jul. 9, 2020, European Patent Application No. 167497733.9 filed Feb. 9, 2016.
Office Action dated Jul. 7, 2017, U.S. Appl. No. 15/158,143, filed May 16, 2016.
Final Office Action dated Nov. 1, 2017, U.S. Appl. No. 15/158,143, filed May 16, 2016.
Office Action dated Mar. 14, 2018, U.S. Appl. No. 15/158,143, filed May 16, 2016.
Final Office Action dated Jun. 29, 2018, U.S. Appl. No. 15/158,143, filed May 16, 2016.
Office Action dated Oct. 4, 2018, U.S. Appl. No. 15/158,143, filed May 16, 2016.
Notice of Allowance dated Jan. 24, 2019, U.S. Appl. No. 15/158,143, filed May 16, 2016.
Office Action dated Aug. 11, 2017, U.S. Appl. No. 15/191,251, filed Jun. 23, 2016.
Final Office Action dated Feb. 1, 2018, U.S. Appl. No. 15/191,251, filed Jun. 23, 2016.
Advisory Action dated Apr. 23, 2018, U.S. Appl. No. 15/191,251, filed Jun. 23, 2016.
Office Action dated Aug. 15, 2018, U.S. Appl. No. 15/191,251, filed Jun. 23, 2016.
Final Office Action dated Mar. 6, 2019, U.S. Appl. No. 15/191,251, filed Jun. 23, 2016.
Restriction Requirement dated Sep. 18, 2019, U.S. Appl. No. 15/789,463, filed Oct. 20, 2017.
Office Action dated May 4, 2020, U.S. Appl. No. 15/789,463, filed Oct. 20, 2017.
Foreign Communication from a Related Counterpart—International Search Report and Written Opinion, dated Aug. 24, 2016, PCT/US2016/013687, filed on Jan. 15, 2016.
Foreign Communication from a Related Counterpart—International Preliminary Examination Report, dated Jul. 19, 2018, PCT/US2016/013687, filed on Jan. 15, 2016.
International Application No. PCT/US02/16311, International Preliminary Examination Report, mailed Feb. 19, 2003, 6 pages.
Foreign Communication from a Related Counterpart—International Search Report and Written Opinion, dated Feb. 16, 2005, PCT/US2004/032788, filed on Oct. 5, 2004.
Foreign Communication from a Related Counterpart—International Preliminary Report on Patentability, dated Feb. 27, 2006, PCT/US2004/032788, filed on Oct. 5, 2004.
International Application No. PCT/US08/09736, Written Opinion of the International Searching Authority, mailed Nov. 3, 2008, 5 pages.
International Application No. PCT/US08/09736, International Preliminary Report on Patentability, mailed May 25, 2010, 6 pages.
Foreign Communication from a Related Counterpart—International Search Report and Written Opinion, dated Apr. 18, 2012, PCT/2011/065140, filed on Dec. 15, 2011.
Foreign Communication from a Related Counterpart—International Preliminary Report on Patentability, dated Jun. 25, 2013, PCT/2011/065140, filed on Dec. 15, 2011.
Foreign Communication from a Related Counterpart—International Search Report and Written Opinion, dated Jul. 21, 2013, PCT/US2012/043332, filed Jun. 20, 2012.
Foreign Communication from a Related Counterpart—International Preliminary Report on Patentability, dated Jan. 4, 2015, PCT/US2012/043332, filed Jun. 20, 2012.
Foreign Communication from a Related Counterpart—International Search Report and Written Opinion, dated Jan. 14, 2014, PCT/US2013/060971, filed Sep. 20, 2013.
Foreign Communication from a Related Counterpart—International Preliminary Report on Patentability, dated Jan. 7, 2015, PCT/US2013/060971, filed Sep. 20, 2013.
Foreign Communication from a Related Counterpart—International Search Report and Written Opinion, dated Jul. 7, 2014, PCT/US2014/026655, filed on Mar. 14, 2014.
Foreign Communication from a Related Counterpart—International Preliminary Report on Patentability, dated Sep. 15, 2015, PCT/US2014/026655, filed on Mar. 14, 2014.

(56) References Cited

OTHER PUBLICATIONS

Foreign Communication from a Related Counterpart—International Search Report and Written Opinion, dated Jul. 1, 2016, PCT/US2016/017190, filed Feb. 6, 2016.
Foreign Communication from a Related Counterpart—International Preliminary Report on Patentability, dated Aug. 24, 2017, PCT/US2016/017190, filed Feb. 6, 2016.
Foreign Communication from a Related Counterpart—International Search Report and Written Opinion, dated Dec. 8, 2016, PCT/US2016/034362, filed on May 26, 2016.
International Search Report and Written Opinion, dated Dec. 12, 2017, PCT/US2017/050636, filed on Sep. 8, 2017.
International Preliminary Report on Patentability, dated Mar. 21, 2019, PCT/US2017/050636, filed on Sep. 8, 2017.
International Preliminary Report on Patentability, dated Nov. 29, 2018, PCT/US2016/034362, filed on May 26, 2016.
Foreign Communication from a Related Counterpart—International Search Report and Written Opinion, dated May 1, 2018, PCT/US2017/057674, filed on Oct. 20, 2017.
Foreign Communication from a Related Counterpart—International Search Report and Written Opinion, dated Jul. 23, 2018, PCT/US2018/033875, filed on May 22, 2018.
International Preliminary Report on Patentability, dated Dec. 3, 2020, PCT/US2018/033875, filed on May 22, 2018.
International Preliminary Report on Patentability, dated Apr. 30, 2020, PCT/US2017/057674, filed on Oct. 20, 2017.
Area 4, "Reboilers", found at: https://www.area4.info/Area4%20Informations/REBOILERS.htm.
Mak, John, "Flexible NGL Recovery and Methods," filed Oct. 20, 2003, U.S. Appl. No. 60/516,120.
Mak, John, "Ethane Recovery and Ethane Rejection Methods and Configurations," filed Dec. 23, 2010, U.S. Appl. No. 61/426,756.
Mak, John, "Ethane Recovery and Ethane Rejection Methods and Configurations," filed Jan. 21, 2011, U.S. Appl. No. 61/434,887.
Mak, John, "Configurations and Methods for Retrofitting NGL Recovery Plant," filed Jun. 20, 2011, U.S. Appl. No. 61/499,033.
Mak, John, "Configurations and Methods for NGL Recovery for High Nitrogen Content Feed Gases," filed Sep. 20, 2012, U.S. Appl. No. 61/703,654.
Mak, John, "Flexible NGL Recovery Methods and Configurations," filed Mar. 14, 2013, U.S. Appl. No. 61/785,329.
Mak, John, "Methods and Configuration of an NGL Recovery Process for Low Pressure Rich Feed Gas," filed Feb. 9, 2015, U.S. Appl. No. 62/113,938.
Mak, John et al., "Methods and Configuration for Retrofitting NGL Plant for High Ethane Recovery." filed Sep. 9, 2016, U.S. Appl. No. 62/385,748.
Mak, John et al., "Methods and Configuration for Retrofitting NGL Plant for High Ethane Recovery." filed Sep. 9, 2016, U.S. Appl. No. 62/489,234.
Mak, John, et al., "Integrated Methods and Configurations for Propane Recovery in Both Ethane Recovery and Ethane Rejection," filed Nov. 10, 2020, Application No.
Office Action dated Sep. 22, 20202, U.S. Appl. No. 16/219,126, filed Dec. 13, 2018.
PCT International Preliminary Report on Patentability dated Jun. 24, 2021; International Application No. PCT/US2019/065993 filed Dec. 12, 2019.
Final Office Action dated Aug. 9, 2021, U.S. Appl. No. 16/219,126, filed Dec. 13, 2018.
Restriction Requirement dated Aug. 9, 2021, filed Jan. 29, 2019, U.S. Appl. No. 16/260,288.
Office Action dated Dec. 29, 2021, Saudi Arabian Patent Application No. 51891931, filed Jan. 15, 2016.
Office Action dated Dec. 13, 2021, Australian Patent Application filed May 18, 2016.
Office Action dated Dec. 21, 2021, Brazilian Patent Application filed Sep. 8, 2017.
Notice of Allowance dated Feb. 24, 2022, U.S. Appl. No. 16/390,687, filed Apr. 22, 2019.
Restriction Requirement dated May 12, 2017, U.S. Appl. No. 14/988,388, filed Jan. 5, 2016.
Office Action dated Aug. 10, 2017, U.S. Appl. No. 14/988,388, filed Jan. 5, 2016.
Final Office Action dated Nov. 29, 2017, U.S. Appl. No. 14/988,388, filed Jan. 5, 2016.
Notice of Allowance dated Feb. 16, 2018, U.S. Appl. No. 14/988,388, filed Jan. 5, 2016.
Office Action dated Dec. 9, 2019, U.S. Appl. No. 15/988,310, filed May 24, 2018.
Notice of Allowance dated Mar. 13, 2020, U.S. Appl. No. 15/988,310, filed May 24, 2018.
European Patent Application No. 16884122.9, Communication pursuant to Rules 161 and 162 EPC, mailed Aug. 20, 2018, 3 pages.
Extended European Search Report dated Aug. 8, 2019, European Patent Application No. 16884122.9.
Communication Pursuant to Rules 70(2) and 70a(2) EPC dated Aug. 27, 2019, European Patent Application No. 16884122.9.
U.S. Appl. No. 10/469,456, Office Action, mailed Sep. 19, 2005, 6 pages.
U.S. Appl. No. 10/469,456, Notice of Allowance, mailed Jan. 10, 2006, 6 pages.
Europe Patent Application No. 02731911.0, Supplementary European Search Report, mailed Nov. 24, 2005, 3 pages.
Europe Patent Application No. 02731911.0, Examination Report, mailed Mar. 2, 2006, 5 pages.
Europe Patent Application No. 02731911.0, Examination Report, mailed Sep. 19, 2006, 4 pages.
Europe Patent Application No. 02731911.0, Intention to Grant, mailed Aug. 1, 2007, 20 pages.
Europe Patent Application No. 02731911.0, Decision to Grant, mailed Dec. 13, 2007, 2 pages.
Canada Patent Application No. 2484085, Examination Report, mailed Jan. 16, 2007, 3 pages.
First Office Action dated Dec. 14, 2007, CN Application No. 200480039552.8 filed Oct. 30, 2003.
Second Office Action dated Nov. 7, 2008, CN Application No. 200480039552.8 filed Oct. 30, 2003.
Notice of Decision to Grant dated Jul. 31, 2009, CN Application No. 200480039552.8 filed Oct. 30, 2003.
Examination Report dated Dec. 19, 2012, EP Application No. 04794213.1 filed Oct. 4, 2004.
Second Examination Report dated Oct. 7, 2014, EP Application No. 04794213.1, filed Oct. 4, 2004.
Office Action dated Jan. 7, 2009, JP Application No. 2006538016, priority date Oct. 30, 2003.
Decision to Grant dated Aug. 20, 2010, JP Application No. 2006538016, priority date Oct. 30, 2003.
Office Action dated Aug. 4, 2010, U.S. Appl. No. 10/595,528, filed Feb. 28, 2007.
Final Office Action dated Dec. 29, 2010, U.S. Appl. No. 10/595,528, filed Feb. 28, 2007.
Advisory Action dated Apr. 14, 2011, U.S. Appl. No. 10/595,528, filed Feb. 28, 2007.
Office Action dated Jun. 8, 2011, U.S. Appl. No. 10/595,528, filed Feb. 28, 2007.
Final Office Action dated Oct. 27, 2011, U.S. Appl. No. 10/595,528, filed Feb. 28, 2007.
Notice of Allowance dated Mar. 5, 2012, U.S. Appl. No. 10/595,528, filed Feb. 28, 2007.
Europe Patent Application No. 08795331.1, Communication pursuant to Rules 161 and 162 EPC, mailed Mar. 24, 2010, 2 pages.
China Patent Application No. 200880103754.2, First Office Action, dated Mar. 27, 2012, 20 pages.
China Patent Application No. 200880103754.2, Second Office Action, dated Dec. 26, 2012, 21 pages.
China Patent Application No. 200880103754.2, Third Office Action, dated Jul. 22, 2013, 7 pages.
China Patent Application No. 200880103754.2, Notification to Grant Patent Right for Invention, dated Dec. 23, 2013, 2 pages.
Australia Patent Application No. 2008287322, First Examination Report, dated Apr. 8, 2011, 2 pages.

(56) References Cited

OTHER PUBLICATIONS

Australia Patent Application No. 2008287322, Notice of Acceptance, dated Apr. 4, 2012, 1 page.
Gulf Cooperation Council Patent Application No. GCC/P/2008/11533, Examination Report, dated Dec. 19, 2013, 4 pages.
Canada Patent Application No. 2694149, Office Action, dated Apr. 16, 2012, 2 pages.
U.S. Appl. No. 12/669,025, Office Action, mailed May 8, 2012, 12 pages.
U.S. Appl. No. 12/669,025, Office Action, mailed Oct. 10, 2013, 11 pages.
U.S. Appl. No. 12/669,025, Final Office Action, mailed Mar. 4, 2014, 10 pages.
U.S. Appl. No. 12/669,025, Notice of Allowance, mailed Apr. 7, 2015, 12 pages.
Mexico Patent Application No. MX/a/2010/001472, Office Action, dated Nov. 15, 2013, 1 page.
Mexico Patent Application No. MX/a/2010/001472, Office Action, dated Jul. 23, 2014, 1 page.
United Arab Emirates Patent Application No. 0143/2010, Search Report, dated Oct. 3, 2015, 9 pages.
Restriction Requirement dated Sep. 22, 2015, U.S. Appl. No. 13/996,805, filed Sep. 17, 2013.
Office Action dated Feb. 9, 2016, U.S. Appl. No. 13/996,805, filed Sep. 17, 2013.
Notice of Allowance dated Jun. 9, 2016, U.S. Appl. No. 13/996,805, filed Sep. 17, 2013.
Australian Application No. 2011349713, Examination Report, dated Dec. 16, 2014, 2 pages.
Office Action dated Sep. 22, 2020, U.S. Appl. No. 16/219,126, filed Dec. 13, 2018.
Editors: Mokhatab, S.; Poe, W. A. Poe; Spe, J. G. Handbook of Natural Gas Transmission and Processing (Elsevier, 2006, ISBN U 978-0-7506-7776-9, pp. 365-400), Chapter 10, pp. 365-400.
Notice of Allowance dated Aug. 20, 2021, Canadian Patent Application No. 3008229 filed Jan. 15, 2016.
Office Action dated Jul. 29, 2021, Canadian Patent Application No. 3084911 filed Jun. 20, 2012.
Office Action dated Nov. 5, 2021, filed Jan. 29, 2019, U.S. Appl. No. 16/260,288.
Office Action dated Nov. 4, 2021, U.S. Appl. No. 16/390,687, filed Apr. 22, 2019.
Office Action dated Sep. 9, 2021, Mexican Patent Application No. MX/a/2016/009162 filed Jul. 13, 2016.
Advisory Action dated Nov. 16, 2021, U.S. Appl. No. 16/219,126, filed Dec. 13, 2018.
Office Action dated Dec. 20, 2021, Canadian Patent Application No. 3084911 filed Jun. 20, 2012.
Restriction Required dated Oct. 26, 2021, U.S. Appl. No. 15/325,696, filed Feb. 14, 2019.
Office Action dated Apr. 13, 2021, Saudi Arabian Patent Application No. 51891931, filed Jan. 15, 2016.
Notice of Allowance dated Apr. 27, 2021, U.S. Appl. No. 15/789,463, filed Oct. 20, 2017.
Office Action dated Jan. 29, 2021, U.S. Appl. No. 16/219,126, filed Dec. 13, 2018.
Office Action dated Feb. 24, 2021, Canadian Patent Application No. 3008229 filed Jan. 15, 2016.
Mak, John et al., U.S. Appl. No. 16/219,126 entitled Heavy Hydrocarbon and BTEX Removal from Pipeline Gas to LNG Liquefaction, filed Dec. 13, 2018.
International Application No. PCT/US2019/065993 filed Dec. 12, 2019, PCT Search Report and Written Opinion dated Apr. 9, 2020.
Final Office Action dated Apr. 20, 2022, U.S. Appl. No. 16/260,288, filed Jan. 29, 2019.
Notice of Allowance dated Mar. 7, 2022, Mexican Patent Application No. MX/a/2016/009162 filed Jul. 13, 2016.
Office Action dated Mar. 16, 2022, U.S. Appl. No. 15/325,696, filed Feb. 14, 2019.
Examiner's Answer to Appeal Brief dated Jun. 2, 2022, U.S. Appl. No. 16/219,126, filed Dec. 13, 2018.
Office Action dated Aug. 19, 2022, Canadian Patent Application No. 3084911 filed Jun. 20, 2012.
Advisory Action dated Sep. 19, 2022, U.S. Appl. No. 15/325,696, filed Feb. 14, 2019.
Office Action dated Aug. 24, 2022, Argentine Patent Application No. 20190101360 filed May 22, 2019.
Restriction Requirement dated Aug. 23, 2022, U.S. Appl. No. 17/054,195, filed Nov. 10, 2020.
Office Action dated Sep. 4, 2022, Saudi Arabian Patent Application No. 520420584 filed May 22, 2018.
Communication Pursuant to Rule 70(2) and 70a(2) EPC dated Sep. 6, 2022, European Patent Application No. 19895601.3 filed Dec. 12, 2019.
Notice of Financial Consideration of Grants dated Sep. 19, 2022, Saudi Arabian Patent Application No. 51891931, filed Jan. 15, 2016.
Advisory Action dated Jul. 27, 2022, U.S. Appl. No. 16/260,288, filed Jan. 29, 2019.
Office Action dated Jun. 7, 2022, Brazilian Patent Application filed Sep. 8, 2017.
Office Action dated Jun. 20, 2022, Saudi Arabia Patent Application No. 520411793 filed Oct. 20, 2017.
Final Office Action dated Jul. 5, 2022, U.S. Appl. No. 15/325,696, filed Feb. 14, 2019.
Pre-Brief Appeal Decision dated Oct. 20, 2022, U.S. Appl. No. 16/260,288, filed Jan. 29, 2019.
Examiner's Answer dated Jan. 18, 2023, U.S. Appl. No. 16/260,288, filed Jan. 29, 2019.
Notice of Acceptance dated Oct. 27, 2022, Australian Patent Application filed May 18, 2016.
Notice of Allowance dated Nov. 15, 2022, Canadian Patent Application No. 3022085 filed May 18, 2016.
Office Action dated Nov. 1, 2022, Brazilian Patent Application filed Sep. 8, 2017.
Restriction Required dated Oct. 26, 2021, U.S. Appl. No. 16/325,696, filed Feb. 14, 2019.
Office Action dated Mar. 16, 2022, U.S. Appl. No. 16/325,696, filed Feb. 14, 2019.
Final Office Action dated Jul. 5, 2022, U.S. Appl. No. 16/325,696, filed Feb. 14, 2019.
Advisory Action dated Sep. 19, 2022, U.S. Appl. No. 16/325,696, filed Feb. 14, 2019.
Pre-Appeal Brief Decision dated Nov. 18, 2022, U.S. Appl. No. 16/325,696, filed Feb. 14, 2019.
Notice of Allowance dated Nov. 18, 2022, U.S. Appl. No. 16/325,696, filed Feb. 14, 2019.
Notice of Allowance dated Nov. 17, 2022, Canadian Patent Application No. 3047703 filed Feb. 9, 2017.
Notice of Grant dated Dec. 27, 2022, Saudi Arabia Patent Application No. 520411793 filed Oct. 20, 2017.
Restriction Requirement dated Sep. 22, 2022, U.S. Appl. No. 17/393,477, filed Aug. 4, 2021.
Notice of Non-Compliant Amendment dated Nov. 17, 2022, U.S. Appl. No. 17/393,477, filed Aug. 4, 2021.
Office Action dated Oct. 27, 2022, U.S. Appl. No. 17/054,195, filed Nov. 10, 2020.
Notice of Acceptance dated Jun. 6, 2023, Brazilian Patent Application filed Sep. 8, 2017.
Office Action dated Oct. 19, 2023, Canadian Patent Application No. 3033088 filed Feb. 5, 2019.
Office Action dated Aug. 29, 2023, Mexican Application No. MX/a/2019/001888, filed Feb. 15, 2019.
Notice of Allowance dated Jan. 19, 2024, Mexican Application No. MX/a/2019/001888, filed Feb. 15, 2019.
Office Action dated Jan. 16, 2024, U.S. Appl. No. 18/348,557, filed Jul. 7, 2023.
Office Action dated Oct. 30, 2023, Canadian Patent Application No. 3077409 filed Oct. 20, 2017.
Office Action dated Apr. 27, 2023, U.S. Appl. No. 17/393,477, filed Aug. 4, 2021.
Final Office Action dated Nov. 9, 2023, U.S. Appl. No. 17/393,477, filed Aug. 4, 2021.

(56) References Cited

OTHER PUBLICATIONS

Advisory Action dated Jan. 25, 2024, U.S. Appl. No. 17/393,477, filed Aug. 4, 2021.
Final Office Action dated Mar. 3, 2023, U.S. Appl. No. 17/054,195, filed Nov. 10, 2020.
Examiners Answer dated Nov. 8, 2023, U.S. Appl. No. 17/054,195, filed Nov. 10, 2020.
Office Action dated Nov. 16, 2023, Canadian Patent Application No. 3,122,425 filed Oct. 20, 2017.
Notice of Allowance dated Feb. 20, 2024, Canadian Patent Application No. 3033088 filed Feb. 5, 2019.
Notice of Allowance dated Feb. 26, 2024, Canadian Patent Application No. 3077409 filed Oct. 20, 2017.
Appeal Board Decision dated Mar. 21, 2024, U.S. Appl. No. 16/219,126, filed Dec. 13, 2018.
Notice of Allowance dated Apr. 19, 2024, U.S. Appl. No. 16/219,126, filed Dec. 13, 2018.
Appeal Board Decision dated Jul. 1, 2024, U.S. Appl. No. 16/260,288, filed Jan. 29, 2019.
Office Action dated May 31, 2024, U.S. Appl. No. 17/393,477, filed Aug. 4, 2021.

\* cited by examiner

INTEGRATED HEAVY HYDROCARBON AND BTEX REMOVAL IN LNG LIQUEFACTION FOR LEAN GASES

TECHNICAL FIELD

The present disclosure relates to systems and methods for the removal of heavy hydrocarbons from lean gases to a natural gas liquefaction (LNG) plant; more particularly, the present disclosure relates to systems and methods whereby natural gas liquids (NGL) plants can be operated with lean feed gases having a $C_{3+}$ content of less than or equal to about 2 gallons per thousand cubic feet (GPM); still more particularly, the present disclosure relates to systems and methods for processing natural gas, whereby an NGL plant can be optionally integrated with an LNG liquefaction plant, and can be operated for the removal of heavy hydrocarbons from lean gases via an absorber operated with two reflux streams comprising primarily methane.

BACKGROUND

Natural gas liquids (NGL) may describe heavier gaseous hydrocarbons: ethane ($C_2H_6$), propane ($C_3H_8$), normal butane (n-$C_4H_{10}$), isobutane (i-$C_4H_{10}$), pentanes, and even higher molecular weight hydrocarbons, when processed and purified into finished by-products. Systems can be used to recover NGL from a feed gas using natural gas liquids plants, as the NGL can generate revenue for the facilities and can be economically justified.

Natural gas is available from conventional natural gas reservoirs and unconventional gas such as shale gas, tight gas, and coal bed methane. Typical natural gas streams, conventional gas or unconventional gas, may contain 10% to 20% ethane, 10% to 15% or higher in propane and heavier hydrocarbons, with the balance methane. The propane and heavier hydrocarbons liquids can be sold as transportation fuel which can generate significant revenue for the gas processing plants, and therefore, high propane recovery is highly desirable. Lean natural gas feeds (very high methane content) are becoming more prevalent, especially in many parts of the world including North America, East Africa, and Australia. These feed gases often contain some aromatics and heavy hydrocarbons that freeze out at liquefaction temperature causing plant shutdown and revenue losses.

There are many technologies that can be used for heavy hydrocarbons removal from natural gas streams. If the gas is rich with substantial amount of the $C_{3+}$ components, such as gas with propane liquid greater than 2 to 6 GPM, a NGL recovery expander based process is typically used. In a NGL recovery expander plant, a feed gas stream, typically supplied at high pressure (e.g., 800 psig) is treated in an amine unit for $CO_2$ removal to meet a $CO_2$ specification (e.g., 50 ppmv), and is further processed in a molecular sieve or 'dehydration' unit for water removal (e.g., to below 0.1 ppmv) and mercury removal (e.g., to below 10 nanogram/$m^3$). The dried and treated gas is then processed in the NGL recovery expander plant for NGL removal.

The commonly used expander process is the Gas Subcooled Process (GSP). In the GSP, a feed gas is chilled in a feed exchanger to about −40° F. and separated in a separator. The separator liquid is routed to a deethanizer, and the separator vapor is split into two portions. One portion of the separator vapor is further cooled and condensed in the feed exchanger, and used as a reflux to the deethanizer. The remaining portion is expanded to about 450 psig entering the mid-section of the deethanizer. The deethanizer is a distillation column operated at about 20% below its critical pressure (600 psig). Higher operating pressure will reduce the relative volatility between components, making separation of the desirable components difficult if not impossible. The deethanizer produces a bottom liquid stream, which comprises the $C_{3+}$ NGL liquid containing heavy hydrocarbons and an overhead vapor stream or 'residue gas', which is heated in the feed exchanger prior to being re-compressed by one or more compressors for introduction to an LNG liquefaction plant. While the conventional expander process presents a solution for heavy hydrocarbon removal, the reduction in feed pressure (e.g., from 800 psig to 450 psig) at the deethanizer is a drawback. For example, for a feed gas rate of 830 MMscfd (91,870 lb mol/h), the recompression power is about 18,800 HP when the residue gas is required to be recompressed back to high pressure (e.g., 800 psig) to the LNG plant inlet.

Another option for removal of heavy hydrocarbons and aromatics is by the adsorption and regeneration using a two-step process, as described in U.S. Pat. No. 9,631,864 by Chen et al. The adsorption process operates in a temperature swing (TSA) fashion employing at least two adsorbents that are specifically designed to remove heavy hydrocarbons and aromatics. The process operates in a cyclic fashion, similar to the dehydration unit. Unlike earlier mentioned technologies, the adsorption process is carried out at the feed pressure and there is minimal pressure reduction. However, a difficulty with this approach is that the TSA process requires a high temperature heating medium, typically 600° F., for adsorbent regeneration. The high temperature is problematic with heavy hydrocarbons and aromatics due to potential coking and cracking problems, especially in the presence of a low level oxygen content, which is inherent in pipeline gas. A fired heater may cause cracking and other combustion problems at these high temperatures. To operate such a system, a high temperature hot oil system is utilized. To avoid reaction of aromatics by oxidation during the regeneration cycle, oxygen must be excluded using scavenger beds. In addition, to remove heavy hydrocarbons from the regeneration gas, chilling with condensate removal using propane refrigeration is necessary prior to recycling of the lean regeneration gas. Thus, while the TSA process minimizes recompression costs, the costs of heating and cooling duties during the regeneration cycle are significant. The multiple large high pressure adsorbent beds, the proprietary adsorbents, the cost of the heating and cooling equipment, and the complexity of the cyclic operation are disadvantages of this approach.

Another method for heavy hydrocarbon removal from lean gas to LNG liquefaction is described in U.S. Patent Application No. 2018/0017319 by Mak and Thomas. Via this approach, heavy hydrocarbons and aromatics are removed from a lean feed gas via the use of a physical solvent, operating at feed gas pressure. A physical solvent unit can be located upstream of an amine unit. The physical solvent unit typically employs DEPG (dimethylether of polyethylene glycol) or similar solvent that has high affinity towards heavy hydrocarbons and aromatics. While such a physical solvent can absorb hexane, heptane plus hydrocarbons and BTEX, high solvent circulation is required in order to meet the low hydrocarbons specification for an LNG plant, which may not be a viable solution. In addition, light hydrocarbon can be lost in the regeneration off-gas, which would reduce the gas product revenue, and may also increase carbon emissions.

Thus, although various configurations and methods are utilized to remove natural gas liquids (NGL) from a feed to an LNG liquefaction plant, systems and methods operable to remove only the heavy hydrocarbons and BTEX are limited, and not suitable for use with a lean pipeline gas (e.g., comprising from 0.1 to 0.5 GPM C3+). Accordingly, there is a need for systems and methods for the removal of heavy hydrocarbons and aromatics, including BTEX, from lean feed gases to LNG liquefaction.

SUMMARY

Herein disclosed is a method for removing heavy hydrocarbons from a feed gas, the method comprising: feeding, into an absorber, a top reflux stream and a second reflux stream below the top reflux stream, wherein the absorber produces an absorber bottom product stream and an absorber overhead product stream; depressurizing and feeding the absorber bottom product stream to a stripper to produce a stripper bottom product stream and a stripper overhead product stream; cooling and feeding a portion of the absorber overhead product stream back to the absorber as the top reflux stream; and pressurizing and feeding the stripper overhead product stream back to the absorber as the second reflux stream.

Also disclosed herein is a system for removing heavy hydrocarbons from a feed gas, the system comprising: an absorber, wherein the absorber is configured to receive a top reflux stream and a second reflux stream within a top portion of the absorber, receive an expanded feed gas stream at a bottom portion of the absorber, and produce an absorber bottom product stream and an absorber overhead product stream; a stripper, wherein the stripper is configured to receive a feed liquid and the absorber bottom product stream and produce a stripper overhead product stream and a stripper bottom product stream, wherein the stripper overhead product stream is configured to pass back to the absorber as the second reflux stream; a pressure reduction valve configured to reduce a pressure of the absorber bottom product stream between the absorber and the stripper; a compressor configured to pressurize the stripper overhead product stream from the stripper to form a compressed stripper overhead product stream; and a heat exchanger, wherein the heat exchanger is configured to cool and at least partially condense the compressed stripper overhead product stream to form the second reflux stream, and cool and at least partially condense a portion of the absorber overhead stream to form the top reflux stream.

Further disclosed herein is a system for removing heavy hydrocarbons from a feed gas, the system comprising: an absorber section and a stripper section, wherein the absorber section is configured to operate at a pressure higher than the stripper section, wherein the absorber section comprises: an absorber, wherein the absorber is configured to receive a top reflux stream and a second reflux stream within a top portion of the absorber, receive an expanded feed gas stream at a bottom portion of the absorber, and produce an absorber bottom product stream and an absorber overhead product stream, and wherein the stripper section comprises: a stripper, wherein the stripper is configured to receive a feed liquid and a reduced pressure absorber bottom product stream and produce a stripper overhead product stream and a stripper bottom product stream; a pressure reduction valve configured to reduce a pressure of the absorber bottom product stream to produce the reduced pressure absorber bottom product stream; and a compressor configured to pressurize the stripper overhead product stream from the stripper to form the second reflux stream.

Herein disclosed is a method for removing heavy hydrocarbons from a feed gas in an integrated NGL and LNG plant, the method comprising: chilling the feed gas in a propane pre-cooling train, further chilling in an integrated heat exchanger, and feeding into an absorber, a top reflux stream and a second reflux stream below the top reflux stream, wherein the absorber produces an absorber bottom product stream and an absorber overhead product stream; depressurizing and feeding the absorber bottom product stream to a stripper to produce a stripper bottom product stream and a stripper overhead product stream; cooling and feeding a portion of the compressed absorber overhead product stream back to the absorber as the top reflux stream; and pressurizing and feeding the stripper overhead product stream back to the absorber as the second reflux stream.

Also disclosed herein is a system for removing heavy hydrocarbons from a feed gas in an integrated NGL and LNG plant, the system comprising: chilling the feed gas in a propane pre-cooling train, further chilling in an integrated heat exchanger, an absorber, wherein the absorber is configured to receive a top reflux stream and a second reflux stream within a top portion of the absorber, receive an expanded feed gas stream at a bottom portion of the absorber, and produce an absorber bottom product stream and an absorber overhead product stream; a stripper, wherein the stripper is configured to receive a feed liquid and the absorber bottom product stream and produce a stripper overhead product stream and a stripper bottom product stream, wherein the stripper overhead product stream is configured to pass back to the absorber as the second reflux stream; a pressure reduction valve configured to reduce a pressure of the absorber bottom product stream between the absorber and the stripper; a compressor configured to pressurize the stripper overhead product stream from the stripper to form a compressed stripper overhead product stream; and a heat exchanger, wherein the heat exchanger is configured to cool and at least partially condense the compressed stripper overhead product stream to form the second reflux stream, and cool and at least partially condense a portion of the absorber overhead stream to form the top reflux stream.

Further disclosed herein is a system for removing heavy hydrocarbons from a feed gas in an integrated NGL and LNG plant, the system comprising: chilling the feed gas in a propane pre-cooling train, further chilling in an integrated heat exchanger, an absorber section and a stripper section, wherein the absorber section is configured to operate at a pressure higher than the stripper section, wherein the absorber section comprises: an absorber, wherein the absorber is configured to receive a top reflux stream and a second reflux stream within a top portion of the absorber, receive an expanded feed gas stream at a bottom portion of the absorber, and produce an absorber bottom product stream and an absorber overhead product stream, and wherein the stripper section comprises: a stripper, wherein the stripper is configured to receive a feed liquid and a reduced pressure absorber bottom product stream and produce a stripper overhead product stream and a stripper bottom product stream; a pressure reduction valve configured to reduce a pressure of the absorber bottom product stream to produce the reduced pressure absorber bottom product stream; and a compressor configured to pressurize the stripper overhead product stream from the stripper to form the second reflux stream.

While multiple embodiments are disclosed, still other embodiments will become apparent to those skilled in the art from the following detailed description. As will be apparent, some embodiments, as disclosed herein, are capable of modifications in various aspects without departing from the spirit and scope of the claims as presented herein. Accordingly, the detailed description hereinbelow is to be regarded as illustrative in nature and not restrictive.

BRIEF DESCRIPTION OF THE DRAWINGS

The following figures illustrate embodiments of the subject matter disclosed herein. The claimed subject matter may be understood by reference to the following description taken in conjunction with the accompanying figures, in which:

Figure 1A:
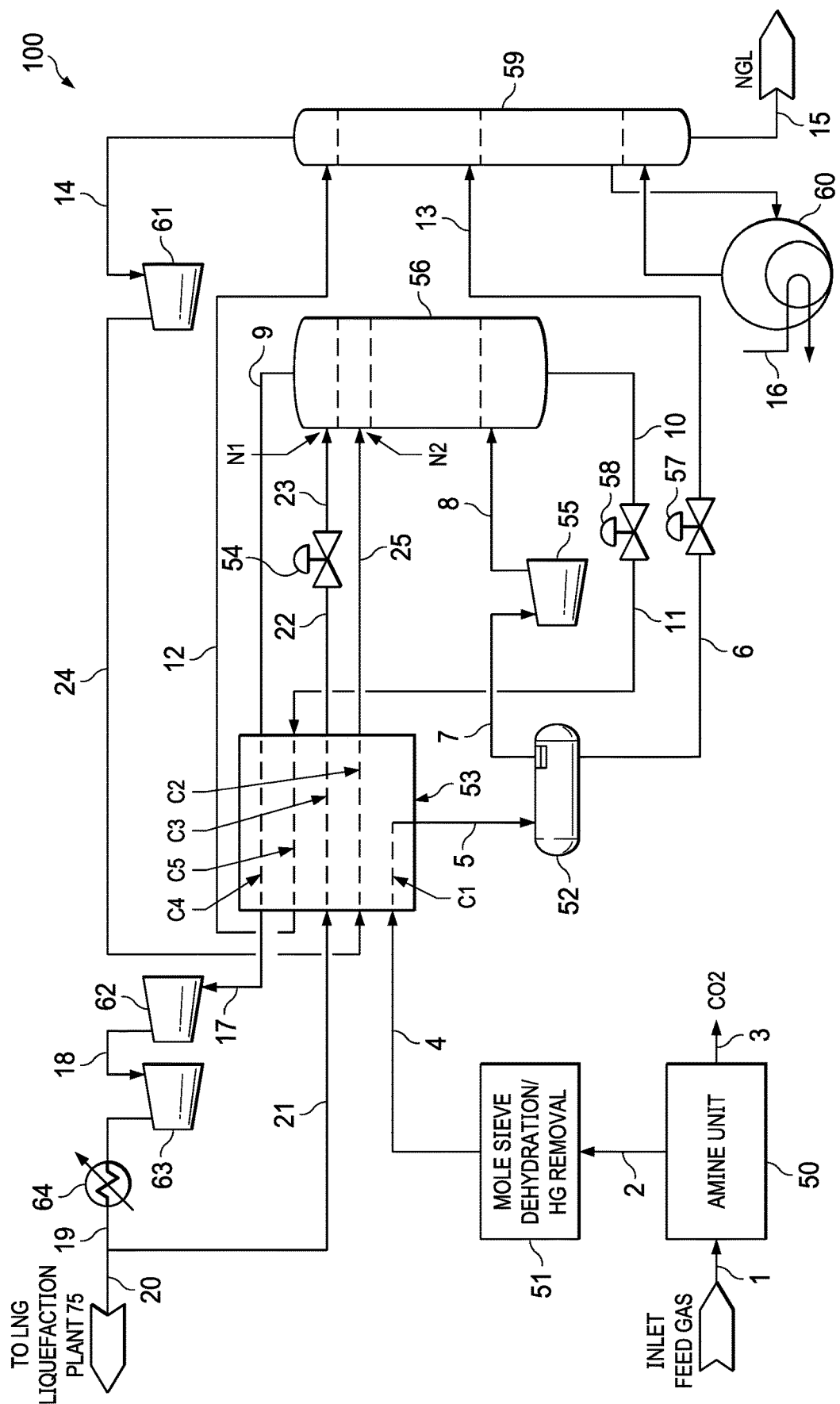
FIG. 1A is a schematic of a heavy hydrocarbon removal system 100, according to embodiments of this disclosure.

Various objects, features, aspects and advantages of the present invention will become more apparent from the following detailed description of embodiments of the invention.

DETAILED DESCRIPTION

It should be understood at the outset that although an illustrative implementation of one or more embodiments are provided below, the disclosed systems and methods may be implemented using any number of techniques, whether currently known or in existence. The disclosure should in no way be limited to the illustrative implementations, drawings, and techniques illustrated hereinbelow, including the exemplary designs and implementations illustrated and described herein, but may be modified within the scope of the appended claims along with their full scope of equivalents. Thus, while multiple embodiments are disclosed, still other embodiments will become apparent to those skilled in the art from the following detailed description. As will be apparent, some embodiments, as disclosed herein, are capable of modifications in various aspects without departing from the spirit and scope of the claims as presented herein. Accordingly, the detailed description hereinbelow is to be regarded as illustrative in nature and not restrictive.

While the following terms are believed to be well understood by one of ordinary skill in the art, the following definitions are set forth to facilitate explanation of the presently disclosed subject matter. Unless defined otherwise, all technical and scientific terms used herein have the same meaning as commonly understood to one of ordinary skill in the art to which the presently disclosed subject matter belongs.

As utilized herein a "top portion" of a column (e.g., an absorber or a stripper) indicates a top ⅓ of the height of a column.

As utilized herein, a "middle portion" of a column indicates a central ⅓ of the height of the column.

As utilized herein, a "bottom portion" of a column indicates a lower ⅓ of the height of the column.

As utilized herein, "$C_{\#+}$" indicates hydrocarbons having a number of carbons that is greater than or equal to the number #. For example, as utilized herein, "$C_{3+}$" indicates hydrocarbons having three or more carbons; as utilized herein, "$C_{5+}$" indicates hydrocarbons having five or more carbons; and, as utilized herein, "$C_{6+}$" indicates hydrocarbons having six or more carbons.

As utilized herein, "BTEX" and "BTX" include the compounds benzene, toluene, ethylbenzene, and xylene.

As utilized herein, "heavy hydrocarbons" include $C_{5+}$ hydrocarbons (e.g., such as, without limitation, hexane and BTEX) having five or more carbons.

As utilized herein, the term "about" in conjunction with a numeral refers to that numeral +/−10%, inclusive. For example, where a temperature is "about 100° F.", a temperature range of 90-110° F., inclusive, is contemplated.

As utilized herein, a "lean" inlet feed gas comprises a low $C_{3+}$ liquid content. For example, a lean inlet feed gas can comprise various levels of $C_{3+}$ liquid content, as described further hereinbelow, for example less than or equal to about 1, 0.9, 0.8, 0.7, 0.6, 0.5, 0.4, 0.3, 0.2, 0.1, or lower GPM $C_{3+}$ liquid content.

As utilized herein, reference to a "high pressure absorber" and a "low pressure stripper" indicate that the absorber is operated at a pressure that is relatively higher than an operating pressure of the stripper, and does not necessarily indicate that the low pressure stripper is operated at what is otherwise considered a low pressure or that the high pressure absorber is operated at a pressure that is otherwise considered a high pressure. As utilized herein, "high pressure" can indicate a pressure of the absorber (as described hereinbelow) or a pressure higher than an operating pressure of the stripper, while a "low pressure" can indicate a pressure of the stripper (as described hereinbelow) or a pressure lower than an operating pressure of the absorber.

In some LNG plants, the feed gas can be processed in a scrub column that is integrated into the liquefaction unit. Integrated scrub columns can be used in baseload LNG plants to remove heavy hydrocarbons, and recover refrigerants for makeup. This option requires adequate separation to occur in the column, which requires the system to operate at a pressure with adequate margin below the critical point. The feed gas pressure is required to be reduced (e.g., from 800 psig to 600 psig) to operate the scrub column. In this process, the feed gas is also pretreated in an amine unit and a dehydration and mercury removal unit. In a typical configuration, the treated gas stream is let down in pressure and cooled in a propane chiller (e.g., to −25° F.), and the resulting cooled stream is fed to a scrub column, typically operating at about 600 psig pressure or higher. The scrub column utilizes propane refrigeration or can be integrated with the LNG exchanger to generate reflux, producing a bottom $C_{3+}$ product containing the heavy hydrocarbons, and a lean overhead gas or 'residue' stream, depleted in heavy hydrocarbons. The residue gas can be fed directly or recompressed to 800 psig for introduction to a liquefaction plant. Utilization of the 600 psig scrub column results in a savings of compression power as compared to the conventional expander process. However, a lean gas feed may not contain enough NGL components to produce sufficient NGL loading on the trays to maintain reflux traffics in the column. Typically, the scrub column can operate with a feed gas with at least 2 GPM $C_{3+}$ liquid. If the $C_{3+}$ content is lower than 0.5 GPM, as in the case of U.S. pipeline gas, there is insufficient $C_{3+}$ to generate reflux to maintain a stable scrub column, which would result in slippage of heavy hydrocarbons to the overhead residue gas, resulting in shutdown of the LNG plant. Thus, there is a need for process to remove heavy hydrocarbons from a feed gas when there is insufficient $C_{3+}$ to generate reflux to maintain a stable scrub column.

The present disclosure provides systems and methods for the removal of heavy hydrocarbons from lean inlet feed gas streams. Such lean inlet feed gas streams can comprise, for example, from 0.1 to 0.5 GPM $C_{3+}$ liquid content. In some embodiments, heavy hydrocarbons and aromatics in a lean feed gas are removed according to this disclosure with a twin refluxes expander process utilizing a high pressure (e.g., between about 500 to 650 psig (3.4 to 4.5 MPa) or higher) absorber and a low pressure (e.g., less than or equal to about 400 psig (2.8 MPa)) deethanizer stripper (sometimes referred to herein for simplicity as a "stripper") that are closely coupled with a feed gas/residue gas/deethanizer stripper overhead gas/expander reflux system. A deethanizer stripper overhead can be recycled as a mid-reflux (also referred to herein as a 'second reflux') that can be recycled to a location within a top portion of the absorber, but below a top reflux thereto. A portion of a residue gas from the absorber after being compressed can be recycled to the absorber as a top reflux within a top portion of the absorber and above the second reflux. The system and method can provide a residue gas having a reduced content of hydrocarbons and aromatics, and suitable for LNG production. In some embodiments, the heavy hydrocarbons and aromatics content (e.g., the $C_{6+}$ content) of the product residue gas can be less than or equal to about 1.0, 0.9, 0.8, 0.7, 0.6, 0.5, 0.4, 0.3, 0.2, 0.1 or lower ppmv.

As noted above, some natural gas reservoirs are naturally lean and contain only small amounts of $C_{3+}$ components. However, a small amount of aromatics (e.g., BTX, including Benzene, Toluene, and Xylene) and $C_{5+}$ often remain in the gas. To avoid freezing in an LNG liquefaction exchanger, these components are required to be removed to very low levels (e.g., less than or equal to about 1 ppmv for BTX, less than or equal to about 0.1 volume percent (vol %) for $C_{5+}$, and less than or equal to about 100 ppmv for $C_{6+}$).

Recent U.S. LNG liquefaction plants utilize pipeline gas originated from residue gas from unconventional sources. Such pipeline gases are inherently lean. These lean gases are low in NGL content (propane and butane plus), typically with a $C_{3+}$ content in a range of from 0.1 to 0.5 GPM (gallons of liquid per thousand standard cubic feet of gas). Conventional LNG design is based on a feed gas with a much higher $C_{3+}$ liquid content, ranging from 2 to 6 GPM. As discussed herein, a typical LNG plant can be designed with a scrub column that utilizes the $C_{3+}$ components to remove the heavy hydrocarbons. If the $C_{3+}$ is below 0.5 GPM, as in the lean gases described above, the quantity of the $C_{3+}$ components is not sufficient to create traffic (e.g., liquid reflux) in the fractionation trays for scrubbing purposes. Any slippage of hexane and heavier hydrocarbons, particularly BTEX, can result in freezing in the liquefaction exchanger.

Table 1 shows typical gas compositions for North American pipeline gas, where lean refers to a gas having a lower than average $C_{3+}$ and/or BTX composition, and rich refers to a gas having a higher than average $C_{3+}$ and/or BTX composition.

TABLE 1

Typical North American Pipeline Gases

| Composition (mol %) | Lean | Average | Rich |
|---|---|---|---|
| Nitrogen | 0.432 | 0.399 | 0.414 |
| $CO_2$ | 0.005 | 0.000 | 0.001 |
| $H_2S$ | 0.000 | 0.000 | 0.000 |

TABLE 1-continued

Typical North American Pipeline Gases

| Composition (mol %) | Lean | Average | Rich |
|---|---|---|---|
| Methane | 96.943 | 95.910 | 94.135 |
| Ethane | 2.220 | 1.737 | 3.581 |
| Propane | 0.237 | 0.180 | 1.139 |
| i-Butane | 0.045 | 0.040 | 0.240 |
| n-Butane | 0.042 | 0.040 | 0.219 |
| i-Pentane | 0.020 | 0.020 | 0.000 |
| n-Pentane | 0.017 | 0.100 | 0.159 |
| n-Hexane plus | 0.019 | 0.003 | 0.051 |
| Benzene | 30 ppmv | 70 ppmv | 104 ppmv |
| Toluene | 20 ppmv | 15 ppmv | 50 ppmv |
| o-Xylene | 10 ppmv | 10 ppmv | 10 ppmv |
| C3 + GPM | 0.11 | 0.12 | 0.52 |

Table 2 shows the maximum limits of the heavy hydrocarbons and aromatics allowable to a typical LNG liquefaction plant. The maximum limits of heavy hydrocarbons may vary, depending on the liquefaction technology and the feed gas compositions. The limits are determined by the lowest liquefaction temperatures that may result in freezing of the feed gas, which in most cases, requires the aromatics and hexane content to stay below the maximum limits stated in Table 2. Conservative margins below these values are utilized in the selection of the pre-treatment process which operates under changes in varying feed gas compositions and/or mixed refrigerant compositions in the liquefaction cycle.

TABLE 2

Typical Maximum Heavy Hydrocarbon Limits to LNG Plant

| Component | Units | Specification |
|---|---|---|
| Carbon Dioxide | Ppmv | <50 |
| Water | Ppmv | <1 |
| Mercury | $ng/Sm^3$ | <10 |
| Hexane | Ppmv | <100 |
| n-Octane | Ppmv | <0.13 |
| n-Nonane | Ppmv | <0.002 |
| Benzene | Ppmv | <0.7 |
| Toluene | Ppmv | <10 |
| Xylene | Ppmv | <0.05 |

The present disclosure provides systems and methods for heavy hydrocarbon removal from an inlet feed gas comprising natural gas. The disclosed heavy hydrocarbon removal systems and methods can use an absorber and a stripper that are closely coupled with a feed gas/residue gas/refrigeration/expander reflux system. In some embodiments, the disclosed heavy hydrocarbon removal systems and methods can be utilized to provide a feed gas suitable for an LNG liquefaction plant or process from an inlet feed gas comprising a lean natural gas. Some embodiments can incorporate one or more propane pre-cooling heat exchanger(s) from a propane pre-cooling train of an LNG liquefaction plant, i.e., the propane pre-cooling train from the LNG plant is integrated (e.g., relocated and/or retrofitted via piping/conduit) into the embodiments of the disclosed systems and method upstream of the heavy hydrocarbon and BTEX removal (i.e., for cooling of the inlet gas upstream of the absorber/stripper before the heavy hydrocarbons and BTEX are removed by the absorber/stripper) to facilitate significant reduction in the cooling duty of other heat exchangers for the inlet gas as well as to facilitate a reduction in power requirements compressing the residue gas to suitable LNG liquefaction pressures, resulting in the lowest total specific power in the range of 275 to 280 kW/ton in the LNG plant.

Herein disclosed are systems and methods for removing heavy hydrocarbons from a feed gas, optionally in an integrated NGL and LNG liquefaction plant. The herein disclosed systems comprise two columns, including a high pressure absorber and a low pressure stripper. The absorber is configured for operation with dual reflux streams, including a top reflux and a second reflux. The top reflux stream and the second reflux stream can comprise primarily or greater than or equal to about 80, 85, 90, 91, 92, 93, 94, 95, 96, 97% or higher methane (e.g., from 80-100, 85-99, 90-97% methane).

A heavy hydrocarbon removal system of this disclosure will now be described with reference to FIG. 1A, which is a schematic of a heavy hydrocarbon removal system 100, according to some embodiments of this disclosure. A heavy hydrocarbon removal system according to this disclosure comprises two columns, including or consisting of an (e.g., high pressure) absorber 56 and a (e.g., low pressure) stripper 59 that can serve as a deethanizer, wherein the absorber 56 is refluxed by a stripper overhead product stream 14 that passes through a cold box 53 to become a reflux stream in line 25 and a high pressure residue gas in line 21 (e.g., a portion of the absorber overhead product stream) that passes through the cold box 53 to become a reflux stream in line 23, as described further hereinbelow. As used herein, a cold box such as cold box 53 is a multi-pass heat exchanger that can exchange heat between two or more streams. The multiple passes can also be referred to as cores, each of which is present within the cold box itself. In the embodiment of FIG. 1A, heavy hydrocarbon removal system 100 comprises absorber 56 and stripper 59.

The system 100 according to this disclosure further comprises a multi-pass heat exchanger, such as multi-pass heat exchanger 53 (which may also be referred to herein as a 'feed exchanger' 53) of the embodiment of FIG. 1A. As indicated in FIG. 1A, a heavy hydrocarbon removal system 100 according to this disclosure can further comprise an acid gas removal (AGR) unit 50 (also referred to herein as an 'amine unit 50'), a dehydration unit/mercury removal unit 51 (also referred to herein for brevity as a 'dehydration unit 51'), a separator 52, an expander 55, a pressure reduction valve 58, a reboiler 60, one or more residue gas compressors 62/63, and/or a residue gas chiller or heat exchanger 64 (also referred to as a 'residue gas ambient cooler 64'). System 100 further comprises associated piping and valves to control the flow throughout and/or product pressure. For example, system 100 can comprise one or more of valves 54, 57, and 58. Each component of a heavy hydrocarbon removal system 100 according to this disclosure will be described in more detail hereinbelow.

Heavy hydrocarbon removal system 100 can comprise an acid gas removal or AGR unit 50. When present, AGR unit 50 is operable to produce a substantially acid-gas free gas from an inlet feed gas introduced thereto via inlet feed gas line 1. As used herein, "acid-gas free" is utilized to mean substantially free, or less than about 4 ppmv hydrogen sulfide ($H_2S$), less than about 50 ppmv carbon dioxide ($CO_2$), or both. AGR unit 50 serves to remove acid gases, such as carbon dioxide and $H_2S$, via acid gas removal line 3, to meet sulfur specifications in the product gas (e.g., the product residue gas) and avoid freezing of the $CO_2$ in the downstream cryogenic process. An acid-gas free line 2 may be configured for the removal of acid-gas free inlet gas from AGR unit 50. AGR 50 can be any AGR unit known in the art, for example, in some embodiments AGR 50 is selected from amine units operable via, without limitation, methyldiethanolamine (MDEA), aminoethoxyethanol (diglycolamine) (DGA), monoethanolamine (MEA) or a combination thereof, optionally enhanced by a $CO_2$ activator, or other suitable solvents. Other acid gas removal units (e.g., those using adsorbents, etc.) can also be used.

Heavy hydrocarbon removal system 100 can further comprise a dehydration unit 51. When, present, dehydration unit 51 is operable to remove water from a gas introduced thereto. For example, dehydration unit 51 can be fluidly connected with AGR unit 50 via acid-gas free line 2, whereby acid-gas free inlet gas (i.e., inlet feed gas substantially free of acid gas) can be introduced into dehydration unit 51 from AGR unit 50. Dehydration unit 51 can be any apparatus known to those of skill in the art to be suitable for the removal of water from a gas stream introduced thereto, to avoid water freezing in the downstream cryogenic unit. In some embodiments, dehydration unit 51 is operable to reduce the water content of a feed gas thereto to a level of less than or equal to about 0.1 or lower ppmv. By way of example, in some embodiments, dehydration unit 51 can be selected from molecular sieve dehydration units that utilize molecular sieves operable to remove water to the ppmv levels. Dried, acid-gas free inlet feed gas can be produced from dehydration unit 51 via dried, acid-gas free inlet feed gas line 4. Dehydration unit 51 can, in some embodiments, also include a mercury removal bed that is designed to reduce mercury levels to a specified level, for example to the mercury specification provided in Table 2. Optionally, the mercury bed(s) can be placed upstream of amine unit 50.

While described herein as comprising an AGR unit 50 and dehydration unit 51, such units may be optional and may not be present if the inlet feed gas has an acid gas content below a threshold as required to avoid carbon dioxide freezing and is dried to the ppm levels of water content to meet the processing specifications.

Heavy hydrocarbon removal system 100 comprises a multi-pass feed exchanger 53. Multi-pass heat exchanger 53 can be configured to cool and at least partially condense a portion of a compressed absorber overhead stream (e.g., in absorber overhead line 9 described further hereinbelow) to form a top reflux stream (e.g., in top reflux line 22) to the absorber (e.g., absorber 56 described further hereinbelow) and to cool and at least partially condense a compressed stripper overhead product stream (e.g., in condensed stripper overhead line 24 described further hereinbelow) to form a second reflux stream (e.g., in second reflux line 25) to the absorber. In some embodiments, the multi-pass heat exchanger 53 can be further configured to cool and partially condense the inlet feed gas (e.g., in inlet feed gas line 4) to produce a feed gas and a feed liquid.

Multi-pass heat exchanger 53 can be any heat exchanger known in the art that is suitable to provide the various streams described herein. In some embodiments, multi-pass heat exchanger 53 is a brazed aluminum exchanger. Multi-pass heat exchanger 53 comprises a plurality of passes or 'cores', and can, in some embodiments, comprise at least five (5), six (6), or seven (7) cores. The plurality of cores may include one or more of a feed gas core C1, a stripper overhead core C2, a high pressure residue gas core C3, an absorber overhead core C4, and an absorber bottoms core C5.

Multi-pass heat exchanger 53 can utilize refrigeration content of an absorber bottoms (e.g., absorber bottoms in absorber bottom line 11, described hereinbelow) and an absorber overhead (e.g., absorber overhead or 'residue gas' in absorber overhead line 9, described hereinbelow) to cool a stripper overhead (e.g., compressed stripper overhead in compressed stripper overhead line 24 described hereinbelow), to cool the inlet feed gas (e.g., the inlet feed gas in line 4 as a dried, acid-gas free inlet feed gas) and to cool a high pressure residue gas (e.g., high pressure residue gas in high pressure residue gas recycle reflux line 21), to provide refluxes (e.g., in top reflux line 22/23 and/or second reflux line 25, described hereinbelow) to the absorber (e.g., absorber 56 described hereinbelow) for recovery of the desired components.

As noted hereinabove, dried, acid-gas free inlet feed gas line 4 may be configured to introduce the inlet feed gas into feed gas core C1 of multi-pass heat exchanger 53, wherein the inlet feed gas can be cooled and at least partially condensed to form a chilled feed in chilled feed line 5, wherein the chilled feed comprises a feed gas and a feed liquid. Heavy hydrocarbon removal system 100 can further comprise a separator 52 (also referred to herein as a 'cold separator 52') configured to receive and separate the feed gas and the feed liquid into separate streams. Separator 52 is any vapor/liquid separator known to those of skill in the art to be suitable to separate a separator feed stream introduced thereto via chilled feed line 5 into a vapor stream and a liquid stream. In some embodiments, the separator 52 can be a flash vessel. Separator vapor line 7 can be configured to remove, from separator 52, vapor separated from the separator feed, and separator liquid line 6 can be configured to remove, from separator 52, liquid separated from the separator feed. Separator vapor line fluidly connects separator 52 with expander 55, and separator liquid line 6 fluidly connects separator 52 with stripper 59 via valve 57.

Heavy hydrocarbon removal system 100 comprises expander 55, configured to receive the feed gas from the separator via separator vapor line 7 and expand the feed gas to produce an expanded feed gas stream. Expander 55 is thus configured to reduce the pressure of the vapor introduced thereto via vapor line 7 and provide an expander discharge stream. Expander 55 is any expander known in the art to be operable to provide the expansion described herein while producing work. Expander 55 can comprise a turbo expander, in some embodiments. An absorber inlet line 8 can fluidly connect expander 55 and absorber 56, whereby the expander discharge stream produced in expander 55 can be introduced into absorber 56 as an expanded feed gas stream. The work generated by the expander can be used in any other portions of the plant including any compressor requiring work such as compressor 61, compressor 62, and/or compressor 63.

Heavy hydrocarbon removal system 100 comprises an absorber, wherein the absorber is configured to receive a top reflux stream and a second reflux stream within a top portion of the absorber, receive the expanded feed gas stream at a bottom portion of the absorber, and produce an absorber bottom product stream and an absorber overhead product stream. As the absorber is generally operated at a higher pressure than a pressure at which the stripper is operated according to some embodiments of this disclosure, the absorber may be referred to herein as a 'high pressure' absorber, and the stripper as a 'low pressure' stripper. For example, In some embodiments, an absorber of this disclosure can be configured for or operated at pressures in the range of from about 500 to about 675 psig (about 3.4 to about 4.7 MPa), from about 500 to about 620 psig (about 3.4 to about 4.3 MPa), from about 525 to about 650 psig (about 3.6 to about 4.5 MPa), from about 550 to about 675 psig (about 3.8 to about 4.7 MPa), or greater than or equal to about 500, 650, or 675 psig (3.4, 4.5, or 4.7 MPa); while a stripper of this disclosure can be configured for or operated at pressures in the range of from about 390 to about 475 psig (about 2.7 to about 3.3 MPa), from about 390 to about 420 psig (about 2.7 to about 2.9 MPa), from about 420 to about 440 psig (about 2.9 to about 3.0 MPa), from about 450 to about 475 psig (about 3.1 to about 3.3 MPa), or less than or equal to about 420, 450, or 475 psig (2.9, 3.1, or 3.3 MPa). As generally known, the pressure at which the absorber and/or stripper operates can occur over a range as well as a temperature profile based on the thermodynamic properties of the fluids within the column. The specification of a temperature and/or pressure can therefore occur at any point within the column.

Absorber 56 comprises any suitable column known in the art to be operable to provide the separations noted hereinbelow. Absorber inlet or feed line 8 (also referred to as 'expander discharge line 8') can be configured to introduce an absorber feed gas comprising separator vapor from separator vapor line 7 into absorber 56. In some embodiments the absorber feed gas can be introduced into absorber 56 at a bottom portion of absorber 56, e.g., at a location in the bottom one third of the absorber column. Two absorber reflux lines can be configured to introduce absorber reflux into absorber 56. A top reflux line 22/23 can be configured to introduce cooled, high pressure residue recycle absorber reflux or "top" reflux from multi-pass heat exchanger 53 to absorber 56 such that, following passage through high pressure residue gas core C3 of multi-pass heat exchanger 53 for cooling/condensing, the components of the high pressure residue gas recycled in high pressure residue gas recycle line 21 can be introduced into a top portion of absorber 56 as the top reflux. The top reflux can be introduced above the stripper overhead vapor derived reflux or 'second' reflux introduced into absorber 56 via second reflux line 25, described hereinbelow. Second reflux line 25 can be configured to introduce chilled stripper overhead, produced via passage via stripper overhead line 14, compressor 61, and compressed stripper overhead line 24 through stripper overhead core C2 of multi-pass heat exchanger 53 for cooling/condensing, into a top portion of absorber 56, e.g., at a location in the top one third of the absorber 56.

A pressure reduction valve 54 may be positioned on top reflux line 22 to control the flow and/or adjust the pressure of the chilled, high pressure residue recycle absorber top reflux stream extracted from multi-pass heat exchanger 53 via high pressure residue recycle absorber top reflux line 22, prior to introduction of the top reflux into absorber 56 via line 23. Use of the pressure reduction valve 54 can result in at least a portion of stream 22 forming a liquid to serve as reflux prior to entry into the absorber 56. As the herein-disclosed operation can utilize a portion of the high pressure residue gas that is subcooled in multi-pass heat exchanger 53 and letdown in pressure in pressure reduction valve 54 as a top reflux stream to absorber 56, absorber 56 can be constructed with two reflux nozzles or injection points, with a top nozzle N1 supplied by the high pressure residue gas liquid reflux in residue gas recycle absorber top reflux line 22, and a second nozzle N2 supplied by the feed liquid from the stripper overhead condensed in stripper overhead core C2 of multi-pass heat exchanger 53 via second reflux line 25.

An absorber overhead line 9 can be configured to extract absorber overhead from absorber 56 and pass the absorber overhead through absorber overhead core C4 of multi-pass heat exchanger 53 for heat exchange. After passing through the multi-pass heat exchanger 53, one or more residue gas compressors, such as first and second residue gas compressors 62 and 63 of the embodiment of FIG. 1A can be configured to compress the absorber overhead or 'residue gas' in line 17 following heat exchange in absorber overhead core C4 of multi-pass heat exchanger 53. An inter-compressor line 18 may fluidly connect first residue gas compressor 62 and second residue gas compressor 63. A residue gas chiller or heat exchanger 64 may be configured to further adjust the temperature of the compressed residue gas, and provide a high pressure residue gas in high pressure, cooled residue gas line 19. High pressure residue gas recycle reflux line 21 is configured to introduce a portion of the high pressure, compressed residue gas in high pressure, cooled residue gas line 19 into high pressure residue gas core C3 of multi-pass heat exchanger 53. Remaining high pressure residue gas (e.g., also referred to herein as a second portion of the absorber overhead product stream) may be removed from NGL recovery system 100 via residue gas product line 20. The high pressure residue gas in line 20 can be a product feed that is sent to an LNG liquefaction facility to form LNG, wherein the composition of the high pressure residue gas in line 20 can have a composition meeting the specifications as described in Table 2 above.

An absorber bottom line 10 can be configured for removal of absorber bottoms from absorber 56. Heavy hydrocarbons removal system 100 can further comprise a pressure reduction valve configured to reduce a pressure of the absorber bottom product stream between the absorber 56 and the stripper 59. For example, a pressure reduction valve 58 may be utilized to reduce the pressure of the absorber bottoms in absorber bottom line 10 to stripper 59. In some embodiments, pressure reduction valve 58 can comprise a Joule-Thomson (JT) valve. Absorber bottoms stream line 10 can be configured to pass the absorber bottoms from absorber bottom line 10 through absorber bottoms core C5 of multi-pass heat exchanger 53 for chilling prior to introduction into stripper 59 via stripper feed line 12.

Heavy hydrocarbon removal system 100 comprises stripper 59. Stripper 59 can be configured to receive a feed liquid in line 13 and the absorber bottom product stream in line 12 and produce a stripper overhead product stream in line 14 and a stripper bottom product stream in line 15, where the stripper overhead product stream is configured to pass back to the absorber 56 as the second reflux stream. Stripper 59 can be any column known in the art to be operable to receive the streams described herein and perform the separation of the components to produce the stripper overhead product stream and the stripper bottom product stream. In some embodiments, stripper 59 comprises a fractionation column. Stripper 59 can be operable as a deethanizer. Stripper 59 may be operable with a reboiler 60. An NGL product or 'stripper bottom' line 15 is fluidly connected with a bottom of stripper 59 for the removal therefrom of a stripper bottoms comprising the NGL product. A heat source such as a hot medium, oil, or steam inlet line 16 may be configured to supplement the heat duty in the reboiler 60 for stripping the ethane content in the NGL product in NGL product or stripper bottoms stream 15 (e.g., to less than 1 to 2 mole percent (mol %) ethane). The amount of NGL (C3 and C4) content in the bottom product can be varied by adjusting the absorber bottom temperature from the multi-pass exchanger. A stripper overhead line 14 may be configured for the removal of stripper overhead from stripper 59 and introduction into compressor 61. As noted previously, stripper overhead line 24 can be configured to pass the compressed stripper overhead from compressor 61 through stripper overhead core C2 for chilling prior to introduction as the second reflux into absorber 56 via second reflux line 25. The resulting chilling in the stripper overhead core C2 can result in at least a portion, or substantially all, of the stripper overhead product stream forming a liquid for reflux in the absorber 56.

As mentioned hereinabove, heavy hydrocarbon removal system 100 can further comprise a compressor configured to pressurize the stripper overhead product stream from the stripper to form a compressed stripper overhead product stream. For example, heavy hydrocarbon removal system 100 can comprise a compressor 61 configured to increase the pressure of the stripper overhead in stripper overhead line 14 prior to introduction into absorber 56 via passage through compressed stripper overhead line 24 and multi-pass heat exchanger 53 via stripper overhead core C2.

In some embodiments, a combined mass flow rate of the stripper feed liquid in separator liquid line 6 and the absorber bottoms stream in absorber bottom lines 10/11 introduced into stripper 59 is less than 5%, 4%, 3%, 2%, 1%, or 0.8% of a mass flow rate of the inlet gas in inlet feed gas line 1 or chilled feed line 5. Utilization, as per this disclosure, of a relatively smaller low pressure stripper than conventional expander processes reduces an amount of recompression of the residue gas required upstream of LNG liquefaction. For example, recompression in compressor 61 is significantly reduced relative to conventional heavy hydrocarbon NGL recovery plants.

The relatively small mass flow rate to the stripper can provide a design in which the stripper is relatively small as compared to the absorber. In some embodiments, a ratio of an internal diameter of the absorber 56 to an internal diameter of the stripper 59 can be greater than 3:1, 4:1, 5:1, 6:1, or 7:1.

In some embodiments, the herein disclosed heavy hydrocarbon removal systems (e.g., system 100 and those systems 200 and 300 described below) and methods can be utilized to produce an ethane rich residue gas (e.g., residue gas in residue gas product line 20) and a propane-enriched NGL product (e.g., in NGL product line 15) comprising less than 1 volume percent ethane content.

A description of the herein-disclosed methods for operating heavy hydrocarbon removal system 100 of this disclosure will now be provided with reference to FIG. 1A. Plant inlet feed gas is introduced via plant inlet feed gas line 1. The inlet feed gas comprises methane, ethane, propane, and can comprise heavier hydrocarbons. With respect to suitable inlet feed gas streams, it is contemplated that different inlet feed gas streams are acceptable. With respect to the gas compositions, it is generally suitable that the inlet feed gas stream comprises predominantly $C_1$-$C_6$ and heavier hydrocarbons, and may further comprise nitrogen and/or other inert and/or non-hydrocarbon compounds. Suitable inlet feed gas streams include conventional and unconventional gases, such as shale gases, associated and non-associated gases from oil and gas production. In some embodiments, the plant inlet feed gas comprises ethane and hydrocarbons liquids content in a range of from about 3.0 to about 0.5, from about 3.0 to about 2.0, from about 1.5 to about 1.0, or from about 0.9 to about 0.5 GPM (gallons of liquid of C2+ per thousand standard cubic feet of gas). In some embodiments, the inlet feed gas comprises less than 3.0, 2.0, 1.5, 1.0, 0.5, 0.1, or lower gallons per thousand cubic feet (GPM) of gas of $C_{3+}$ components.

The plant inlet feed gas may be supplied at a pressure in the range of from about 600 to about 1000 psig or higher (from about 4.1 to about 6.9 MPa), from about 650 to about 850 psig (from about 4.5 to about 5.9 MPa), or from about 800 to about 1100 psig (from about 5.5 to about 7.6 MPa), or a pressure of greater than or equal to about 600, 700, 800, 850, 900, 1000 or 1100 psig (4.1, 4.8, 5.5, 5.9, 6.2, 6.9, or 7.6 MPa). The plant inlet feed gas may be supplied at a temperature in the range of from about 60° F. to about 130° F. (from about 15° C. to about 54° C.), from about 50° F. to about 85° F. (from about 10° C. to about 29° C.), or from about 85° F. to about 130° F. (from about 29° C. to about 54° C.), or a temperature of greater than or equal to about 50° F., 60° F., 65° F., 70° F., 75° F., 80° F., 85° F., or 120° F. (10° C., 15.5° C., 21.1° C., 23.9° C., 26.7° C., 29.4° C., or 48.9° C.).

The inlet feed gas may be treated to remove at least a portion of any acid gas in AGR unit 50, and acid gases can be removed via acid gas line 3. In some embodiments, the acid gas removal can be optional when a feed gas composition contains acid gases below an acid gas threshold (e.g., a composition that meets feed gas specifications). A substantially acid-gas free inlet feed gas may be introduced into dehydration unit 51, for example via acid-gas free inlet feed line 2. Within dehydration unit 51, the feed gas can be dried to meet processing thresholds, thus producing a dried, acid-gas free gas 4 to the NGL recovery unit. While referred to as a dried, acid-gas free gas, the gas may have a water and acid gas composition below a threshold rather than being entirely free of water and any acid gases.

In some embodiments, the dried, acid-gas free inlet feed gas in dried, acid-gas free inlet feed gas line 4 can have a pressure in the range of from about 600 to about 1000 psig (from about 4.1 to about 6.9 MPa), from about 650 to about 850 psig (from about 4.5 to about 5.9 MPa), or from about 800 to about 1100 psig (from about 5.5 to about 7.6 MPa), or a pressure of greater than or equal to about 600, 700, 800, 850, 900, 1000 or 1100 psig (4.1, 4.8, 5.5, 5.9, 6.2, 6.9, or 7.6 MPa). The dried, acid-gas free inlet feed gas in dried, acid-gas free inlet feed gas line 4 may have a temperature in the range of from about 60° F. to about 130° F. (from about 15° C. to about 54° C.), from about 50° F. to about 85° F. (from about 10 to about 29° C.), or from about 85° F. to about 130° F. (from about 29° C. to about 54° C.), or a temperature of greater than or equal to about 50° F., 60° F., 65° F., 70° F., 75° F., 80° F., 85° F., or 120° F. (10° C., 15.5° C., 21.1° C., 23.9° C., 26.7° C., 29.4° C., or 48.9° C.).

The dried, acid-gas free inlet feed gas in dried, acid-gas free inlet feed gas line 4 can be chilled and partially condensed via passage through feed gas core C1 of multi-pass heat exchanger 53, providing a cooled feed stream in separator feed line 5. The separator feed stream may have a temperature of less than or equal to about −40° F., −50° F., or −60° F. (−40° C., −45.5° C., or −51.1° C.). Cooling of the dried, acid-gas free inlet feed gas via passage through feed gas core C1 of multi-pass heat exchanger 53 can be affected by heat exchange with absorber overhead vapor in absorber overhead line 9 and absorber bottom liquid in absorber bottom line 11.

Within separator 52, the separator feed stream can be separated into a cold separator vapor, which can exit separator 52 via separator vapor stream line 7, and a cold separator liquid, which can exit separator 52 via separator liquid stream line 6. The amount of liquid dropout in separator 52 can depend on the heavy hydrocarbon content in the inlet feed gas (and thus in the separator feed stream in separator feed line 5). For lean inlet feed gases having less than 0.5 GPM $C_{3+}$, liquid condensate produced and extracted via separator liquid line 6 may be minimal.

The vapor stream in separator vapor line 7 from separator 52 can be let down in pressure in a pressure reduction device such as an expander (e.g., turbo expander) 55 prior to introduction into absorber 56. For example, expander 55 can reduce the pressure of the separator vapor in separator vapor line 7 to a pressure for operation in absorber 56, e.g., to a pressure of less than or equal to about 650, 600, 550, 540 or 530 psig (4.5, 4.1, 3.8, 3.7, or 3.65 MPa), which can result in cooling of the gas to less than or equal to about −60° F., −80° F., or −100° F. (−51° C., −62° C., or −73° C.), prior to being introduced into absorber 56 via absorber feed line 8. Absorber feed line 8 can introduce absorber feed in absorber feed line 8 into a bottom portion of absorber 56. If the inlet feed gas is higher (e.g., 1100 psig (7.6 MPa)), the absorber pressure can be higher, for example 650 psig (4.5 MPa) or higher to reduce recompression cost (e.g., via residue gas compressors 62 and/or 63). In some embodiments, expander 55 can be operated with an expansion ratio of greater than or equal to about 1.3, 1.4, 1.5, 1.6, or 1.7.

Stripper 59 can be operated as a deethanizer. As noted hereinabove, stripper 59 can be configured for operation at a lower pressure than absorber 56. For example, in some embodiments, stripper 59 can be operated at a pressure that is in the range of from 100 to 200 psi (0.7 to 1.4 MPa) or at least about 75, 100, 200 or 250 psi (0.5, 0.7, 1.4, or 1.7 MPa) lower than a pressure at which the absorber is operated. In some embodiments, stripper 59 can be operated at a pressure of less than or equal to about 500, 450, 425, or 400 psig (3.4, 3.1, 2.9, or 2.8 MPa). The cold separator liquid in separator liquid line 6 can be let down in pressure, for example, via pressure reduction device such as valve 57, and chilled to, for example, less than or equal to about −40° F., −60° F., or −75° F. (−40° C., −51° C., or −59° C.) prior to being introduced into stripper 59 via stripper feed line 13. In some embodiments, stripper feed line 13 can introduce pressure reduced liquid from separator 52 to stripper 50 at a location within a middle portion of stripper 59. The cold separator vapor (e.g., in separator vapor line 7) can be expanded in an expander (e.g., in turbo expander 55) and fed to a lower portion (e.g., within a lower third, including at the bottom) of the absorber 56 (e.g., to absorber 56 via absorber inlet line 8).

Stripper 59 can produce a stripper bottoms in stripper bottom line 15 that comprises NGL, and an overhead vapor in stripper overhead line 14. In some embodiments, the reboiler 60 of the stripper 59 can be operated using hot oil or steam as the heating medium to reboil a portion of the NGL and/or liquids from a lower tray to serve as a vapor phase or reflux for the stripper 59. For example, a heat medium such as hot oil or steam (indicated at line 16) can be utilized to supplement the heating duty in the reboiler 60. The reboiler 60 can be operated to control the methane and ethane content in the NGL product stream in NGL product line 15. For example, In some embodiments, reboiler 60 can be operated for stripping the ethane content in the NGL product in stripper bottom line 15 to an ethane content of less than or equal to about 2%, 1%, or 0.5% mol %. In some embodiments, the reboiler 60 can be operated for providing a methane content in the NGL product in stripper bottom line 15 to a methane content of less than or equal to about 2%, 1%, or 0.5% mol %. The extent of stripping and ethane content in the NGL can be set by the NGL product specification and/or the sales gas heating value specification. For example, if there are no markets for the ethane product, stripping can be increased to produce an NGL with very low ethane content, such that the NGL can be sold as a liquid fuel product. However, if the inlet feed gas contains a significant amount of ethane, sufficient ethane can be removed from the residue gas such that the sales gas heating value can be met.

In this case, more ethane will be contained in the NGL by operating the stripper at a lower bottom temperature.

The stripper bottoms in NGL product line 15 can be further concentrated in heavy hydrocarbons relative to an amount thereof in the absorber bottoms in absorber bottom line 10. For example, the stripper bottoms can comprise greater than or equal to about 90, 95, or 99% weight percent of the heavy hydrocarbons (e.g., hexane, BTEX, benzene, toluene, xylene, or a combination thereof) in the inlet feed gas. In some embodiments, for example when there is a market for aromatics, the NGL product stream in NGL product stream line 15 can be further fractionated to produce a required product. In some embodiments, the herein-disclosed system 100 and method can be utilized to reject ethane while maintaining over 98 vol % propane recovery in the NGL. In some embodiments, the NGL product stream comprises from about 0.1 to about 5.0, from about 30 to about 75, from about 90 to about 95% of the propane in the inlet feed gas. The propane can be utilized for propane makeup for the refrigeration compressors, in some embodiments.

In some embodiments, the stripper overhead vapor extracted from stripper 59 via stripper overhead line 14 has a temperature in the range of from about 0.0 to about −25° F. (from about −17.8 to about −31.7° C.), from about 0.0 to about −5° F. (from about −17.8 to about −20.6° C.), from about −10 to about −15° F. (from about −23.3 to about −26.1° C.), from about −20 to about −25° F. (from about −28.9 to about −31.7° C.), or a temperature of less than or equal to about −25, 0, or 15° F. (−31.7, −17.8, or −9.4° C.), and the stripper bottoms stream extracted from stripper 59 via stripper bottom line 15 has a temperature in the range of from about 280 to about 325° F. (from about 137.8 to about 162.8° C.), from about 280 to about 300° F. (from about 137.8 to about 148.9° C.), from about 295 to about 315° F. (from about 146.1 to about 157.2° C.), from about 300 to about 325° F. (from about 148.9 to about 162.8° C.), or a temperature of greater than or equal to about 320, 290, or 250° F. (160, 143.3, or 121.1° C.). It is noted that the temperature profile in a column covers a range. The temperature can be typically hottest at the bottom and lowest at the top. While the temperature profile will depend on the pressure and composition of the material in the column, the temperature at the bottom can generally be around the boiling point of the bottoms stream at the column pressure, and the top can generally be around the boiling point (or condensation point) of the overhead stream at the column pressure.

Stripper overhead vapor stream in stripper overhead line 14 can be routed to multi-pass heat exchanger 53 via compressor 61, whereby the stripper overhead vapor can be compressed to provide compressed stripper overhead in compressed stripper overhead line 24. Compressor 61 can increase the pressure of the stripper overhead to a pressure sufficient to allow the stripper overhead to be introduced into the absorber 56, which can be a pressure in a range of from about 600 to about 680 psig (from about 4.1 to about 4.7 MPa), from about 600 to about 625 psig (from about 4.1 to about 4.3 MPa), from about 625 to about 650 psig (from about 4.3 to about 4.5 MPa), from about 635 to about 680 psig (from about 4.4 to about 4.7 MPa), or greater than or equal to about 610, 650 or 680 psig (4.2, 4.5, or 4.7 MPa). Compressed stripper overhead in compressed stripper overhead line 24 can be chilled via passage through stripper overhead core C2 of multi-pass heat exchanger 53 prior to feeding the absorber as second reflux via absorber second reflux line 25. Within feed exchanger 53, the compressed stripper overhead can be chilled to a temperature of less than or equal to about −60° F., −80° F., or −100° F. (−51° C., −62° C., or −73° C.) prior to introduction into absorber 56 as second reflux in second reflux line 25. In some embodiments, the second reflux stream in second reflux line 25 comprises primarily, or greater than or equal to about 70, 80, 85, 90, 95, or 97% methane. The second reflux can be introduced as a mid-reflux to absorber 56, for example via second nozzle N2 at a location within a top portion of absorber 56 below introduction via first nozzle N1 of the top reflux in top reflux line 23.

In some embodiments, absorber 56 can be operated at a pressure of less than or equal to about 675, 650, 635, 620 or 600 psig (4.7, 4.5, 4.4, 4.3, or 4.1 MPa). As noted hereinabove, absorber 56 is refluxed with two separate reflux streams, a first or top reflux stream from high pressure residue gas in high pressure residue gas recycle line 21 and a second reflux stream from the compressed stripper overhead in compressed stripper overhead line 24. Compressed stripper overhead in compressed stripper overhead line 24 and recycle residue gas in recycle residue gas line 21 are chilled with the use of feed exchanger 53 to a temperature of less than or equal to about −60° F., −80° F., or −100° F. (−51° C., −62° C., or −73° C.) prior to refluxing absorber 56.

Absorber 56 can be operated to produce an absorber overhead stream, which can be extracted therefrom via absorber overhead line 9, and an absorber bottoms stream, which can be extracted therefrom via absorber bottom line 10. In some embodiments, absorber 56 can be operated to produce an ethane rich absorber bottoms extracted via absorber bottom line 10 and a propane depleted absorber overhead vapor extracted via absorber overhead line 9. In some embodiments, the absorber bottom stream in absorber bottom line 10 can be concentrated with heavy hydrocarbons.

In some embodiments, the absorber overhead vapor extracted from absorber 56 via absorber overhead line 9 has a temperature of less than or equal to about −50° F., −75° F., −95° F., or −130° F. (−46° C., −59° C., −71° C., or −90° C.), and the absorber bottoms stream extracted from absorber 56 via absorber bottom line 10 has a temperature of less than or equal to about −50° F., −75° F., or −95° F. (−46° C., −59° C., or −71° C.).

In some embodiments, the absorber bottoms liquid in absorber bottom line 10 can be let down in pressure in pressure reduction device such as pressure reduction valve 58. For example, in some embodiments, the absorber bottoms in absorber bottom line 10 has a pressure greater than or equal to about 650, 600, 550, 540 or 530 psig (4.5, 4.1, 3.8, 3.7, or 3.65 MPa). In some embodiments, the reduced pressure absorber bottoms in reduced pressure absorber bottom line 11 has a pressure less than or equal to about 400 psig (2.8 MPa).

The reduced pressure absorber bottoms stream in absorber bottoms stream line 11 can be passed through absorber bottoms core C5 of multi-pass heat exchanger 53 to form the stripper feed in stripper feed line 12 prior to feeding to the top (e.g., the top tray) of stripper 59. The stripper feed in stripper feed line 12 can have a temperature in the range of from about −20, 0, or 20 to about 0, 20, or 40° F. (from about −28.9, −17.8, or 4.4 to about −17.8, −6.7, or 4.4° C.), from about −20 to about 0° F. (from about −28.9 to about −17.8° C.), from about 0 to about 20° F. (from about −17.8 to about −6.7° C.), from about 20 to about 40° F. (from about −6.7 to about 4.4° C.), or a temperature of less than or equal to about −10, 10, or 40° F. (−23.3, −12.2, or 4.4° C.).

Absorber overhead can be produced from absorber 56 via absorber overhead line 9. The absorber overhead may be passed through absorber overhead core C4 of multi-pass heat exchanger 53. Heat exchange within feed exchanger 53 can increase the temperature of the absorber overhead to provide a heat exchanged absorber overhead in line 17 having a temperature in the range of from about −80, −90, −100, or −110 to about −90, −100, −110, or −120° F. (from about −62.2, −67.8, −73.3, or −78.9 to about −67.8, −73.3, −78.9, or −84.4° C.), from about −110 to about −120° F. (from about −78.9 to about −84.4° C.), from about −100 to about −110° F. (from about −73.3 to about −78.9° C.), from about −80 to about −90° F. (from about −62.2 to about −67.8° C.), or a temperature of greater than or equal to about −120, −110, −100, −90, or −80° F. (−84.4, −78.9, −73.3, −67.8 or −62.2° C.).

The refrigerant content in the absorber bottoms (e.g., in absorber bottoms stream line 10) and the absorber overhead (e.g., in absorber overhead stream line 9) can be recovered (e.g., in multi-pass heat exchanger 53) in generating reflux (e.g., top and second reflux) for the absorber, thereby reducing the refrigeration horsepower consumption and the reboiler duty in the stripper (e.g., in stripper reboiler 60).

Following passage through multi-pass heat exchanger 53, the absorber overhead line may be compressed, for example, via introduction of absorber overhead or residue gas line 17 into first residue gas compressor 62, and optionally introduction of the compressed residue gas from first residue gas compressor 62 into a second residue gas compressor 63 (e.g., a booster compressor) via inter-compressor line 18. While two compression stages are shown, only one or more than two stages can also be used in some embodiments. The horsepower to residue gas compressor 62 can be provided by the power generated from expander 56 in some embodiments, such that the power consumption by the facility can be reduced. In some embodiments, first residue gas compressor 62 increases the pressure of the residue gas in absorber overhead line 17 to a pressure of greater than or equal to about 600, 610, or 620 psig (4.1, 4.2, or 4.3 MPa), and/or second residue gas compressor 63 increases the pressure of the residue gas in absorber overhead line 17 to a pressure of greater than or equal to about 700, 750, or 800 psig (4.8, 5.2, or 5.5 MPa). In some embodiments, the power consumption (HP) of first and/or second residue gas compressors is reduced by at least 20, 25, or 30% relative to a conventional expander process absent absorber 56 and operating with a larger (e.g., greater internal volume) stripper than stripper 59.

The compressed residue gas may be cooled via passage through residue gas ambient cooler 64, and a cooled, high pressure residue gas can be extracted from residue gas ambient cooler 64 via cooled, compressed residue gas line 19. In some embodiments, the compressed residue gas in compressed residue gas line 19 has a temperature in the range of from about 95 to about 130° F. (from about 35 to about 55° C.), from about 95 to about 110° F. (from about 35 to about 43° C.), from about 100 to about 115° F. (from about 38 to about 46° C.), from about 115 to about 130° F. (from about 46 to about 55° C.), or a temperature of greater than or equal to about 120, 115, or 95° F. (49, 46, or 35° C.). A majority of the compressed residue gas may be removed from the process via a residue gas product line 20, and a minor portion of the compressed residue gas recycled back to feed exchanger 53 for chilling and condensing thereof prior to use as top reflux to absorber 56. In some embodiments, the minor portion of the compressed residue gas that is recycled for use as top reflux comprises from about 3 to about 8, from about 4 to about 9, or from about 5 to about 10 volume percent of the total compressed residue gas in compressed residue gas line 19. In some embodiments, the majority of the compressed residue gas removed from the process via residue gas product line 20 can be sent to an LNG liquefaction plant 75.

As noted hereinabove, an amount of from about 3 vol % to about 10 vol % of the high-pressure residue gas in high pressure residue gas line 19 may be recycled via high pressure residue gas recycle reflux line 21. The high pressure residue gas recycled for use as top reflux in top reflux line 22/23 can be cooled and partially condensed via passage through high pressure residue gas core C3 of multi-pass heat exchanger 53 to generate a methane rich lean reflux introduced as top reflux via top reflux line 22/23 to the top portion of absorber 56. In some embodiments, the amount of residue gas recycled to absorber 56 via high pressure residue gas line 21 is less than or equal to about 9 vol %, 7 vol %, 5 vol %, or 3 vol % of the total residue flow in cooled, compressed residue gas line 19. In some embodiments, the top reflux stream in top reflux line 22/23 comprises primarily, or greater than or equal to about 90, 91, 92, 93, 94, 95, 96, 97 mole percent (mol %) methane.

As noted herein above, the stripper 59 can be operated at a lower pressure than the absorber 56. Accordingly, the stripper overhead (e.g., in stripper overhead line 14) can pass through a compressor (e.g., compressor 61) to increase the pressure thereof and provide compressed stripper overhead in compressed stripper overhead line 24 for introduction into absorber 56 as second reflux in second reflux line 25. The compressed stripper overhead (e.g., in compressed stripper overhead line 24) can be chilled and at least partially condensed in the feed exchanger (e.g., via passage through the stripper overhead core C2 of multi-pass heat exchanger 53), forming the second (e.g., a two-phase) reflux to the absorber. In some embodiments, the second reflux stream in second reflux line 25 comprises primarily, or greater than or equal to about 65, 70, 71, 72, 73, 74, 75, 76, 77, 78, 79, or 80 mol % methane.

A heavy hydrocarbon removal system 150 of this disclosure will now be described with reference to FIG. 1B. The heavy hydrocarbon removal system 150 comprises a propane pre-cooling train 74, an integrated heat exchanger 53, an absorber 56, and a stripper 59. The absorber 56 can be a high pressure absorber, and the stripper 59 can be a low pressure stripper that can serve as a deethanizer. The absorber 56 is refluxed by a stripper overhead product stream in line 14 that passes through an integrated heat exchanger (cold box) 53 to become a reflux stream in line 25 and a high pressure residue gas in line 21 that passes through the cold box 53 to become a reflux stream in line 23, as described further hereinbelow. As used herein, an integrated heat exchanger such as cold box 53 is a multi-pass heat exchanger that can exchange heat between two or more streams. The multiple passes can also be referred to as cores, each of which is present within the cold box 53 itself.

Figure 1B:
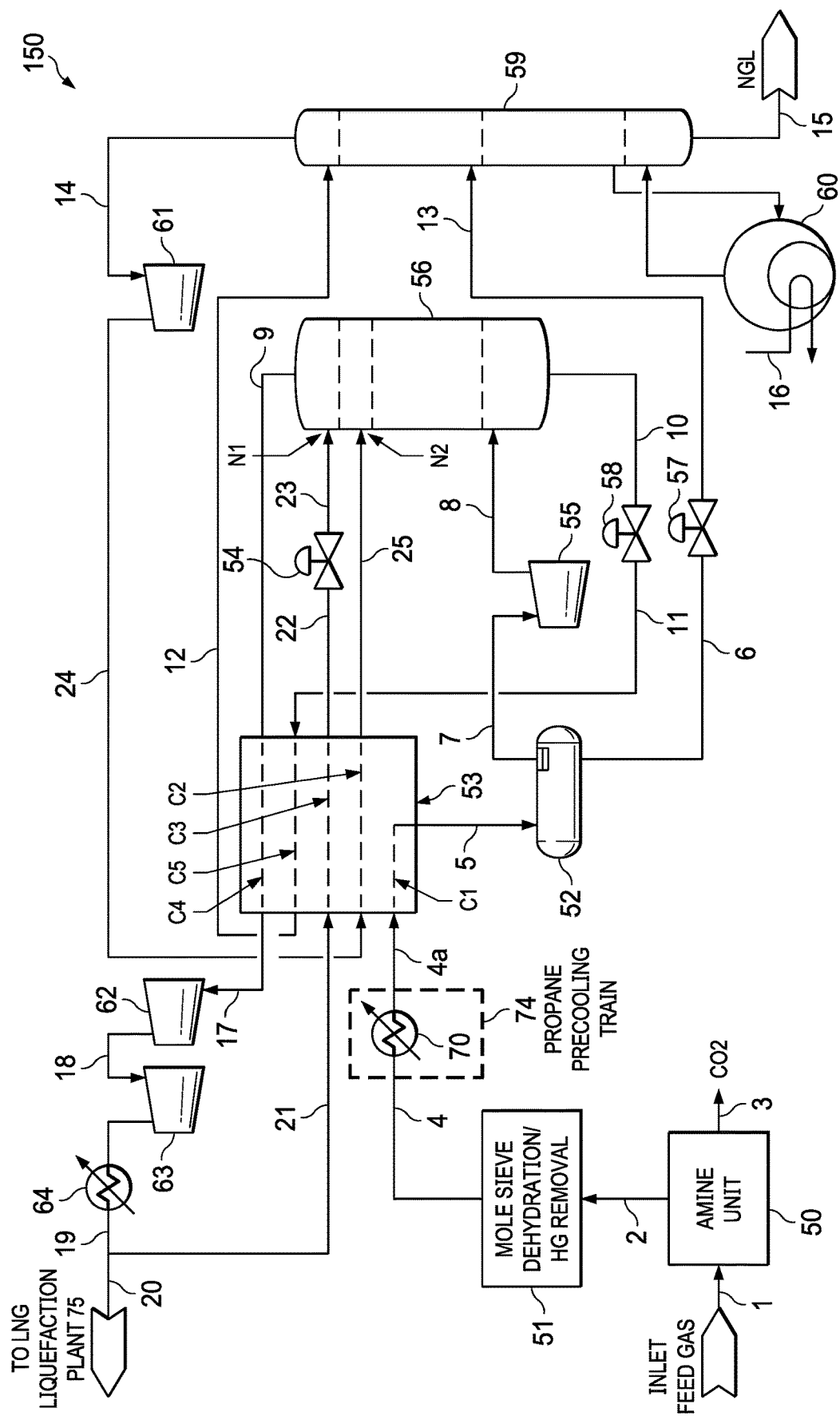
FIG. 1B is a schematic of a heavy hydrocarbon removal system 150, according to embodiments of this disclosure.

The system 150 according to this disclosure further comprises an integrated heat exchanger, such as multi-pass heat exchanger 53 (which may also be referred to herein as a 'feed exchanger' 53) of the embodiment of FIG. 1B. As indicated in FIG. 1B, a heavy hydrocarbon removal system 150 according to this disclosure can further comprise an acid gas removal (AGR) unit 50 (also referred to herein as an 'amine unit 50'), a dehydration unit/mercury removal unit 51 (also referred to herein for brevity as a 'dehydration unit 51'), a separator 52, an expander 55, a pressure reduction valve 58, a reboiler 60, one or more residue gas compressors 62/63, and/or a residue gas chiller or heat exchanger 64 (also referred to as a 'residue gas ambient cooler 64'). System 150 further comprises associated piping and valves to control the flow throughout and/or product pressure. For example, system 150 can comprise one or more of valves 54, 57, and 58. Each component of a heavy hydrocarbon removal system 150 according to this disclosure will be described in more detail hereinbelow.

Heavy hydrocarbon removal system 150 can comprise an acid gas removal or AGR unit 50. When present, AGR unit 50 is operable to produce a substantially acid-gas free gas from an inlet feed gas introduced thereto via inlet feed gas line 1. As used herein, "acid-gas free" is utilized to mean substantially free, or less than about 4 ppmv hydrogen sulfide ($H_2S$), less than about 50 ppmv carbon dioxide ($CO_2$), or both. AGR unit 50 serves to remove acid gases, such as carbon dioxide and $H_2S$, via acid gas removal line 3, to meet sulfur specifications in the product gas (e.g., the product residue gas) and avoid freezing of the $CO_2$ in the downstream cryogenic process. An acid-gas free line 2 may be configured for the removal of acid-gas free inlet gas from AGR unit 50. AGR 50 can be any AGR unit known in the art, for example, in some embodiments AGR 50 is selected from amine units operable via, without limitation, methyldiethanolamine (MDEA), aminoethoxyethanol (diglycolamine) (DGA), monoethanolamine (MEA) or a combination thereof, optionally enhanced by a $CO_2$ activator, or other suitable solvents. Other acid gas removal units (e.g., those using adsorbents, etc.) can also be used.

Heavy hydrocarbon removal system 150 can further comprise a dehydration unit 51. When present, dehydration unit 51 is operable to remove water from a gas introduced thereto. For example, dehydration unit 51 can be fluidly connected with AGR unit 50 via acid-gas free line 2, whereby acid-gas free inlet gas (i.e., inlet feed gas substantially free of acid gas) can be introduced into dehydration unit 51 from AGR unit 50. Dehydration unit 51 can be any apparatus known to those of skill in the art to be suitable for the removal of water from a gas stream introduced thereto, to avoid water freezing in the downstream cryogenic unit. In some embodiments, dehydration unit 51 is operable to reduce the water content of a feed gas thereto to a level of less than or equal to about 0.1 or lower ppmv. By way of example, in some embodiments, dehydration unit 51 can be selected from molecular sieve dehydration units that utilize molecular sieves operable to remove water to the ppmv levels. Dried, acid-gas free inlet feed gas can be produced from dehydration unit 51 via dried, acid-gas free inlet feed gas line 4. Dehydration unit 51 can, in some embodiments, also include a mercury removal bed that is designed to reduce mercury levels to a specified level, for example to the mercury specification provided in Table 2. Optionally, the mercury bed(s) can be placed upstream of amine unit 50.

While described herein as comprising an AGR unit 50 and dehydration unit 51, such units may be optional and may not be present if the inlet feed gas has an acid gas content below a threshold as required to avoid carbon dioxide freezing and is dried to the ppm levels of water content to meet the processing specifications.

Heavy hydrocarbon removal system 150 comprises chilling the feed gas in a propane pre-cooling train 74. The propane pre-cool train 74 is configured to use at least one propane pre-cooling heat exchanger 70 to cool in the inlet gas in line 4. The propane pre-cool train 74 uses the propane chilling train in a typical C3/MR LNG liquefaction plant, such that separate chilling for NGL separation is not required, which reduces substantial capital and operating costs.

Heavy hydrocarbon removal system 150 comprises chilling the cooled inlet gas in line 4a in a multi-pass feed exchanger 53. Multi-pass heat exchanger 53 can be configured to cool and at least partially condense a portion of a compressed absorber overhead stream (e.g., in absorber overhead line 9 described further hereinbelow) to form a top reflux stream (e.g., in top reflux line 22) to the absorber (e.g., absorber 56 described further hereinbelow) and to cool and at least partially condense a compressed stripper overhead product stream (e.g., in condensed stripper overhead line 24 described further hereinbelow) to form a second reflux stream (e.g., in second reflux line 25) to the absorber. In some embodiments, the multi-pass heat exchanger 53 can be further configured to cool and partially condense the inlet feed gas (e.g., in inlet feed gas line 4a) to produce a feed gas and a feed liquid.

Multi-pass heat exchanger 53 can be any heat exchanger known in the art that is suitable to provide the various streams described herein. In some embodiments, multi-pass heat exchanger 53 is a brazed aluminum exchanger. Multi-pass heat exchanger 53 comprises a plurality of passes or 'cores', and can, in some embodiments, comprise at least five (5), six (6), or seven (7) cores. The plurality of cores may include one or more of a feed gas core C1, a stripper overhead core C2, a high pressure residue gas core C3, an absorber overhead core C4, and an absorber bottoms core C5.

Multi-pass heat exchanger 53 can utilize refrigeration content of an absorber bottoms (e.g., absorber bottoms in absorber bottom line 11, described hereinbelow) and an absorber overhead (e.g., absorber overhead or 'residue gas' in absorber overhead line 9, described hereinbelow) to cool a stripper overhead (e.g., compressed stripper overhead in compressed stripper overhead line 24 described hereinbelow), to cool the inlet feed gas (e.g., the inlet feed gas in line 4 as a dried, acid-gas free inlet feed gas) and to cool a high pressure residue gas (e.g., high pressure residue gas in high pressure residue gas recycle reflux line 21), to provide refluxes (e.g., in top reflux line 22/23 and/or second reflux line 25, described hereinbelow) to the absorber (e.g., absorber 56 described hereinbelow) for recovery of the desired components.

As noted hereinabove, dried, acid-gas free inlet feed gas line 4 may be configured to introduce the inlet gas in line 4 to the propane pre-cooling train in an LNG plant 75, followed by the introduction to the core C1 of multi-pass heat exchanger 53 via line 4a, wherein the inlet gas can be cooled and at least partially condensed to form a chilled inlet gas in chilled feed line 5. In such embodiments, the chilled inlet gas comprises two phases, embodied as a feed gas and a feed liquid.

Heavy hydrocarbon removal system 150 can further comprise a separator 52 (also referred to herein as a 'cold separator 52') configured to receive and separate the feed gas and the feed liquid into separate streams. Separator 52 is any vapor/liquid separator known to those of skill in the art to be suitable to separate a separator feed stream introduced thereto via chilled feed line 5 into a vapor stream and a liquid stream. In some embodiments, the separator 52 can be a flash vessel. Separator vapor line 7 can be configured to remove, from separator 52, vapor separated from the separator feed, and separator liquid line 6 can be configured to remove, from separator 52, liquid separated from the separator feed. Separator vapor line fluidly connects separator 52 with expander 55, and separator liquid line 6 fluidly connects separator 52 with stripper 59 via valve 57.

Heavy hydrocarbon removal system 150 comprises expander 55, configured to receive the feed gas from the separator via separator vapor line 7 and expand the feed gas to produce an expanded feed gas stream. Expander 55 is thus configured to reduce the pressure of the vapor introduced thereto via vapor line 7 and provide an expander discharge stream. Expander 55 is any expander known in the art to be operable to provide the expansion described herein while producing work. Expander 55 can comprise a turbo expander, in some embodiments. An absorber inlet line 8 can fluidly connect expander 55 and absorber 56, whereby the expander discharge stream produced in expander 55 can be introduced into absorber 56 as an expanded feed gas stream. The work generated by the expander can be used in any other portions of the plant including any compressor requiring work such as compressor 61, compressor 62, and/or compressor 63.

Heavy hydrocarbon removal system 150 comprises an absorber, wherein the absorber is configured to receive a top reflux stream and a second reflux stream within a top portion of the absorber, receive the expanded feed gas stream at a bottom portion of the absorber, and produce an absorber bottom product stream and an absorber overhead product stream. As the absorber is generally operated at a higher pressure than a pressure at which the stripper is operated according to some embodiments of this disclosure, the absorber may be referred to herein as a 'high pressure' absorber, and the stripper as a 'low pressure' stripper. For example, In some embodiments, an absorber of this disclosure can be configured for or operated at pressures in the range of from about 500 to about 675 psig (about 3.4 to about 4.7 MPa), from about 500 to about 620 psig (about 3.4 to about 4.3 MPa), from about 525 to about 650 psig (about 3.6 to about 4.5 MPa), from about 550 to about 675 psig (about 3.8 to about 4.7 MPa), or greater than or equal to about 500, 650, or 675 psig (3.4, 4.5, or 4.7 MPa); while a stripper of this disclosure can be configured for or operated at pressures in the range of from about 390 to about 475 psig (about 2.7 to about 3.3 MPa), from about 390 to about 420 psig (about 2.7 to about 2.9 MPa), from about 420 to about 440 psig (about 2.9 to about 3.0 MPa), from about 450 to about 475 psig (about 3.1 to about 3.3 MPa), or less than or equal to about 420, 450, or 475 psig (2.9, 3.1, or 3.3 MPa). As generally known, the pressure at which the absorber and/or stripper operates can occur over a range as well as a temperature profile based on the thermodynamic properties of the fluids within the column. The specification of a temperature and/or pressure can therefore occur at any point within the column.

Absorber 56 comprises any suitable column known in the art to be operable to provide the separations noted hereinbelow. Absorber inlet or feed line 8 (also referred to as 'expander discharge line 8') can be configured to introduce an absorber feed gas comprising separator vapor from separator vapor line 7 into absorber 56. In some embodiments the absorber feed gas can be introduced into absorber 56 at a bottom portion of absorber 56, e.g., at a location in the bottom one third of the absorber column. Two absorber reflux lines can be configured to introduce absorber reflux into absorber 56. A top reflux line 22/23 can be configured to introduce cooled, high pressure residue recycle absorber reflux or "top" reflux from multi-pass heat exchanger 53 to absorber 56 such that, following passage through high pressure residue gas core C3 of multi-pass heat exchanger 53 for cooling/condensing, the components of the high pressure residue gas recycled in high pressure residue gas recycle line 21 can be introduced into a top portion of absorber 56 as the top reflux. The top reflux can be introduced above the stripper overhead vapor derived reflux or 'second' reflux introduced into absorber 56 via second reflux line 25, described hereinbelow. Second reflux line 25 can be configured to introduce chilled stripper overhead, produced via passage via stripper overhead line 14, compressor 61, and compressed stripper overhead line 24 through stripper overhead core C2 of multi-pass heat exchanger 53 for cooling/condensing, into a top portion of absorber 56, e.g., at a location in the top one third of the absorber 56.

A pressure reduction valve 54 may be positioned on top reflux line 22 to control the flow and/or adjust the pressure of the chilled, high pressure residue recycle absorber top reflux stream extracted from multi-pass heat exchanger 53 via high pressure residue recycle absorber top reflux line 22, prior to introduction of the top reflux into absorber 56 via line 23. Use of the pressure reduction valve 54 can result in at least a portion of stream 22 forming a liquid to serve as reflux prior to entry into the absorber 56. As the hereindisclosed operation can utilize a portion of the high pressure residue gas that is subcooled in multi-pass heat exchanger 53 and letdown in pressure in pressure reduction valve 54 as a top reflux stream to absorber 56, absorber 56 can be constructed with two reflux nozzles or injection points, with a top nozzle N1 supplied by the high pressure residue gas liquid reflux in residue gas recycle absorber top reflux line 22, and a second nozzle N2 supplied by the feed liquid from the stripper overhead condensed in stripper overhead core C2 of multi-pass heat exchanger 53 via second reflux line 25.

An absorber overhead line 9 can be configured to extract absorber overhead from absorber 56 and pass the absorber overhead through absorber overhead core C4 of multi-pass heat exchanger 53 for heat exchange. After passing through the multi-pass heat exchanger 53, one or more residue gas compressors, such as first and second residue gas compressors 62 and 63 of the embodiment of FIG. 1B can be configured to compress the absorber overhead or 'residue gas' in line 17 following heat exchange in absorber overhead core C4 of multi-pass heat exchanger 53. An inter-compressor line 18 may fluidly connect first residue gas compressor 62 and second residue gas compressor 63. A residue gas chiller or heat exchanger 64 may be configured to further adjust the temperature of the compressed residue gas, and provide a high pressure residue gas in high pressure, cooled residue gas line 19. High pressure residue gas recycle reflux line 21 is configured to introduce a portion of the high pressure, compressed residue gas in high pressure, cooled residue gas line 19 into high pressure residue gas core C3 of multi-pass heat exchanger 53. Remaining high pressure residue gas may be removed from NGL recovery system 150 via residue gas product line 20. The high pressure residue gas in line 20 can be sent to an LNG liquefaction facility to form LNG, wherein the composition of the high pressure residue gas in line 20 can have a composition meeting the specifications as described in Table 2 above.

An absorber bottom line 10 can be configured for removal of absorber bottoms from absorber 56. Heavy hydrocarbons removal system 150 can further comprise a pressure reduction valve configured to reduce a pressure of the absorber bottom product stream between the absorber 56 and the stripper 59. For example, a pressure reduction valve 58 may be utilized to reduce the pressure of the absorber bottoms in absorber bottom line 10 to stripper 59. In some embodiments, pressure reduction valve 58 can comprise a Joule- Thomson (JT) valve. Absorber bottoms stream line 10 can be configured to pass the absorber bottoms from absorber bottom line 10 through absorber bottoms core C5 of multi-pass heat exchanger 53 for chilling prior to introduction into stripper 59 via stripper feed line 12.

Heavy hydrocarbon removal system 150 comprises stripper 59. Stripper 59 can be configured to receive a feed liquid in line 13 and the absorber bottom product stream in line 12 and produce a stripper overhead product stream in line 14 and a stripper bottom product stream in line 15, where the stripper overhead product stream is configured to pass back to the absorber 56 as the second reflux stream. Stripper 59 can be any column known in the art to be operable to receive the streams described herein and perform the separation of the components to produce the stripper overhead product stream and the stripper bottom product stream. In some embodiments, stripper 59 comprises a fractionation column. Stripper 59 can be operable as a deethanizer. Stripper 59 may be operable with a reboiler 60. An NGL product or 'stripper bottom' line 15 is fluidly connected with a bottom of stripper 59 for the removal therefrom of a stripper bottoms comprising the NGL product. A heat source such as a hot medium, oil, or steam inlet line 16 may be configured to supplement the heat duty in the reboiler 60 for stripping the ethane content in the NGL product in NGL product or stripper bottoms stream 15 (e.g., to less than 1 to 2 mole percent (mol %) ethane). The amount of NGL (C3 and C4) content in the bottom product can be increased by lowering the absorber bottom temperature by reducing the reflux temperatures, increasing the reflux flow rates and/or varying the expander expansion ratio. For the lean gas or the average gas shown in Table 1, the stripper can also be operated as a stabilizer to reject most of the C5 and lighter hydrocarbons to the stripper overhead, to produce a bottom product concentrated in the benzene and hexane heavier hydrocarbons. This operation is particularly desirable when high heating value LNG specification is required. A stripper overhead line 14 may be configured for the removal of stripper overhead from stripper 59 and introduction into compressor 61. As noted previously, stripper overhead line 24 can be configured to pass the compressed stripper overhead from compressor 61 through stripper overhead core C2 for chilling prior to introduction as the second reflux into absorber 56 via second reflux line 25. The resulting chilling in the stripper overhead core C2 can result in at least a portion, or substantially all, of the stripper overhead product stream forming a liquid for reflux in the absorber 56.

As mentioned hereinabove, heavy hydrocarbon removal system 150 can further comprise a compressor configured to pressurize the stripper overhead product stream from the stripper to form a compressed stripper overhead product stream. For example, heavy hydrocarbon removal system 150 can comprise a compressor 61 configured to increase the pressure of the stripper overhead in stripper overhead line 14 prior to introduction into absorber 56 via passage through compressed stripper overhead line 24 and multi-pass heat exchanger 53 via stripper overhead core C2.

In some embodiments, a combined mass flow rate of the stripper feed liquid in separator liquid line 6 and the absorber bottoms stream in absorber bottom lines 10/11 introduced into stripper 59 is less than 5%, 4%, 3%, 2%, 1%, or 0.8% of a mass flow rate of the inlet gas in inlet feed gas line 1 or chilled feed line 5. Utilization, as per this disclosure, of the high pressure absorber results in generating 95% or higher of the total gas flow at high pressure, that lowers the power consumption of LNG liquefaction.

The relatively small mass flow rate to the stripper can provide a design in which the stripper is relatively small as compared to the absorber. In some embodiments, a ratio of an internal diameter of the absorber 56 to an internal diameter of the stripper 59 can be greater than 3:1, 4:1, 5:1, 6:1, or 7:1.

In some embodiments, the herein disclosed heavy hydrocarbon removal systems (e.g., systems 100 and 150, and those systems 200 and 300 described below) and methods can be utilized to produce an ethane rich residue gas (e.g., residue gas in residue gas product line 20) and a propane plus enriched NGL product (e.g., in NGL product line 15) comprising less than 1 volume percent ethane content.

A description of the herein-disclosed methods for operating heavy hydrocarbon removal system 150 of this disclosure will now be provided with reference to FIG. 1B. Plant inlet feed gas is introduced via plant inlet feed gas line 1. The inlet feed gas comprises methane, ethane, propane, and can comprise heavier hydrocarbons. With respect to suitable inlet feed gas streams, it is contemplated that different inlet feed gas streams are acceptable. With respect to the gas compositions, it is generally suitable that the inlet feed gas stream comprises predominantly $C_1$-$C_6$ and heavier hydrocarbons, and may further comprise nitrogen and/or other inert and/or non-hydrocarbon compounds. Suitable inlet feed gas streams include conventional and unconventional gases, such as shale gases, associated and non-associated gases from oil and gas production. In some embodiments, the plant inlet feed gas comprises ethane and hydrocarbons liquids content in a range of from about 3.0 to about 0.5, from about 3.0 to about 2.0, from about 1.5 to about 1.0, or from about 0.9 to about 0.5 GPM (gallons of liquid of C2+ per thousand standard cubic feet of gas). In some embodiments, the inlet feed gas comprises less than 3.0, 2.0, 1.5, 1.0, 0.5, 0.1, or lower gallons per thousand cubic feet (GPM) of gas of $C_{3+}$ components.

The plant inlet feed gas may be supplied at a pressure in the range of from about 600 to about 1000 psig or higher (from about 4.1 to about 6.9 MPa), from about 650 to about 850 psig (from about 4.5 to about 5.9 MPa), or from about 800 to about 1100 psig (from about 5.5 to about 7.6 MPa), or a pressure of greater than or equal to about 600, 700, 800, 850, 900, 1000 or 1100 psig (4.1, 4.8, 5.5, 5.9, 6.2, 6.9, or 7.6 MPa). The plant inlet feed gas may be supplied at a temperature in the range of from about 60° F. to about 130° F. (from about 15° C. to about 54° C.), from about 50° F. to about 85° F. (from about 10° C. to about 29° C.), or from about 85° F. to about 130° F. (from about 29° C. to about 54° C.), or a temperature of greater than or equal to about 50° F., 60° F., 65° F., 70° F., 75° F., 80° F., 85° F., or 120° F. (10° C., 15.5° C., 21.1° C., 23.9° C., 26.7° C., 29.4° C., or 48.9° C.).

The inlet feed gas may be treated to remove at least a portion of any acid gas in AGR unit 50, and acid gases can be removed via acid gas line 3. In some embodiments, the acid gas removal can be optional when a feed gas composition contains acid gases below an acid gas threshold (e.g., a composition that meets feed gas specifications). A substantially acid-gas free inlet feed gas may be introduced into dehydration unit 51, for example via acid-gas free inlet feed line 2. Within dehydration unit 51, the feed gas can be dried to meet processing thresholds, thus producing a dried, acid-gas free gas 4 to the NGL recovery unit. While referred to as a dried, acid-gas free gas, the gas may have a water and acid gas composition below a threshold rather than being entirely free of water and any acid gases.

In some embodiments, the dried, acid-gas free inlet feed gas in dried, acid-gas free inlet feed gas line 4 can have a pressure in the range of from about 600 to about 1000 psig (from about 4.1 to about 6.9 MPa), from about 650 to about 850 psig (from about 4.5 to about 5.9 MPa), or from about 800 to about 1100 psig (from about 5.5 to about 7.6 MPa), or a pressure of greater than or equal to about 600, 700, 800, 850, 900, 1000 or 1100 psig (4.1, 4.8, 5.5, 5.9, 6.2, 6.9, or 7.6 MPa). The dried, acid-gas free inlet feed gas in dried, acid-gas free inlet feed gas line 4 may have a temperature in the range of from about 60° F. to about 130° F. (from about 15° C. to about 54° C.), from about 50° F. to about 85° F. (from about 10 to about 29° C.), or from about 85° F. to about 130° F. (from about 29° C. to about 54° C.), or a temperature of greater than or equal to about 50° F., 60° F., 65° F., 70° F., 75° F., 80° F., 85° F., or 120° F. (10° C., 15.5° C., 21.1° C., 23.9° C., 26.7° C., 29.4° C., or 48.9° C.).

The dried, acid-gas free inlet feed gas in dried, acid-gas free inlet feed gas line 4 can be chilled in a propane pre-cooling train 74, further chilling in an multi-pass heat exchanger 53, partially condensed via passage through feed gas core C1, providing a cooled feed stream in separator feed line 5. The separator feed stream may have a temperature of less than or equal to about −40° F., −50° F., or −60° F. (−40° C., −45.5° C., or −51.1° C.). Cooling of the dried, acid-gas free inlet feed gas via passage through feed gas core C1 of multi-pass heat exchanger 53 can be affected by heat exchange with absorber overhead vapor in absorber overhead line 9 and absorber bottom liquid in absorber bottom line 11.

Within separator 52, the separator feed stream can be separated into a cold separator vapor, which can exit separator 52 via separator vapor stream line 7, and a cold separator liquid, which can exit separator 52 via separator liquid stream line 6. The amount of liquid dropout in separator 52 can depend on the heavy hydrocarbon content in the inlet feed gas (and thus in the separator feed stream in separator feed line 5). For lean inlet feed gases having less than 0.5 GPM $C_{3+}$, liquid condensate produced and extracted via separator liquid line 6 may be minimal.

The vapor stream in separator vapor line 7 from separator 52 can be let down in pressure in a pressure reduction device such as an expander (e.g., turbo expander) 55 prior to introduction into absorber 56. For example, expander 55 can reduce the pressure of the separator vapor in separator vapor line 7 to a pressure for operation in absorber 56, e.g., to a pressure of less than or equal to about 650, 600, 550, 540 or 530 psig (4.5, 4.1, 3.8, 3.7, or 3.65 MPa), which can result in cooling of the gas to less than or equal to about −60° F., −80° F., or −100° F. (−51° C., −62° C., or −73° C.), prior to being introduced into absorber 56 via absorber feed line 8. Absorber feed line 8 can introduce absorber feed in absorber feed line 8 into a bottom portion of absorber 56. If the inlet feed gas is higher (e.g., 1100 psig (7.6 MPa)), the absorber pressure can be higher, for example 650 psig (4.5 MPa) or higher to reduce recompression cost (e.g., via residue gas compressors 62 and/or 63). In some embodiments, expander 55 can be operated with an expansion ratio of greater than or equal to about 1.3, 1.4, 1.5, 1.6, or 1.7.

Stripper 59 can be operated as a deethanizer. As noted hereinabove, stripper 59 can be configured for operation at a lower pressure than absorber 56. For example, in some embodiments, stripper 59 can be operated at a pressure that is in the range of from 100 to 200 psi (0.7 to 1.4 MPa) or at least about 75, 100, 200 or 250 psi (0.5, 0.7, 1.4, or 1.7 MPa) lower than a pressure at which the absorber is operated. In some embodiments, stripper 59 can be operated at a pressure of less than or equal to about 500, 450, 425, or 400 psig (3.4, 3.1, 2.9, or 2.8 MPa). The cold separator liquid in separator liquid line 6 can be let down in pressure, for example, via pressure reduction device such as valve 57, and chilled to, for example, less than or equal to about −40° F., −60° F., or −75° F. (−40° C., −51° C., or −59° C.) prior to being introduced into stripper 59 via stripper feed line 13. In some embodiments, stripper feed line 13 can introduce pressure reduced liquid from separator 52 to stripper 50 at a location within a middle portion of stripper 59. The cold separator vapor (e.g., in separator vapor line 7) can be expanded in an expander (e.g., in turbo expander 55) and fed to a lower portion (e.g., within a lower third, including at the bottom) of the absorber 56 (e.g., to absorber 56 via absorber inlet line 8).

Stripper 59 can produce a stripper bottoms in stripper bottom line 15 that comprises NGL, and an overhead vapor in stripper overhead line 14. In some embodiments, the reboiler 60 of the stripper 59 can be operated using hot oil or steam as the heating medium to reboil a portion of the NGL and/or liquids from a lower tray to serve as a vapor phase or reflux for the stripper 59. For example, a heat medium such as hot oil or steam (indicated at line 16) can be utilized to supplement the heating duty in the reboiler 60. The reboiler 60 can be operated to control the methane and ethane content in the NGL product stream in NGL product line 15. For example, In some embodiments, reboiler 60 can be operated for stripping the ethane content in the NGL product in stripper bottom line 15 to an ethane content of less than or equal to about 2%, 1%, or 0.5% mol %. In some embodiments, the reboiler 60 can be operated for providing a methane content in the NGL product in stripper bottom line 15 to a methane content of less than or equal to about 2%, 1%, or 0.5% mol %. The extent of stripping and ethane content in the NGL can be set by the NGL product specification and/or the sales gas heating value specification. For example, if there are no markets for the ethane product, stripping can be increased to produce an NGL with very low ethane content, such that the NGL can be sold as a liquid fuel product. However, if the inlet feed gas contains a significant amount of ethane, sufficient ethane can be removed from the residue gas such that the sales gas heating value can be met. In this case, more ethane will be contained in the NGL by operating the stripper at a lower bottom temperature.

The stripper bottoms in NGL product line 15 can be further concentrated in heavy hydrocarbons relative to an amount thereof in the absorber bottoms in absorber bottom line 10. For example, the stripper bottoms can comprise greater than or equal to about 90, 95, or 99% weight percent of the heavy hydrocarbons (e.g., hexane, BTEX, benzene, toluene, xylene, or a combination thereof) in the inlet feed gas. In some embodiments, for example when the feed gas is rich, such as the rich gas stream in Table 1, and there is an attractive market for aromatics, the NGL product stream line 15 can be further fractionated to produce the desirable products. In some embodiments, the herein-disclosed system 150 and method can be utilized to reject ethane while maintaining over 98 vol % propane recovery in the NGL. In some embodiments, the NGL product stream comprises from about 0.1 to about 5.0, from about 30 to about 75, from about 90 to about 95% of the propane in the inlet feed gas. The propane can be utilized for propane makeup for the refrigeration compressors or for sales, in some embodiments.

In some embodiments, the stripper overhead vapor extracted from stripper 59 via stripper overhead line 14 has a temperature in the range of from about 0.0 to about −25°

F. (from about −17.8 to about −31.7° C.), from about 0.0 to about −5° F. (from about −17.8 to about −20.6° C.), from about −10 to about −15° F. (from about −23.3 to about −26.1° C.), from about −20 to about −25° F. (from about −28.9 to about −31.7° C.), or a temperature of less than or equal to about −25, 0, or 15° F. (−31.7, −17.8, or −9.4° C.), and the stripper bottoms stream extracted from stripper 59 via stripper bottom line 15 has a temperature in the range of from about 280 to about 325° F. (from about 137.8 to about 162.8° C.), from about 280 to about 300° F. (from about 137.8 to about 148.9° C.), from about 295 to about 315° F. (from about 146.1 to about 157.2° C.), from about 300 to about 325° F. (from about 148.9 to about 162.8° C.), or a temperature of greater than or equal to about 320, 290, or 250° F. (160, 143.3, or 121.1° C.). It is noted that the temperature profile in a column covers a range. The temperature can be typically hottest at the bottom and lowest at the top. While the temperature profile will depend on the pressure and composition of the material in the column, the temperature at the bottom can generally be around the boiling point of the bottoms stream at the column pressure, and the top can generally be around the boiling point (or condensation point) of the overhead stream at the column pressure.

Stripper overhead vapor stream in stripper overhead line 14 can be routed to multi-pass heat exchanger 53 via compressor 61, whereby the stripper overhead vapor can be compressed to provide compressed stripper overhead in compressed stripper overhead line 24. Compressor 61 can increase the pressure of the stripper overhead to a pressure sufficient to allow the stripper overhead to be introduced into the absorber 56, which can be a pressure in a range of from about 600 to about 680 psig (from about 4.1 to about 4.7 MPa), from about 600 to about 625 psig (from about 4.1 to about 4.3 MPa), from about 625 to about 650 psig (from about 4.3 to about 4.5 MPa), from about 635 to about 680 psig (from about 4.4 to about 4.7 MPa), or greater than or equal to about 610, 650 or 680 psig (4.2, 4.5, or 4.7 MPa). Compressed stripper overhead in compressed stripper overhead line 24 can be chilled via passage through stripper overhead core C2 of multi-pass heat exchanger 53 prior to feeding the absorber as second reflux via absorber second reflux line 25. Within feed exchanger 53, the compressed stripper overhead can be chilled to a temperature of less than or equal to about −60° F., −80° F., or −100° F. (−51° C., −62° C., or −73° C.) prior to introduction into absorber 56 as second reflux in second reflux line 25. In some embodiments, the second reflux stream in second reflux line 25 comprises primarily, or greater than or equal to about 70, 80, 85, 90, 95, or 97% methane. The second reflux can be introduced as a mid-reflux to absorber 56, for example via second nozzle N2 at a location within a top portion of absorber 56 below introduction via first nozzle N1 of the top reflux in top reflux line 23.

In some embodiments, absorber 56 can be operated at a pressure of less than or equal to about 675, 650, 635, 620 or 600 psig (4.7, 4.5, 4.4, 4.3, or 4.1 MPa). As noted hereinabove, absorber 56 is refluxed with two separate reflux streams, a first or top reflux stream from high pressure residue gas in high pressure residue gas recycle line 21 and a second reflux stream from the compressed stripper overhead in compressed stripper overhead line 24. Compressed stripper overhead in compressed stripper overhead line 24 and recycle residue gas in recycle residue gas line 21 are chilled with the use of feed exchanger 53 to a temperature of less than or equal to about −60° F., −80° F., or −100° F. (−51° C., −62° C., or −73° C.) prior to refluxing absorber 56.

Absorber 56 can be operated to produce an absorber overhead stream, which can be extracted therefrom via absorber overhead line 9, and an absorber bottoms stream, which can be extracted therefrom via absorber bottom line 10. In some embodiments, absorber 56 can be operated to produce an ethane rich absorber bottoms extracted via absorber bottom line 10 and a propane depleted absorber overhead vapor extracted via absorber overhead line 9. In some embodiments, the absorber bottom product stream in absorber bottom line 10 can be concentrated with heavy hydrocarbons.

In some embodiments, the absorber overhead vapor extracted from absorber 56 via absorber overhead line 9 has a temperature of less than or equal to about −50° F., −75° F., −95° F., or −130° F. (−46° C., −59° C., −71° C., or −90° C.), and the absorber bottoms stream extracted from absorber 56 via absorber bottom line 10 has a temperature of less than or equal to about −50° F., −75° F., or −95° F. (−46° C., −59° C., or −71° C.).

In some embodiments, the absorber bottoms liquid in absorber bottom line 10 can be let down in pressure in pressure reduction device such as pressure reduction valve 58. For example, in some embodiments, the absorber bottoms in absorber bottom line 10 has a pressure greater than or equal to about 650, 600, 550, 540 or 530 psig (4.5, 4.1, 3.8, 3.7, or 3.65 MPa). In some embodiments, the reduced pressure absorber bottoms in reduced pressure absorber bottom line 11 has a pressure less than or equal to about 400 psig (2.8 MPa).

The reduced pressure absorber bottoms stream in absorber bottoms stream line 11 can be passed through absorber bottoms core C5 of multi-pass heat exchanger 53 to form the stripper feed in stripper feed line 12 prior to feeding to the top (e.g., the top tray) of stripper 59. The stripper feed in stripper feed line 12 can have a temperature in the range of from about −20, 0, or 20 to about 0, 20, or 40° F. (from about −28.9, −17.8, or 4.4 to about −17.8, −6.7, or 4.4° C.), from about −20 to about 0° F. (from about −28.9 to about −17.8° C.), from about 0 to about 20° F. (from about −17.8 to about −6.7° C.), from about 20 to about 40° F. (from about −6.7 to about 4.4° C.), or a temperature of less than or equal to about −10, 10, or 40° F. (−23.3, −12.2, or 4.4° C.).

However, for a leaner feed gas containing large amount of BTEX hydrocarbons, the stripper feed heating step can be bypassed and the absorber bottom can be directly fed to the stripper to reduce the BTEX components in the stripper overhead; and in such case, the stripper is required to be constructed of stainless steel material due to the cryogenic operation.

Absorber overhead can be produced from absorber 56 via absorber overhead line 9. The absorber overhead may be passed through absorber overhead core C4 of multi-pass heat exchanger 53. Heat exchange within feed exchanger 53 can increase the temperature of the absorber overhead to provide a heat exchanged absorber overhead in line 17 having a temperature in the range of from about −80, −90, −100, or −110 to about −90, −100, −110, or −120° F. (from about −62.2, −67.8, −73.3, or −78.9 to about −67.8, −73.3, −78.9, or −84.4° C.), from about −110 to about −120° F. (from about −78.9 to about −84.4° C.), from about −100 to about −110° F. (from about −73.3 to about −78.9° C.), from about −80 to about −90° F. (from about −62.2 to about −67.8° C.), or a temperature of greater than or equal to about −120, −110, −100, −90, or −80° F. (−84.4, −78.9, −73.3, −67.8 or −62.2° C.).

The refrigerant content in the absorber bottoms (e.g., in absorber bottoms stream line 10) and the absorber overhead (e.g., in absorber overhead stream line 9) can be recovered (e.g., in multi-pass heat exchanger 53) in generating reflux (e.g., top and second reflux) for the absorber, thereby reducing the refrigeration horsepower consumption and the reboiler duty in the stripper (e.g., in stripper reboiler 60).

Following passage through multi-pass heat exchanger 53, the absorber overhead line may be compressed, for example, via introduction of absorber overhead or residue gas line 17 into first residue gas compressor 62, and optionally introduction of the compressed residue gas from first residue gas compressor 62 into a second residue gas compressor 63 (e.g., a booster compressor) via inter-compressor line 18. While two compression stages are shown, only one or more than two stages can also be used in some embodiments. The horsepower to residue gas compressor 62 can be provided by the power generated from expander 56 in some embodiments, such that the power consumption by the facility can be reduced. In some embodiments, first residue gas compressor 62 increases the pressure of the residue gas in absorber overhead line 17 to a pressure of greater than or equal to about 600, 610, or 620 psig (4.1, 4.2, or 4.3 MPa), and/or second residue gas compressor 63 increases the pressure of the residue gas in absorber overhead line 17 to a pressure of greater than or equal to about 700, 750, or 800 psig (4.8, 5.2, or 5.5 MPa). In some embodiments, the power consumption (HP) of first and/or second residue gas compressors is reduced by at least 20, 25, or 30% relative to a conventional expander process absent absorber 56 and operating with a larger (e.g., greater internal volume) stripper than stripper 59.

The compressed residue gas may be cooled via passage through residue gas ambient cooler 64, and a cooled, high pressure residue gas can be extracted from residue gas ambient cooler 64 via cooled, compressed residue gas line 19. In some embodiments, the compressed residue gas in compressed residue gas line 19 has a temperature in the range of from about 95 to about 130° F. (from about 35 to about 55° C.), from about 95 to about 110° F. (from about 35 to about 43° C.), from about 100 to about 115° F. (from about 38 to about 46° C.), from about 115 to about 130° F. (from about 46 to about 55° C.), or a temperature of greater than or equal to about 120, 115, or 95° F. (49, 46, or 35° C.). A majority of the compressed residue gas may be removed from the process via a residue gas product line 20, and a minor portion of the compressed residue gas recycled back to feed exchanger 53 for chilling and condensing thereof prior to use as top reflux to absorber 56. In some embodiments, the minor portion of the compressed residue gas that is recycled for use as top reflux comprises from about 3 to about 8, from about 4 to about 9, or from about 5 to about 10 volume percent of the total compressed residue gas in compressed residue gas line 19. In some embodiments, the majority of the compressed residue gas removed from the process via residue gas product line 20 can be sent to an LNG liquefaction plant 75.

As noted hereinabove, an amount of from about 3 vol % to about 10 vol % of the high-pressure residue gas in high pressure residue gas line 19 may be recycled via high pressure residue gas recycle reflux line 21. The high pressure residue gas recycled for use as top reflux in top reflux line 22/23 can be cooled and partially condensed via passage through high pressure residue gas core C3 of multi-pass heat exchanger 53 to generate a methane rich lean reflux introduced as top reflux via top reflux line 22/23 to the top portion of absorber 56. In some embodiments, the amount of residue gas recycled to absorber 56 via high pressure residue gas line 21 is less than or equal to about 9 vol %, 7 vol %, 5 vol %, or 3 vol % of the total residue flow in cooled, compressed residue gas line 19. In some embodiments, the top reflux stream in top reflux line 22/23 comprises primarily, or greater than or equal to about 90, 91, 92, 93, 94, 95, 96, 97 mole percent (mol %) methane.

As noted herein above, the stripper 59 can be operated at a lower pressure than the absorber 56. Accordingly, the stripper overhead (e.g., in stripper overhead line 14) can pass through a compressor (e.g., compressor 61) to increase the pressure thereof and provide compressed stripper overhead in compressed stripper overhead line 24 for introduction into absorber 56 as second reflux in second reflux line 25. The compressed stripper overhead (e.g., in compressed stripper overhead line 24) can be chilled and at least partially condensed in the feed exchanger (e.g., via passage through the stripper overhead core C2 of multi-pass heat exchanger 53), forming the second (e.g., a two-phase) reflux to the absorber. In some embodiments, the second reflux stream in second reflux line 25 comprises primarily, or greater than or equal to about 65, 70, 71, 72, 73, 74, 75, 76, 77, 78, 79, or 80 mol % methane.

Figure 2:
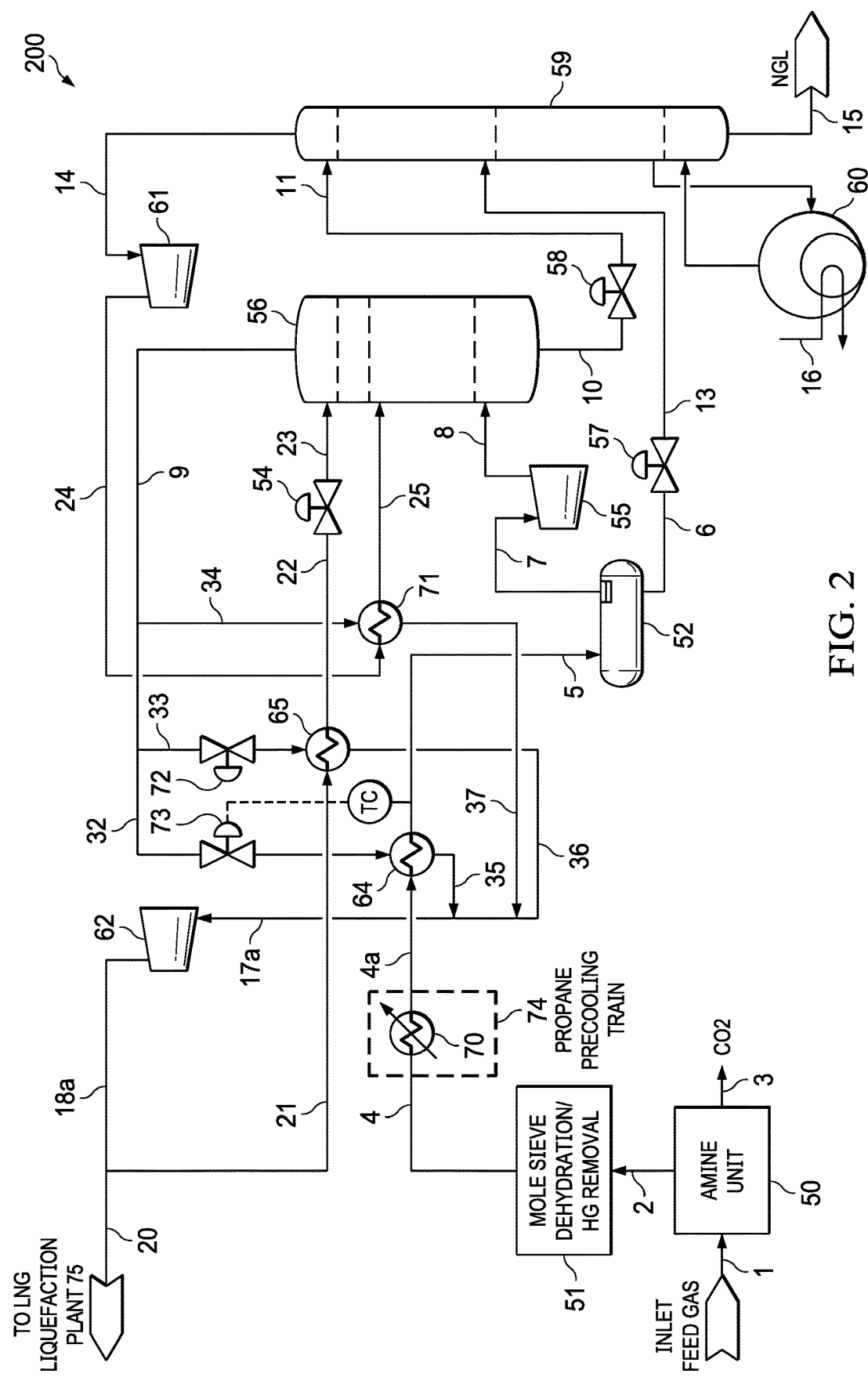
FIG. 2 is a schematic of another heavy hydrocarbon removal system 200.

FIG. 2 is a schematic of another heavy hydrocarbon removal system 200 that includes propane cooling of the feed gas in lieu of the heat exchanger 53 of FIG. 1A and FIG. 1B. In FIG. 2, like numbers represent like components described in relation to FIG. 1A and FIG. 1B.

In FIG. 2, the system 200 can include an amine unit 50, a mole sieve dehydration unit 51, multiple separate heat exchangers 64, 65, 70, and 71, the separator 52, expander 55, the absorber 56, the stripper 59, reboiler 60, compressors 61 and 62, and valves 54, 57, 58, 72, and 73. This equipment is inter-connected as shown by the lines 1, 2, 3, 4, 4a, 5, 6, 7, 8, 9, 10, 11, 13, 14, 15, 16, 17a, 18a, 20, 21, 22, 23, 24, 25, 32, 33, 34, 35, 36, 37.

A description of the herein-disclosed heavy hydrocarbon removal system 200 and the associated methods for operating heavy hydrocarbon removal system 200 of this disclosure will now be provided with reference to FIG. 2.

The amine unit 50 can remove acid gases (e.g., $CO_2$) and a mole sieve dehydration unit 51 that remove water from an inlet gas 1 to form dried, acid-gas free inlet feed gas in line 4, in the same manner as described for FIG. 1A and FIG. 1B. In the embodiment as shown in FIG. 2, the system 200 does not utilize the heat exchanger 53 of system 100 in FIG. 1A and the system 150 of FIG. 1B. Instead, heat exchange of the various lines 4, 9, 21, and 24 is accomplished via multiple separate heat exchangers 64, 65, 70, and 71, each of which can exchange heat between two streams. Moreover, in system 200 of FIG. 2, only one compressor 62 is needed for compression of the combined absorber overhead product stream (residue gas) in line 17, in contrast to the two compressors 62 and 63 utilized in the system 100 of FIG. 1A and the system 150 of FIG. 1B. Additionally, the absorber bottom product stream in line 11 in the system 200 is the stripper feed line and does not pass through a heat exchanger as is done for system 100 in FIG. 1A and the system 150 for FIG. 1B.

As illustrated in FIG. 2, the dried, acid-gas free (or at least substantially acid-gas free) inlet feed gas in line 4 can flow to a propane pre-cooling heat exchanger 70 where the feed gas can be cooled to form cooled feed gas in line 4a. In an embodiment, the propane pre-cooling heat exchanger 70 is part of a propane pre-cooling train 74 of a LNG liquefaction plant 75. In a further embodiment, the propane pre-cooling train 74 of a LNG liquefaction plant 75 can be integrated into the system 200 to cool the feed gas in line 4 and form cooled feed gas in line 4a. Integration can include relocating heat exchange equipment and/or retrofitting the equipment in place with piping/conduit that fluidly connects the propane pre-cooling train 74 in heat exchange relationship with the inlet gas in line 4. Generally, the use of the propane pre-cooling heat exchanger 70 contemplates that the propane cooling is accomplished upstream of where the heavy hydrocarbons and BTEX are removed, i.e., upstream of the absorber 56 and stripper 59, with respect to the flow of the inlet gas in lines 4, 4a, and 5.

The cooled feed gas in line 4a flows to heat exchanger 64 where the cooled feed gas is further cooled by cross-exchange with a portion of the absorber overhead product stream in line 32. Additional cooling of the cooled feed gas in heat exchanger 64 forms the separator feed inlet in line 5. Within the separator 52, the separator feed inlet can be separated into a separator liquid and a separator vapor. The separator feed line 5 can pass the separator feed inlet into the separator 52. The separator vapor can pass through the separator vapor line 7 that fluidly connects the separator 52 with expander 55, and the separator liquid can pass through separator liquid line 6 that fluidly connects the separator 52 with stripper 59 via valve 57. The expander 55 can reduce the pressure of the separator vapor introduced thereto, which once reduced in pressure can be fed to the absorber 56 via the absorber inlet line 8 as described for FIG. 1A and FIG. 1B. In an embodiment, the operating temperature of the expanded vapor 8 can be significantly lower than the temperature of the feed gas in separator feed line 5. It is believed that operating under these lower temperature conditions can reduce the amount of over-flash from the stripper 59 into the stripper overhead product stream in line 14.

The system 200 of FIG. 2 also includes the absorber 56 and stripper 59 as described for the system 100 in FIG. 1A and the system 150 in FIG. 1B. As shown in FIG. 2, the absorber 56 can produce an absorber overhead product stream in line 9 and an absorber bottom product stream in line 10. The absorber overhead product stream in line 9 can split into three portions or parts (e.g., fractions of the absorber overhead product stream): a first part in line 32, a second part in line 33, and a third part in line 34. After cross-exchange with various streams, as described below, the parts 32, 33, and 34 combine with one another to form the heat exchanged absorber overhead product or residue gas in line 17a.

The first part of the absorber overhead in line 32 can be routed to heat exchanger 64 where the first part of the absorber overhead product stream in line 32 can be heat exchanged with the cooled feed gas in line 4a to further cool the feed gas and produce the separator feed in line 5. A temperature controller in line 5 can be connected to a control valve 73, which can be used to control the temperature of the separator feed in line 5 (e.g., in a range of from about −20° F. to about −55° F.). The temperature control set-point can be a function of the NGL content or richness of the feed gas in line 4. The heated first part of the absorber overhead product stream in line 35 exits the heat exchanger 64 at a temperature in a range of from −70° F. to −80° F.

The second part of the absorber overhead in line 33 is routed to the heat exchanger 65 where the second part of the absorber overhead product stream in line 33 can be heated by cross-exchange with a portion of the residue gas in line 21. The portion of the residue gas in line 21 can be cooled by cross-exchange with the second part of the absorber overhead product stream in line 33. Cooling of the portion of residue gas in line 21 forms cooled and condensed residue gas in line 22. The temperature of the residue gas in line 22 can be controlled by the flow rate of the portion of the absorber overage stream in line 33 to the heat exchanger 65. In an embodiment, the flow rate in line 33 is controlled by a flow control valve 72, which is configured to control the flow rate in line 33 to cool the portion of residue gas in line 21 to a temperature of from about −70° F. to about −100° F. in line 22. The temperature set-points are determined by the richness of the feed gas, which tends to increase with increasing richness. Cooled and condensed residue gas in line 22 is further letdown in pressure via a pressure reducing valve 54 to form the top reflux in line 23, which provides the top reflux to the absorber 56. The heated second part of the absorber overhead product stream in line 36 can exit the heat exchanger 65 at a temperature in a range of from about −70° F. to about −80° F.

The third part of the absorber overhead in line 34 can be routed to the heat exchanger 71 where the third part of the absorber overhead product stream line 9 can be cross-exchanged with a stripper overhead product in line 24. In the heat exchanger 71, the third part of the absorber overhead product stream can be heated while the stripper overhead product is cooled. The heated third part of the absorber overhead product stream in line 37 can exit the heat exchanger 71 at a temperature in a range of from about −50° F. to about −80° F. As shown in FIG. 2, the third part of the absorber overhead in line 34 is used to chill the stripper overhead, while maintaining a flow and temperature balance in the system 200. As the flow through line 32 and/or 33 is reduced, the flow of the absorber overhead through line 34 will increase, and vice versa.

The heated first part of the absorber overhead in line 35, the heated second part of the absorber overhead in line 36, and the heated third part of the absorber overhead in line 37 can combine to form the heat exchanged absorber overhead product or residue gas in line 17a.

FIG. 2 illustrates that the heat exchanged absorber overhead or residue gas in line 17 can be compressed in compressor 62. In contrast to the system 100 of FIG. 1A and the system 150 in FIG. 1B, the configuration of the system 200 allows for only one compressor 62 in order to compress the heat exchanged absorber overhead or residue gas in line 17 to appropriate conditions for flow in line 20 to an LNG liquefaction unit. In an embodiment, the conditions of the residue gas in line 18a can include a temperature in a range of from about −35° F. to about −45° F. and a pressure in a range of from about 850 psia to about 900 psia.

As depicted in FIG. 2, line 18a can be configured to split into line 20 and line 21. In embodiments, the residue gas in line 20 and line 21 can have a temperature in a range of from −35 to −45° F. and a pressure in a range of from about 850 psia to 900 psia. In additional or alternative embodiments, the portion of the residue gas in line 21 (e.g., that is used as the top reflux to the absorber 56 via line 22 and line 23) can be about 1% to about 5%, or about 2% to about 3% (on a volumetric basis) of the total flow of the residue gas in line 18a. The balance (about 95% to about 99% or about 97% to about 98%, on a volumetric basis) of the total flow of the residue gas in line 18a) can be sent, via line 20, to the LNG liquefaction train (Mixed Compressor Refrigeration) for further cooling.

In the system 200 of FIG. 2, the absorber bottom product stream in line 10 passes through pressure reduction valve 58, similarly as described for FIG. 1A and FIG. 1B, to produce the reduced pressure absorber bottom product stream in line 11. Line 11 is not needed to help cool the feed gas 4, since sufficient cooling is provided by the propane pre-cooling heat exchanger 70. As such, the reduced-pressure absorber bottom product stream in line 11 can directly feed to the stripper 59. In an aspect, the absorber bottom product stream in line 10 can have a higher critical pressure due to the recycle of the C3 plus components, which can allow for operation of the absorber 56 at a pressure of about 685 psia.

The stripper 59 is configured to produce the stripper overhead product stream in line 14 and the stripper bottom stream in line 15. The stripper overhead in line 14 can be compressed in compressor 61 to form compressed stripper overhead in line 24. Also shown in system 200 of FIG. 2, the compressed stripper overhead product stream in line 24 flows to heat exchanger 71, for cross-exchange with the third part of the absorber overhead product stream in line 34 (e.g., the stripper overhead is cooled and the third part of the absorber overhead is heated).

In an embodiment of the system 200 in FIG. 2, the feed gas in line 4 can be a rich gas, and the cooled gas in line 4a (i.e., flowing from the propane pre-cooling heat exchanger 70) can bypass the heat exchanger 64 and flow directly to the separator 52. In such case, the flow of the first part of absorber overhead in line 32 can continue to flow as depicted in FIG. 2 without being cross-exchanged with the cooled feed gas in line 4a.

In the system 200 of FIG. 2, the heat exchangers 64, 65, and 71 can be made of stainless steel components. This is in contrast to the brazed aluminum material of manufacture for the heat exchanger 53 (e.g., a cold box). Stainless steel heat exchangers are more robust and resistant to thermal stress than brazed aluminum heat exchangers. The use of the brazed aluminum exchanger is not suitable in system 200 because the temperature differentials among the cold stream and the warm stream that feeds to each heat exchanger 64, 65, and 71 can exceed 50° F. temperature differential. That is, stainless steel heat exchangers can be used for higher temperature differentials between the lines that feed to the stainless steel exchanger than brazed aluminum heat exchangers. Brazed aluminum heat exchangers, such as heat exchanger 53 in system 100 of FIGS. 1A and 1n system 150 of FIG. 1B, are typically used for low temperature differentials between the lines that feed to the brazed aluminum heat exchangers, typically 10° F. to 20° F. temperature differential.

The remaining components of the system 200 in FIG. 2 can operate similarly to how said components are described for the system 100 in FIG. 1A and for the system 150 of FIG. 1B.

Figure 3:
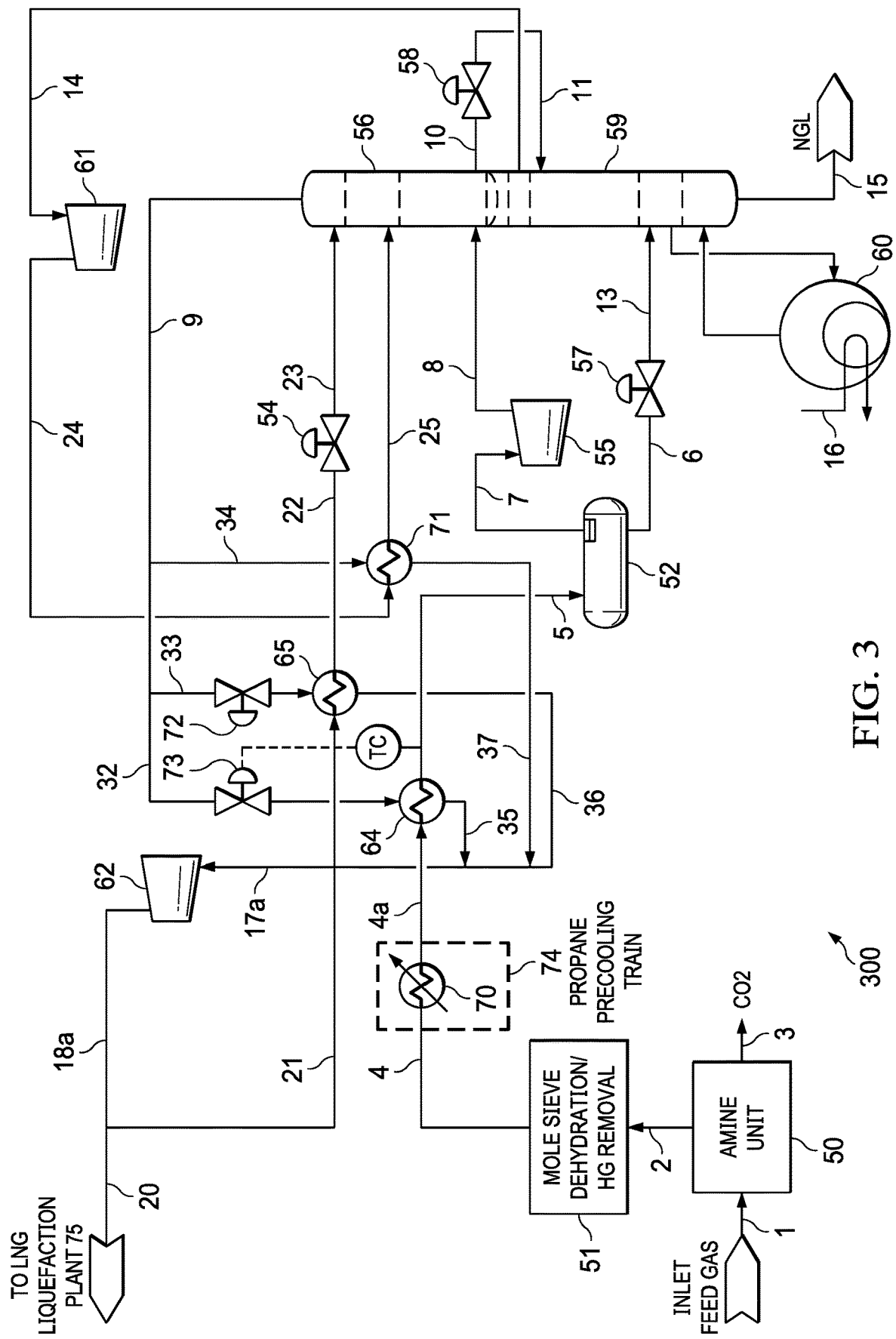
FIG. 3 is a schematic of another heavy hydrocarbon removal system 300.

FIG. 3 is a schematic of another heavy hydrocarbon removal system 300 that includes propane cooling of the feed gas in lieu of the heat exchanger 53 of FIGS. 1A and 1B and a single column design for the absorber 56 and stripper 59. In FIG. 3, like numbers represent like components described in relation to FIG. 1A, FIG. 1B, and FIG. 2.

In FIG. 3, the absorber 56 and stripper 59 are integrated into a single column as separate sections, and the absorber 56 is directly above the stripper 59. A pressure bulkhead can be present in the column to allow the absorber 56 and the stripper 59 to operate at different conditions (e.g., temperature, pressure, etc.). The absorber bottom product stream is a liquid in line 10. The liquid in line 10 can flow from the bottom of the absorber 56 to the valve 58, where the liquid is letdown in pressure and fed in line 11 to the stripper 59. The stripper overhead vapor in line 14 can be compressed by compressor 61 for use as the second reflux to the absorber 56. The description of other stream remains the same as in FIG. 2. The functionality of the absorber 56 and stripper 59 are the same as described for FIG. 2. The remaining components of the system 300 in FIG. 3 can operate similarly to how said components are described for the system 100 in FIG. 1A, for the system 150 of FIG. 1B, or for the system 200 in FIG. 2. The methods for operating heavy hydrocarbon removal system 300 of FIG. 3 are the same as described for the system 200 in FIG. 2.

Although the methods described herein include an expander, such as a turbo expander, and refrigeration that can use propane for chilling of a feed gas, other cooling methods may be utilized, in some embodiments, and such methods are within the scope of this disclosure. The methods that involve the multi-pass heat exchanger can, in some embodiments, be replaced by multiple separate heat exchangers, or vice versa.

In some embodiments, the herein-disclosed heavy hydrocarbon removal systems 100, 150, 200, and 300 are utilized to produce a residue gas that meets heavy hydrocarbons and BTEX specifications of feed gas to LNG liquefaction. In some embodiments, efficient twin reflux operation via the heavy hydrocarbon removal system and method of this disclosure provides a residue gas comprising less than 1.0, 0.5, or 0.1 ppmv benzene and/or substantially no or less than 0.3, 0.2, or 0.1 ppmv toluene and/or xylene, and/or a residue gas having less than the thresholds listed in Table 2. In some embodiments, the heavy hydrocarbons and aromatics content of the residue gas in residue gas product line 20 is less than or equal to about 0.5 ppmv. Such a residue gas may not present freezing issues in an LNG liquefier.

In some embodiments, the disclosed heavy hydrocarbon removal systems 100, 150, 200, and 300 are utilized to produce a residue gas product in line 20 having a pressure in the range of 800 psig to 900 psig. Achieving the pressure can utilize the compressors 62 and/or 63 shown in FIGS. 1A, 1, 2, and 3. Alternatively, it is contemplated that the systems 150, 200, and 300 that utilize propane pre-cooling of the inlet gas can be operated such that the residue gas product in line 20 is produced at a pressure in the range of 800 psig to 900 psig without recompression or with only limited recompression.

The heavy hydrocarbon removal methods and configurations disclosed herein can be utilized in a new grass-root installation and/or in retrofitting existing plants for NGL recovery. In some embodiments, portions of the herein-disclosed heavy hydrocarbon removal systems and methods are applied to retrofitting NGL recovery plants for heavy hydrocarbons removal. For example, retrofitting may include the use of the herein-disclosed multi-pass heat exchanger 53 to allow closer temperature approaches among different cooling and heating streams. In some embodiments, multi-pass heat exchanger 53 of this disclosure comprises a refrigerant core or pass. In some embodiments, the refrigerant comprises propane, such that the multi-pass heat exchanger provides a propane chiller pass. Such a chiller pass can open up the temperature approaches among heat curves, resulting in lowering the reflux liquid temperature to the absorber 56, in some embodiments. In alternative embodiments, retrofitting may include the use of the herein-disclosed multiple separate heat exchangers 64, 65, 70, and 71 in lieu of the single heat exchanger 53. All these embodiments can integrate (e.g., by relocating equipment or connecting equipment by conduits/piping) the propane pre-cooling train from the LNG liquefaction plant 75 with the heavy hydrocarbons and benzene extraction system 150, 200, or 300, and can produce a high pressure residue gas in line 20 to the LNG liquefaction plant 75 (e.g., for used in the a mixed refrigeration unit (MRU) of the plant 75).

Heavy hydrocarbon removal systems and methods for producing a natural gas liquids stream as disclose herein provide a plant comprising two columns, an absorber and a stripper. In some embodiments, the stripper operates as a deethanizer. A residue gas recycle stream can be recycled to provide a top reflux to the absorber and a stripper overhead vapor is utilized to provide a second reflux to the absorber. In some embodiments, the top reflux and the second reflux are introduced into a top portion of the absorber. The second reflux is introduced into the top portion of the absorber below introduction of the top reflux, in some embodiments. Accordingly, the herein-disclosed heavy hydrocarbon removal system and method can provide utilization of the stripper overhead vapor and a residue gas recycle stream to provide dual reflux to the absorber. In some embodiments, the system and method disclosed herein utilize a portion of the high pressure residue gas that is subcooled and letdown in pressure to the absorber as a top reflux stream to the absorber. The absorber can thus be constructed with two reflux nozzles, with the top nozzle supplied by the top reflux of high pressure residue gas liquid, and the second nozzle supplied by the second reflux obtained from the stripper overhead vapor.

EXAMPLES

The embodiments having been generally described, the following examples are given as particular embodiments of the disclosure and to demonstrate the practice and advantages thereof. It is understood that the examples are given by way of illustration and are not intended to limit the specification or the claims in any manner.

Example 1

A simulation was used to determine the heat and material balance of a heavy hydrocarbon removal system and method of this disclosure according to the system 100 shown in FIG. 1A. The results are provided in Table 3, which tabulates parameters for the inlet feed gas in inlet feed gas stream line 1, absorber overhead in absorber overhead product stream in line 9, absorber bottom product stream in line 10, deethanizer stripper overhead in stripper overhead line 14, NGL product in NGL product line 15, residual gas in residual gas recycle line 21, and residue gas in residue gas product line 20.

TABLE 3

Heat and Material Balance

| Stream No. | *4 | *5 | *6 | *7 | *8 | *9 | *10 | *11 | *12 |
|---|---|---|---|---|---|---|---|---|---|
| Mol % | Feed Gas | Chilled Feed | Flash liquid from separator | Flash vapor from separator | Expander discharge | Absorber Overhead | Absorber Bottom | Absorber Bottom Flash | Absorber Bottom from Exchanger |
| Nitrogen | 0.4324 | 0.4324 | 0.0610 | 0.4324 | 0.4324 | 0.4329 | 0.1024 | 0.1024 | 0.1024 |
| CO2 | 0.0050 | 0.0050 | 0.0090 | 0.0050 | 0.0050 | 0.0050 | 0.0120 | 0.0120 | 0.0120 |
| Methane | 96.9428 | 96.9428 | 49.6044 | 96.9464 | 96.9464 | 97.0635 | 75.0465 | 75.0465 | 75.0465 |
| Ethane | 2.2205 | 2.2205 | 6.6559 | 2.2201 | 2.2201 | 2.2226 | 11.3315 | 11.3315 | 11.3315 |
| Propane | 0.2368 | 0.2368 | 2.4174 | 0.2366 | 0.2366 | 0.2136 | 4.2346 | 4.2346 | 4.2346 |
| i-butane | 0.0451 | 0.0451 | 1.1037 | 0.0451 | 0.0451 | 0.0310 | 1.6427 | 1.6427 | 1.6427 |
| n-butane | 0.0421 | 0.0421 | 1.5390 | 0.0420 | 0.0420 | 0.0237 | 1.9366 | 1.9366 | 1.9366 |
| i-pentane | 0.0201 | 0.0201 | 1.6118 | 0.0199 | 0.0199 | 0.0050 | 1.3746 | 1.3746 | 1.3746 |
| n-pentane | 0.0170 | 0.0170 | 1.9550 | 0.0169 | 0.0169 | 0.0025 | 1.2931 | 1.2931 | 1.2931 |
| Hexane | 0.0191 | 0.0191 | 6.4483 | 0.0186 | 0.0186 | 0.0000 | 1.5933 | 1.5933 | 1.5933 |
| Heptane | 0.0090 | 0.0090 | 8.2834 | 0.0084 | 0.0084 | 0.0000 | 0.7121 | 0.7121 | 0.7121 |
| Octane | 0.0030 | 0.0030 | 6.9128 | 0.0025 | 0.0025 | 0.0000 | 0.2102 | 0.2102 | 0.2102 |
| Nonane | 0.0010 | 0.0010 | 4.7678 | 0.0006 | 0.0006 | 0.0000 | 0.0543 | 0.0543 | 0.0543 |
| Benzene, ppmv | 30.1 | 30.1 | 15,552 | 28.9 | 28.9 | 0.2 | 2,464 | 2,464 | 2,464 |
| Toluene, ppmv | 20.1 | 20.1 | 28,940 | 17.9 | 17.9 | 0.0 | 1,515 | 1,515 | 1,515 |
| Xylene, ppmv | 10.0 | 10.0 | 41,812 | 6.9 | 6.9 | 0.0 | 581 | 581 | 581 |
| lb mole/h | 91,872 | 91,872 | 7 | 91,865 | 91,865 | 95,086 | 1,090 | 1,090 | 1,090 |
| Temperature, °F. | 63 | −60 | −60 | −60 | −101.5 | −104.2 | −101.6 | −124.3 | 0.0 |
| Pressure, psia | 978 | 973 | 973 | 973 | 638 | 635 | 637 | 422 | 419 |

| Stream No. | *14 | *15 | *17 | *18 | *19 | *20 | *21 | *24 | *25 |
|---|---|---|---|---|---|---|---|---|---|
| Mol % | Stripper Overh'd | Stripper Bottom | Resid Gas from Exch | Expandr Compr Disch | Residue Gas Compr Disch | Sales Gas | Resid Gas Recycle | Stripper Overh'd Comp Disch | Stripper Overh'd from Exch |
| Nitrogen | 0.1140 | 0.0000 | 0.4329 | 0.4329 | 0.4329 | 0.4329 | 0.4329 | 0.1140 | 0.1140 |
| CO2 | 0.0134 | 0.0000 | 0.0050 | 0.0050 | 0.0050 | 0.0050 | 0.0050 | 0.0134 | 0.0134 |
| Methane | 83.5964 | 0.0008 | 97.0635 | 97.0635 | 97.0635 | 97.0635 | 97.0635 | 83.5964 | 83.5964 |
| Ethane | 12.5586 | 0.4992 | 2.2226 | 2.2226 | 2.2226 | 2.2226 | 2.2226 | 12.5586 | 12.5586 |
| Propane | 2.5207 | 18.8588 | 0.2136 | 0.2136 | 0.2136 | 0.2136 | 0.2136 | 2.5207 | 2.5207 |
| i-butane | 0.5029 | 11.4086 | 0.0310 | 0.0310 | 0.0310 | 0.0310 | 0.0310 | 0.5029 | 0.5029 |
| n-butane | 0.4315 | 14.8513 | 0.0237 | 0.0237 | 0.0237 | 0.0237 | 0.0237 | 0.4315 | 0.4315 |
| i-pentane | 0.1303 | 12.0858 | 0.0050 | 0.0050 | 0.0050 | 0.0050 | 0.0050 | 0.1303 | 0.1303 |
| n-pentane | 0.0891 | 11.6841 | 0.0025 | 0.0025 | 0.0025 | 0.0025 | 0.0025 | 0.0891 | 0.0891 |
| Hexane | 0.0325 | 15.3065 | 0.0000 | 0.0000 | 0.0000 | 0.0000 | 0.0000 | 0.0325 | 0.0325 |
| Heptane | 0.0044 | 7.2558 | 0.0000 | 0.0000 | 0.0000 | 0.0000 | 0.0000 | 0.0044 | 0.0044 |
| Octane | 0.0004 | 2.4201 | 0.0000 | 0.0000 | 0.0000 | 0.0000 | 0.0000 | 0.0004 | 0.0004 |
| Nonane | 0.0000 | 0.8067 | 0.0000 | 0.0000 | 0.0000 | 0.0000 | 0.0000 | 0.0000 | 0.0000 |
| Benzene, ppmv | 48.2 | 24,025 | 0.2 | 0.2 | 0.2 | 0.2 | 0.2 | 48.2 | 48.2 |
| Toluene, ppmv | 8.4 | 16,131 | 0.0 | 0.0 | 0.0 | 0.0 | 0.0 | 8.4 | 8.4 |

TABLE 3-continued

Heat and Material Balance

| Xylene, ppmv | 0.8 | 8,067 | 0.0 | 0.0 | 0.0 | 0.0 | 0.0 | 0.8 | 0.8 |
|---|---|---|---|---|---|---|---|---|---|
| lb mole/h | 982 | 114 | 95,086 | 95,086 | 95,086 | 91,758 | 3,328 | 982 | 982 |
| Temperature, ° F. | 5.4 | 311 | 31 | 51 | 101 | 96 | 96 | 69.0 | −100.0 |
| Pressure, psia | 415 | 418 | 630 | 721 | 988 | 978 | 978 | 645 | 640 |

Example 2

Figure 4:
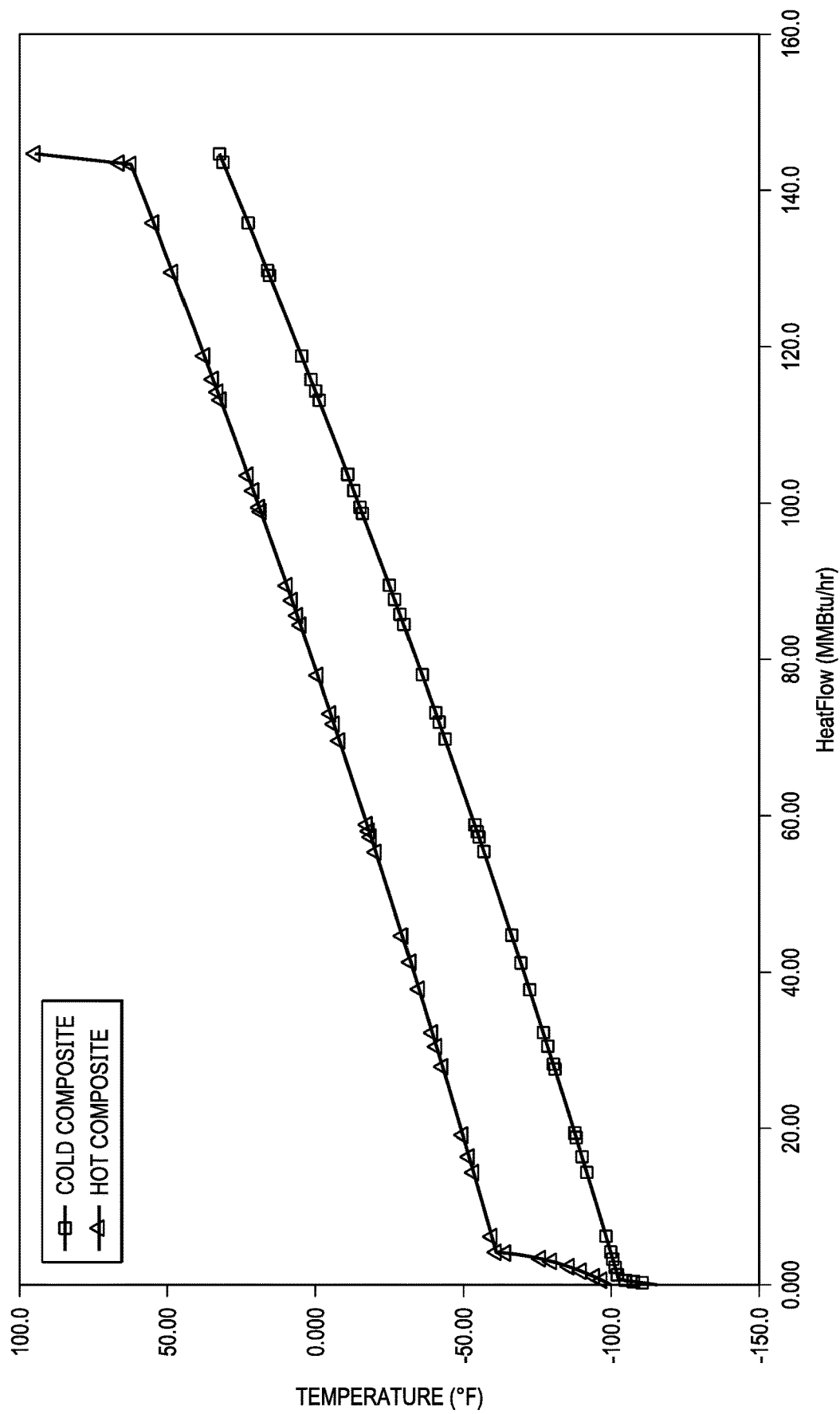
FIG. 4 is a heat composite curve for a feed exchanger 53 according to embodiments of this disclosure.

A heat composite curve for a feed exchanger 53 according to this disclosure is provided in FIG. 4. This process demonstrates the efficiency of the process configuration and the utilization of the multi-pass exchanger 53, as shown by the close temperature approach between the heating curve and the cooling curve composite. The process also recovers about 9% propane from the feed gas, which may be used for propane makeup for the refrigeration compressors.

Example 3

Example 3 demonstrates process performance when varying heavy hydrocarbon content of a lean inlet feed gas. The herein disclosed heavy hydrocarbon removal system 100 and method can be effective for inlet feed gas with higher heavy hydrocarbon (HHC) and aromatic content (e.g., heavy hydrocarbon, aromatic, and/or benzene content of greater than or equal to about 500, 300, 100 or ppmv). Table 4 provides performance results for a lean gas comprising 0.12 $C_{3+}$ GPM, a design gas comprising 0.11 $C_{3+}$ GPM, and a rich gas comprising 0.52 $C_{3+}$ GPM.

As seen from the data in Table 4, the herein disclosed heavy hydrocarbon removal system 100 and method can effectively remove substantially all (e.g., greater than or equal to about 95%) of the $C_6$, benzene and aromatics, when the benzene content is as high as 106 ppmv or more. An additional benefit provided by the herein disclosed heavy hydrocarbon removal system and method can be, In some embodiments, that the residual gas outlet pressure and the NGL product rate can increase, due to a sponging effect of a higher C3+ content, when present. The heavy hydrocarbons can provide a sponging effect for absorption of, for example, the ethane components to increase ethane recovery. That is, when the feed gas contains more hexane, heptane, octane and/or heavier hydrocarbons, most of these heavy hydrocarbons can drop out in separator 52, and can be used for the absorption of ethane from the feed gas. This can be referred to as a 'sponging effect' which can, In some embodiments, increase an overall ethane recovery, without concomitantly increasing power consumption.

TABLE 4

Process Performance for Varying HHC of the Lean Inlet Feed Gas

|  | Lean Gas | Design | Rich Gas |
|---|---|---|---|
| Feed Gas, MMscfd | 852 | 852 | 852 |
| Feed Gas pressure, psia | 1,140 | 1,140 | 1,140 |
| C3 Recovery | 6% | 10% | 29% |
| Benzene in ppmv | 26 | 31 | 106 |
| Benzene out, ppm | 0.359 | 0.137 | 0.002 |
| C6 out, ppmv | 0.134 | 0.164 | 0.003 |
| NGL production, BPD | 203 | 558 | 1,745 |
| Absorber pressure, psia | 635 | 655 | 645 |
| Residue Gas Outlet Pressure, psia | 745 | 770 | 797 |

Example 4

Example 4 demonstrates process performance for integrating the NGL extraction to an LNG liquefaction train. As discussed above for FIG. 2 and FIG. 3, the systems 200 and 300 can utilize propane pre-cooling heat exchanger 70 to cool the acid-gas free dried feed gas in line 4. The propane pre-cooling heat exchanger 70 can be in the propane pre-cooling system in an LNG liquefaction train. Integration of the propane pre-cooling system of an LNG liquefaction train into the system 200 or 300, or vice versa, is accomplished by relocating the propane pre-cooling train 74 of the LNG liquefaction plant 75 to the NGL extraction train of system 200 or 300. When compared to the system 100 of FIG. 1As, the energy savings of integrating the propane pre-cool system from a LNG liquefaction train into the system 200 or 300 is about 4 to 6%, which can be used to produce additional LNG. For example, the power savings for a flow rate of 900 MMscfd feed gas is about 10 to 12 MW, which is allowed because the configuration of system 100 eliminates or reduces the re-compression severity to convert the absorber overhead product to residue gas suitable for flow in line 20 (e.g., FIGS. 2 and 3 show one residue gas compressor 62, whereas FIG. 1A shows two residue gas compressors 62 and 63).

In the integrated process of FIG. 2, feed stream 4 is precooled from 70° F. to −30° F. with propane pre-cooling heat exchanger 70, which is relocated from or built into the LNG liquefaction plant 75. This operation reduces the cooling duty in the downstream heat exchanger 64, consequently reducing the shell side outlet temperature from heat exchangers 64, 65 and 71, to about −70 to −80° F. For Example 4, heat exchangers 64, 65, and 71 are embodied as are stainless steel shell and tube exchangers.

In Example 4, the flow rate of the first part of the absorber overhead in line 32 is about 70% of the total flow rate of the absorber overhead in line 9. The heat exchanger 64, using temperature control valve 73, controls the temperature of separator feed line 5 to a temperature in a range of from −20 to −55° F. The temperatures of the reflux in lines 22 and 25 are increased from −100° F. to −70° F. to reduce the over-condensation of NGL in the absorber 56. Sufficient cooling of the feed gas 4 is provided by the propane pre-cooling heat exchanger 70. As such, the absorber bottoms stream in line 11 can be directly fed to the stripper 59.

In Example 4, heat exchangers 64, 65, and 70 are shell and tube design. Stream 35, 36 and 37 exit the heat exchangers 64, 65, and 70 at a temperature in the range of −70 to −80° F. The product gas from the compressor 62 is at −35 to −45° F. and 850 to 900 psia. About 2 to 3% of the compressed residue gas in line 18a is used as reflux in lines 21/22/23 to the absorber 56, with the remaining flow sent in line 20 to the LNG liquefaction train. The lean gas and the rich gas operation heat and material balances are respectively shown in Table 5 and Table 6.

TABLE 5

Lean Gas Case Heat and Material Balance for FIG. 2

| Stream No. | *1 | *4 | *5 | *7 | *8 | *9 | *10 | *11 | *14 |
|---|---|---|---|---|---|---|---|---|---|
| Mol % | Dry Feed Gas | Chilled Feed by C3 Refrig | Chilled Feed from Exch 64 | Flash vapor from separator | Expander discharge | Absorber Overhead | Absorber Bottom | Liquid from separator | Stripper Overhead |
| Nitrogen | 0.4323 | 0.4323 | 0.4323 | 0.4323 | 0.4323 | 0.4326 | 0.1025 | 0.0133 | 0.1099 |
| CO2 | 0.0050 | 0.0050 | 0.0050 | 0.0050 | 0.0050 | 0.0050 | 0.0117 | 0.0063 | 0.0126 |
| Methane | 96.9217 | 96.9217 | 96.9217 | 96.9217 | 96.9217 | 96.9830 | 74.1917 | 0.0000 | 79.6168 |
| Ethane | 2.2417 | 2.2417 | 2.2417 | 2.2417 | 2.2417 | 2.2432 | 10.8649 | 0.0000 | 11.6593 |
| Propane | 0.2367 | 0.2367 | 0.2367 | 0.2367 | 0.2367 | 0.2368 | 4.0200 | 0.0000 | 4.3106 |
| i-butane | 0.0451 | 0.0451 | 0.0451 | 0.0451 | 0.0451 | 0.0447 | 1.6263 | 0.0000 | 1.6898 |
| n-butane | 0.0421 | 0.0421 | 0.0421 | 0.0421 | 0.0421 | 0.0403 | 1.9837 | 0.0000 | 1.9094 |
| i-pentane | 0.0201 | 0.0201 | 0.0201 | 0.0201 | 0.0201 | 0.0093 | 1.5306 | 0.0000 | 0.3946 |
| n-pentane | 0.0171 | 0.0171 | 0.0171 | 0.0171 | 0.0171 | 0.0050 | 1.5123 | 0.0000 | 0.2290 |
| Hexane | 0.0191 | 0.0191 | 0.0191 | 0.0191 | 0.0191 | 0.0001 | 2.0888 | 0.0000 | 0.0507 |
| Heptane | 0.0090 | 0.0090 | 0.0090 | 0.0090 | 0.0090 | 0.0000 | 0.9800 | 0.0000 | 0.0072 |
| Octane | 0.0030 | 0.0030 | 0.0030 | 0.0030 | 0.0030 | 0.0000 | 0.3253 | 0.0000 | 0.0008 |
| Nonane | 0.0010 | 0.0010 | 0.0010 | 0.0010 | 0.0010 | 0.0000 | 0.1083 | 0.0000 | 0.0001 |
| Benzene, ppmv | 30.1 | 30.1 | 30 | 30.1 | 30.1 | 0.4 | 3,278 | 0 | 76 |
| Toluene, ppmv | 20.1 | 20.1 | 20 | 20.1 | 20.1 | 0.0 | 2,175 | 0 | 14 |
| Xylene, ppmv | 10.0 | 10.0 | 10 | 10.0 | 10.0 | 0.0 | 1,083 | 0 | 2 |
| lb mole/h | 97,125 | 97,125 | 97,125 | 97,125 | 97,125 | 99,564 | 901 | 0 | 839 |
| Temperature, °F. | 70 | −28 | −51 | −51 | −98.5 | −100.0 | −98.6 | −51.0 | 45.3 |
| Pressure, psia | 1110 | 1105 | 1098 | 1098 | 675 | 672 | 674 | 1098 | 395 |

| Stream No. | *15 | *17 | *20 | *21 | *23 |
|---|---|---|---|---|---|
| Mol % | Stripper Bottom | Vapor to Expander Compr. | Vapor to LNG Liquefac. | Residue Gas Recycle | Residue Gas Reflux |
| Nitrogen | 0.0000 | 0.4326 | 0.4326 | 0.4326 | 0.4326 |
| CO2 | 0.0000 | 0.0050 | 0.0050 | 0.0050 | 0.0050 |
| Methane | 0.0000 | 96.9830 | 96.9830 | 96.9830 | 96.9830 |
| Ethane | 0.0008 | 2.2432 | 2.2432 | 2.2432 | 2.2432 |
| Propane | 0.0459 | 0.2368 | 0.2368 | 0.2368 | 0.2368 |
| i-butane | 0.7592 | 0.0447 | 0.0447 | 0.0447 | 0.0447 |
| n-butane | 3.0004 | 0.0403 | 0.0403 | 0.0403 | 0.0403 |
| i-pentane | 17.0670 | 0.0093 | 0.0093 | 0.0093 | 0.0093 |
| n-pentane | 19.0624 | 0.0050 | 0.0050 | 0.0050 | 0.0050 |
| Hexane | 29.9624 | 0.0001 | 0.0001 | 0.0001 | 0.0001 |
| Heptane | 14.2840 | 0.0000 | 0.0000 | 0.0000 | 0.0000 |
| Octane | 4.7627 | 0.0000 | 0.0000 | 0.0000 | 0.0000 |
| Nonane | 1.5876 | 0.0000 | 0.0000 | 0.0000 | 0.0000 |
| Benzene, ppmv | 47,069 | 0 | 0.4 | 0.4 | 0.4 |
| Toluene, ppmv | 31,731 | 0 | 0.0 | 0.0 | 0.0 |
| Xylene, ppmv | 15,875 | 0 | 0.0 | 0.0 | 0.0 |
| lb mole/h | 61 | 99,564 | 97,064 | 2,500 | 2,500 |
| Temp., °F. | 422.2 | −75 | −44 | −44 | −111 |
| Press., psia | 398 | 665 | 856 | 856 | 677 |

| Stream No. | *24 | *25 | *26 | *27 | *28 |
|---|---|---|---|---|---|
| Mol % | Booster Compr Disch. | Booster Compr Reflux | Absorber Vapor to Exch. 64 | Absorber Vapor to Exch.65 | Absorber Vapor to Exch. 71 |
| Nitrogen | 0.1099 | 0.1099 | 0.4326 | 0.4326 | 0.4326 |
| CO2 | 0.0126 | 0.0126 | 0.0050 | 0.0050 | 0.0050 |
| Methane | 79.6168 | 79.6168 | 96.9830 | 96.9830 | 96.9830 |
| Ethane | 11.6593 | 11.6593 | 2.2432 | 2.2432 | 2.2432 |
| Propane | 4.3106 | 4.3106 | 0.2368 | 0.2368 | 0.2368 |
| i-butane | 1.6898 | 1.6897 | 0.0447 | 0.0447 | 0.0447 |
| n-butane | 1.9094 | 1.9094 | 0.0403 | 0.0403 | 0.0403 |
| i-pentane | 0.3946 | 0.3946 | 0.0093 | 0.0093 | 0.0093 |
| n-pentane | 0.2290 | 0.2290 | 0.0050 | 0.0050 | 0.0050 |
| Hexane | 0.0507 | 0.0507 | 0.0001 | 0.0001 | 0.0001 |
| Heptane | 0.0072 | 0.0072 | 0.0000 | 0.0000 | 0.0000 |
| Octane | 0.0008 | 0.0008 | 0.0000 | 0.0000 | 0.0000 |
| Nonane | 0.0001 | 0.0001 | 0.0000 | 0.0000 | 0.0000 |
| Benzene, ppmv | 76.2 | 76.1 | 0.4 | 0.4 | 0.4 |
| Toluene, ppmv | 14.1 | 14.1 | 0.0 | 0.0 | 0.0 |
| Xylene, ppmv | 1.9 | 1.9 | 0.0 | 0.0 | 0.0 |
| lb mole/h | 839 | 839 | 69,695 | 14,935 | 14,935 |
| Temp., °F. | 123 | −94 | −100.0 | −100.0 | −100.0 |
| Press., psia | 678 | 674 | 672 | 672 | 672 |

TABLE 6

Rich Gas Case Heat and Material Balance for FIG. 2

| Stream No. | *1 | *4 | *5 | *7 | *8 | *9 | *10 | *11 | *14 |
|---|---|---|---|---|---|---|---|---|---|
| Mol % | Dry Feed Gas | Chilled Feed by C3 Refrig | Chilled Feed from Exch 64 | Flash vapor from separator | Expander discharge | Absorber Overhead | Absorber Bottom | Liquid from separator | Stripper Overhead |
| Nitrogen | 0.4141 | 0.4141 | 0.4141 | 0.4148 | 0.4148 | 0.4184 | 0.0739 | 0.0759 | 0.0997 |
| CO2 | 0.0050 | 0.0050 | 0.0050 | 0.0050 | 0.0050 | 0.0051 | 0.0092 | 0.0068 | 0.0122 |
| Methane | 94.1345 | 94.1345 | 94.1345 | 94.2235 | 94.2235 | 95.1070 | 58.4384 | 50.2809 | 78.1882 |
| Ethane | 3.5796 | 3.5796 | 3.5796 | 3.5695 | 3.5695 | 3.6114 | 14.2502 | 8.5501 | 18.6370 |
| Propane | 1.1386 | 1.1386 | 1.1386 | 1.1251 | 1.1251 | 0.7180 | 12.9984 | 7.7668 | 2.6108 |
| i-butane | 0.2396 | 0.2396 | 0.2396 | 0.2333 | 0.2333 | 0.0800 | 4.2740 | 3.3606 | 0.2448 |
| n-butane | 0.2193 | 0.2193 | 0.2193 | 0.2111 | 0.2111 | 0.0511 | 4.3839 | 4.2380 | 0.1618 |
| i-pentane | 0.0975 | 0.0975 | 0.0975 | 0.0903 | 0.0903 | 0.0070 | 2.2349 | 3.6323 | 0.0291 |
| n-pentane | 0.0612 | 0.0612 | 0.0612 | 0.0553 | 0.0553 | 0.0020 | 1.4250 | 2.9642 | 0.0128 |
| Hexane | 0.0506 | 0.0506 | 0.0506 | 0.0397 | 0.0397 | 0.0000 | 1.0535 | 5.4450 | 0.0025 |
| Heptane | 0.0271 | 0.0271 | 0.0271 | 0.0161 | 0.0161 | 0.0000 | 0.4283 | 5.4304 | 0.0003 |
| Octane | 0.0120 | 0.0120 | 0.0120 | 0.0045 | 0.0045 | 0.0000 | 0.1202 | 3.6939 | 0.0000 |
| Nonane | 0.0025 | 0.0025 | 0.0025 | 0.0005 | 0.0005 | 0.0000 | 0.0138 | 0.9794 | 0.0000 |
| Benzene, ppmv | 106.0 | 106.0 | 106.0 | 78.0 | 78.0 | 0.1 | 2,071.2 | 13,915.5 | 5.6 |
| Toluene, ppmv | 50.9 | 50.9 | 50.9 | 26.5 | 26.5 | 0.0 | 704.4 | 12,063.2 | 0.6 |
| Xylene, ppmv | 26.8 | 26.8 | 26.8 | 7.0 | 7.0 | 0.0 | 186.2 | 9,777.1 | 0.0 |
| lb mole/h | 93,698 | 93,698 | 93,698 | 93,508 | 93,508 | 95,240 | 3,525 | 190 | 2,757 |
| Temperature, ° F. | 70 | −26 | −28 | −28 | −79 | −81 | −79 | −28 | −25 |
| Pressure, psia | 1,110 | 1,105 | 1,098 | 1,098 | 648 | 645 | 647 | 1,098 | 395 |

| Stream No. | *15 | *17 | *20 | *21 | *23 |
|---|---|---|---|---|---|
| Mol % | Stripper Bottom | Vapor to Exp Compr | Vapor to LNG Liquefac. | Resid Gas Recycle | Resid Gas Reflux |
| Nitrogen | 0.0000 | 0.4184 | 0.4184 | 0.4184 | 0.4184 |
| CO2 | 0.0000 | 0.0051 | 0.0051 | 0.0051 | 0.0051 |
| Methane | 0.0000 | 95.1070 | 95.1070 | 95.1070 | 95.1070 |
| Ethane | 0.5000 | 3.6114 | 3.6114 | 3.6114 | 3.6114 |
| Propane | 41.8494 | 0.7180 | 0.7180 | 0.7180 | 0.7180 |
| i-butane | 15.6860 | 0.0800 | 0.0800 | 0.0800 | 0.0800 |
| n-butane | 16.5026 | 0.0511 | 0.0511 | 0.0511 | 0.0511 |
| i-pentane | 8.8581 | 0.0070 | 0.0070 | 0.0070 | 0.0070 |
| n-pentane | 5.7928 | 0.0020 | 0.0020 | 0.0020 | 0.0020 |
| Hexane | 4.9468 | 0.0000 | 0.0000 | 0.0000 | 0.0000 |
| Heptane | 2.6501 | 0.0000 | 0.0000 | 0.0000 | 0.0000 |
| Octane | 1.1736 | 0.0000 | 0.0000 | 0.0000 | 0.0000 |
| Nonane | 0.2448 | 0.0000 | 0.0000 | 0.0000 | 0.0000 |
| Benzene, ppmv | 10,359.5 | 0.1 | 0.1 | 0.1 | 0.1 |
| Toluene, ppmv | 4,978.6 | 0.0 | 0.0 | 0.0 | 0.0 |
| Xylene, ppmv | 2,620.9 | 0.0 | 0.0 | 0.0 | 0.0 |
| lb mole/h | 958 | 95,240 | 92,740 | 2,500 | 2,500 |
| Temperature, ° F. | 234 | −74 | −34 | −34 | −95 |
| Pressure, psia | 398 | 638 | 880 | 880 | 650 |

| Stream No. | *24 | *25 | *26 | *27 | *28 |
|---|---|---|---|---|---|
| Mol % | Booster Compr Disch. | Booster Compr Reflux | Absorber Vapor to Exch 64 | Absorber Vapor to Exch 66 | Absorber Vapor to Exch 65 |
| Nitrogen | 0.0997 | 0.0997 | 0.4184 | 0.4184 | 0.4184 |
| CO2 | 0.0122 | 0.0122 | 0.0051 | 0.0051 | 0.0051 |
| Methane | 78.1882 | 78.1882 | 95.1070 | 95.1070 | 95.1070 |
| Ethane | 18.6370 | 18.6370 | 3.6114 | 3.6114 | 3.6114 |
| Propane | 2.6108 | 2.6108 | 0.7180 | 0.7180 | 0.7180 |
| i-butane | 0.2448 | 0.2448 | 0.0800 | 0.0800 | 0.0800 |
| n-butane | 0.1618 | 0.1618 | 0.0511 | 0.0511 | 0.0511 |
| i-pentane | 0.0291 | 0.0291 | 0.0070 | 0.0070 | 0.0070 |
| n-pentane | 0.0128 | 0.0128 | 0.0020 | 0.0020 | 0.0020 |
| Hexane | 0.0025 | 0.0025 | 0.0000 | 0.0000 | 0.0000 |
| Heptane | 0.0003 | 0.0003 | 0.0000 | 0.0000 | 0.0000 |
| Octane | 0.0000 | 0.0000 | 0.0000 | 0.0000 | 0.0000 |
| Nonane | 0.0000 | 0.0000 | 0.0000 | 0.0000 | 0.0000 |
| Benzene, ppmv | 5.6 | 5.6 | 0.1 | 0.1 | 0.1 |
| Toluene, ppmv | 0.6 | 0.6 | 0.0 | 0.0 | 0.0 |
| Xylene, ppmv | 0.0 | 0.0 | 0.0 | 0.0 | 0.0 |
| lb mole/h | 2,757 | 2,757 | 9,524 | 47,620 | 38,096 |

TABLE 6-continued

| Rich Gas Case Heat and Material Balance for FIG. 2 | | | | | |
|---|---|---|---|---|---|
| Temperature, °F. | 44 | −72 | −81 | −81 | −81 |
| Pressure, psia | 651 | 647 | 645 | 645 | 645 |

Example 5

The following is an example showing the column tray profiles in the high pressure absorber and the low pressure deethanizer, using the two refluxes configuration for the removal of benzene and heavier components. This example uses the lean gas composition shown in Table 1, which has very low NGL (C3+) and heavy hydrocarbons contents. The feed gas flow rate can range from 800 to 1200 MM/scfd.

Example 5 shows the vapor and liquid equilibrium compositions from each stage of the absorber simulated with the ASPEN Hysys simulator software, as shown in Table 3. The absorber is designed with 6 theoretical stages, operating at 670 psig. With the refrigeration provided by the expander and the two reflux flows, the temperature profile of the absorber trays is close to isothermal, at about −99° F. at the bottom to −101° F. at the top. At the absorber bottom, most of the C6+ and benzene components are condensed. For example, in the liquid phase equilibrium, the benzene content is concentrated from 51 ppmv (top) to 7,471 ppmv (bottom). There is a slight co-absorption of the C3 and C4 components that are to be rejected in the downstream stripper column.

TABLE 7

| Staged Vapor and Liquid Compositions for Absorber Operating at 670 psig | | | | | | | | | | |
|---|---|---|---|---|---|---|---|---|---|---|
| Stage | | °F. | C1 | C2 | C3 | C4 | C5 | c6 | C7 | Benzene | Toluene |
| 1 | Vapor | −101 | 0.969853 | 0.022432 | 0.002368 | 0.000406 | 0.000033 | 0.000001 | 0.000000 | 0.000000 | 0.000000 |
|   | Liquid |      | 0.836111 | 0.091569 | 0.030444 | 0.016032 | 0.003809 | 0.000291 | 0.000017 | 0.000051 | 0.000005 |
| 2 | Vapor | −100 | 0.969695 | 0.022511 | 0.002401 | 0.000425 | 0.000038 | 0.000001 | 0.000000 | 0.000000 | 0.000000 |
|   | Liquid |      | 0.824062 | 0.094527 | 0.032689 | 0.018304 | 0.004942 | 0.000523 | 0.000067 | 0.000082 | 0.000013 |
| 3 | Vapor | −100 | 0.970430 | 0.022027 | 0.002193 | 0.000361 | 0.000068 | 0.000002 | 0.000000 | 0.000000 | 0.000000 |
|   | Liquid |      | 0.814331 | 0.095743 | 0.031886 | 0.017112 | 0.010044 | 0.000753 | 0.000092 | 0.000129 | 0.000018 |
| 4 | Vapor | −100 | 0.970616 | 0.021920 | 0.002147 | 0.000322 | 0.000089 | 0.000002 | 0.000000 | 0.000001 | 0.000000 |
|   | Liquid |      | 0.808713 | 0.096758 | 0.032175 | 0.015970 | 0.013872 | 0.001089 | 0.000108 | 0.000231 | 0.000023 |
| 5 | Vapor | −99  | 0.970726 | 0.021861 | 0.002123 | 0.000304 | 0.000097 | 0.000006 | 0.000000 | 0.000002 | 0.000000 |
|   | Liquid |      | 0.803154 | 0.097904 | 0.032735 | 0.015734 | 0.015994 | 0.003109 | 0.000239 | 0.000668 | 0.000074 |
| 6 | Vapor | −99  | 0.971123 | 0.021669 | 0.002047 | 0.000264 | 0.000059 | 0.000021 | 0.000003 | 0.000004 | 0.000001 |
|   | Liquid |      | 0.763770 | 0.105622 | 0.037474 | 0.017747 | 0.013758 | 0.015976 | 0.007471 | 0.002513 | 0.001658 |

The stripper is designed with 7 equilibrium stages operating at 400 psig. As seen in Table 7, the temperature profile of the stripper trays is significantly higher than the absorber, at about 420° F. at the bottom to 317° F. at the top. The high temperature is required to strip out the C5 and lighter hydrocarbons to meet the required condensate vapor pressure specification (10 psi Reid Vapor Pressure). The stripper bottom contains almost all the C6+ and benzene components. In the liquid phase equilibrium, the benzene content is concentrated from 62 ppmv (top) to 4.6 mol % (bottom). The C3 component is reduced to from 13.1 mol % (top) to 0.04 mol % (bottom). The C3 and lighter components are recycled and rejected in the absorber as the residue gas.

TABLE 8

| Staged Vapor and Liquid Compositions for Stripper Operating at 400 psig | | | | | | | | | | |
|---|---|---|---|---|---|---|---|---|---|---|
| Stage | | °F. | C1 | C2 | C3 | C4 | C5 | c6 | C7 | Benzene | Toluene |
| 1 | Vapor | 49  | 0.807284 | 0.111640 | 0.039587 | 0.017398 | 0.002576 | 0.000408 | 0.000056 | 0.000062 | 0.000011 |
|   | Liquid |     | 0.141608 | 0.106616 | 0.131254 | 0.198104 | 0.094027 | 0.045634 | 0.018216 | 0.007115 | 0.003993 |
| 2 | Vapor | 317 | 0.029843 | 0.048044 | 0.104834 | 0.274076 | 0.152266 | 0.027316 | 0.004655 | 0.004094 | 0.000911 |
|   | Liquid |     | 0.006434 | 0.018311 | 0.061540 | 0.247230 | 0.205478 | 0.054557 | 0.013524 | 0.008240 | 0.002821 |
| 3 | Vapor | 330 | 0.001709 | 0.008012 | 0.039321 | 0.228166 | 0.246591 | 0.057245 | 0.008275 | 0.008428 | 0.001541 |
|   | Liquid |     | 0.000430 | 0.003200 | 0.022305 | 0.183582 | 0.275094 | 0.087852 | 0.017221 | 0.013020 | 0.003395 |
| 4 | Vapor | 355 | 0.000124 | 0.001421 | 0.013770 | 0.155948 | 0.300464 | 0.103110 | 0.015714 | 0.015068 | 0.002814 |
|   | Liquid |     | 0.000033 | 0.000575 | 0.007651 | 0.118889 | 0.307546 | 0.140811 | 0.028256 | 0.020751 | 0.005349 |
| 5 | Vapor | 370 | 0.000010 | 0.000256 | 0.004589 | 0.095246 | 0.313219 | 0.168447 | 0.034107 | 0.024765 | 0.006261 |
|   | Liquid |     | 0.000003 | 0.000103 | 0.002482 | 0.069118 | 0.298438 | 0.209669 | 0.054770 | 0.031236 | 0.010628 |
| 6 | Vapor | 380 | 0.000001 | 0.000045 | 0.001424 | 0.051716 | 0.281206 | 0.241824 | 0.073736 | 0.036398 | 0.014691 |
|   | Liquid |     | 0.000000 | 0.000018 | 0.000742 | 0.035418 | 0.247512 | 0.272453 | 0.105064 | 0.041882 | 0.022145 |
| 7 | Vapor | 420 | 0.000000 | 0.000018 | 0.000761 | 0.036020 | 0.249469 | 0.271577 | 0.103365 | 0.041691 | 0.021705 |
|   | Liquid |     | 0.000000 | 0.000007 | 0.000389 | 0.023884 | 0.210032 | 0.289238 | 0.137624 | 0.045548 | 0.030575 |

While various embodiments have been shown and described, modifications thereof can be made by one skilled in the art without departing from the spirit and teachings of the disclosure. The embodiments described herein are exemplary only, and are not intended to be limiting. Many variations and modifications of the subject matter disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$ and an upper limit, $R_U$ is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, 90, 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference is not an admission that it is prior art to the present disclosure, especially any reference that may have a publication date after the priority date of this application. The disclosures of all patents, patent applications, and publications cited herein are hereby incorporated by reference, to the extent that they provide exemplary, procedural, or other details supplementary to those set forth herein.

ADDITIONAL DESCRIPTION

The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Alternative embodiments that result from combining, integrating, and/or omitting features of the embodiment(s) are also within the scope of the disclosure. While compositions and methods are described in broader terms of "having", "comprising," "containing," or "including" various components or steps, the compositions and methods can also "consist essentially of" or "consist of" the various components and steps. Use of the term "optionally" with respect to any element of a claim means that the element is required, or alternatively, the element is not required, both alternatives being within the scope of the claim.

Numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents, the definitions that are consistent with this specification should be adopted.

Having described various systems and processes herein, specific embodiments or aspects can include, but are not limited to:

Embodiments disclosed herein include:

A: A method for removing heavy hydrocarbons from a feed gas, the method comprising: feeding, into an absorber, a top reflux stream and a second reflux stream below the top reflux stream, wherein the absorber produces an absorber bottom product stream and an absorber overhead product stream; depressurizing and feeding the absorber bottom product stream to a stripper to produce a stripper bottom product stream and a stripper overhead product stream; cooling and feeding a portion of the absorber overhead product stream back to the absorber as the top reflux stream; and pressurizing and feeding the stripper overhead product stream back to the absorber as the second reflux stream.

B: A system for removing heavy hydrocarbons from a feed gas, the system comprising: an absorber, wherein the absorber is configured to receive a top reflux stream and a second reflux stream within a top portion of the absorber, receive an expanded feed gas stream at a bottom portion of the absorber, and produce an absorber bottom product stream and an absorber overhead product stream; a stripper, wherein the stripper is configured to receive a feed liquid and the absorber bottom product stream and produce a stripper overhead product stream and a stripper bottom product stream, wherein the stripper overhead product stream is configured to pass back to the absorber as the second reflux stream; a pressure reduction valve configured to reduce a pressure of the absorber bottom product stream between the absorber and the stripper; a compressor configured to pressurize the stripper overhead product stream from the stripper to form a compressed stripper overhead product stream; and a heat exchanger, wherein the heat exchanger is configured to cool and at least partially condense the compressed stripper overhead product stream to form the second reflux stream, and cool and at least partially condense a portion of the absorber overhead stream to form the top reflux stream.

C: A system for removing heavy hydrocarbons from a feed gas, the system comprising: an absorber section and a stripper section, wherein the absorber section is configured to operate at a pressure higher than the stripper section, wherein the absorber section comprises: an absorber, wherein the absorber is configured to receive a top reflux stream and a second reflux stream within a top portion of the absorber, receive an expanded feed gas stream at a bottom portion of the absorber, and produce an absorber bottom product stream and an absorber overhead product stream, and wherein the stripper section comprises: a stripper, wherein the stripper is configured to receive a feed liquid and a reduced pressure absorber bottom product stream and produce a stripper overhead product stream and a stripper bottom product stream; a pressure reduction valve configured to reduce a pressure of the absorber bottom product stream to produce the reduced pressure absorber bottom product stream; and a compressor configured to pressurize the stripper overhead product stream from the stripper to form the second reflux stream.

Each of embodiments A, B, and C may have one or more of the following additional elements: Element 1: further comprising: cooling and separating an inlet gas to produce a feed gas and a feed liquid; feeding the feed liquid to the stripper; and expanding and feeding the feed gas to a lower portion of the stripper. Element 2: wherein a combined mass flow rate of the feed liquid and the absorber bottoms stream is less than 10% of a mass flowrate of the inlet gas. Element 3: wherein the inlet gas has less than 2 gallons per thousand cubic feet of gas of C3+ components. Element 4: wherein expanding the feed gas comprises expanding the feed gas in a turboexpander. Element 5: further comprising: cooling and liquefying at least a portion of the portion of the absorber overhead product stream prior to feeding the portion of the absorber overhead product stream back to the absorber. Element 6: further comprising: cooling and liquefying at least a portion of stripper overhead product stream prior to feeding the stripper overhead product stream back to the absorber. Element 7: wherein the absorber is operated at a higher pressure than the stripper. Element 8: wherein the top reflux stream and the second reflux stream comprise primarily methane. Element 9: wherein the heat exchanger is further configured to cool and partially condense an inlet gas to produce a feed gas and the feed liquid, wherein the system further comprises: a separator, wherein the separator is configured to receive and separate the feed gas and the feed liquid into separate streams. Element 10: further comprising an expander, wherein the expander is configured to receive the feed gas from the separator and expand the feed gas to produce the expanded feed gas stream. Element 11: wherein the expander is a turboexpander. Element 12: wherein the stripper has an internal diameter less than 30% of an internal diameter of the absorber. Element 13: further comprising: a heat exchanger, wherein the heat exchanger is configured to cool and at least partially condense the second reflux stream prior to the second reflux stream entering the absorber, and cool and at least partially condense a portion of the absorber overhead stream to form the top reflux stream; and a second pressure reduction valve, wherein the second pressure reduction valve is configured to reduce a pressure of the top reflux stream prior to the top reflux stream entering the absorber. Element 14: wherein the heat exchanger is further configured to cool and partially condense an inlet gas to produce a feed gas and the feed liquid, wherein the system further comprises: a separator, wherein the separator is configured to receive and separate the feed gas and the feed liquid into separate streams; and a third pressure reduction valve, the third pressure reduction valve configured to reduce a pressure of the feed liquid prior to the feed liquid entering the stripper. Element 15: further comprising: an expander, wherein the expander is configured to receive the feed gas from the separator and expand the feed gas to produce the expanded feed gas stream. Element 16: wherein the expander is a turboexpander. Element 17: wherein the stripper has an internal diameter less than 30% of an internal diameter of the absorber. Element 18: further comprising: a propane pre-cooling heat exchanger and a cold box. Element 19, wherein after passing the inlet gas through the propane pre-cooling heat exchanger to cool the inlet gas, the inlet gas is passed through the cold box, wherein the cold box comprises a plurality of passes configured to provide heat exchange between the inlet gas, the absorber overhead product stream, the absorber bottom product stream, the stripper overhead product stream, and the portion of absorber overhead product stream. Element 20: further comprising a first heat exchanger, a second heat exchanger, a third heat exchanger, and a fourth heat exchanger. Element 21: wherein the first heat exchanger is configured to cool the inlet gas using propane cooling integrated from a LNG liquefaction plant, wherein the second heat exchanger is configured to cross-exchange the inlet gas with a part of the absorber overhead product stream, wherein the third heat exchanger is configured to heat a second part of the absorber overhead product stream and cool the portion of the absorber overhead product stream, wherein the fourth heat exchanger is configured to heat a third part of the absorber overhead product stream and cool the stripper overhead product stream.

While preferred embodiments of the invention have been shown and described, modifications thereof can be made by one skilled in the art without departing from the teachings of this disclosure. The embodiments described herein are exemplary only, and are not intended to be limiting. Many variations and modifications of the invention disclosed herein are possible and are within the scope of the invention.

Numerous other modifications, equivalents, and alternatives, will become apparent to those skilled in the art once the above disclosure is fully appreciated. It is intended that the following claims be interpreted to embrace all such modifications, equivalents, and alternatives where applicable. Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the detailed description of the present invention. The disclosures of all patents, patent applications, and publications cited herein are hereby incorporated by reference.

What is claimed is:

1. A method for removing heavy hydrocarbons from a feed gas, the method comprising:
   cooling an inlet gas in a propane pre-cooling heat exchanger;
   separating the cooled inlet gas to produce the feed gas and a feed liquid;
   feeding, into an absorber, the feed gas, a top reflux stream, and a second reflux stream below the top reflux stream, wherein the absorber produces an absorber bottom product stream and an absorber overhead product stream;
   depressurizing and feeding the absorber bottom product stream to a stripper to produce a stripper bottom product stream and a stripper overhead product stream;
   cooling and feeding a portion of the absorber overhead product stream back to the absorber as the top reflux stream; and
   pressurizing and feeding the stripper overhead product stream back to the absorber as the second reflux stream.

2. The method of claim 1, further comprising:
feeding the feed liquid to the stripper; and
expanding the feed gas before feeding the feed gas to the absorber, wherein the feed gas is fed to a lower portion of the absorber.

3. The method of claim 2, wherein expanding the feed gas comprises expanding the feed gas in a turboexpander.

4. The method of claim 1, wherein cooling the inlet gas comprises:
after passing the inlet gas through the propane pre-cooling heat exchanger, passing the inlet gas through a cold box, wherein the cold box comprises a plurality of passes configured to provide heat exchange between the inlet gas, the absorber overhead product stream, the absorber bottom product stream, the stripper overhead product stream, and the portion of the absorber overhead product stream.

5. The method of claim 1, further comprising:
after passing the inlet gas through the propane pre-cooling heat exchanger, passing the inlet gas through a first heat exchanger, wherein the first heat exchanger is configured to cross-exchange the inlet gas with a part of the absorber overhead product stream.

6. The method of claim 1, wherein the propane pre-cooling heat exchanger is part of a propane pre-cooling train of a LNG liquefaction plant, the method further comprising: locating the propane pre-cooling train to a NGL extraction train that contains the absorber and the stripper.

7. The method of claim 1, wherein a combined mass flow rate of the feed liquid and the absorber bottom product stream is less than 10% of a mass flowrate of the inlet gas.

8. The method of claim 1, wherein the inlet gas has less than 2 gallons per thousand cubic feet of gas of C3+ components.

9. The method of claim 1, before cooling and feeding the portion of the absorber overhead product stream back to the absorber, the method further comprising:
heating a first part of the of the absorber overhead product stream and cooling the inlet gas in a first heat exchanger;
heating a second part of the absorber overhead product stream and cooling the portion of the absorber overhead product stream in a second heat exchanger; and
heating a third part of the absorber overhead product stream and cooling the stripper overhead product stream in a third heat exchanger.

10. The method of claim 9, further comprising:
combining the heated first, second, and third parts to form a heat exchanged absorber overhead product, and
compressing the heat exchanged absorber overhead product to form a residue gas stream at a pressure of from about 800 psig to about 900 psig, wherein the portion of the absorber overhead product stream that is fed back to the absorber as the top reflux stream is a portion of the residue gas stream.

11. The method of claim 9, further comprising:
combining the heated first, second, and third parts to form a heat exchanged absorber overhead product,
wherein the heat exchanged absorber overhead product does not need recompression before a second portion of the absorber overhead product stream flows to a LNG liquefaction plant as a product feed.

12. The method of claim 1, before cooling and feeding the portion of the absorber overhead product stream back to the absorber, the method further comprising:
heating the absorber overhead product stream in a cold box to form a heat exchanged absorber overhead product.

13. The method of claim 12, further comprising:
compressing the absorber overhead product stream to form a residue gas stream at a pressure of from about 800 psig to about 900 psig, wherein the portion of the absorber overhead product stream that is fed back to the absorber as the top reflux stream is a portion of the residue gas stream.

14. The method of claim 13, wherein a second portion of the absorber overhead product stream forms a product feed to a LNG liquefaction plant.

15. The method of claim 1, wherein a second portion of the absorber overhead product stream forms a product feed to a LNG liquefaction plant.

16. The method of claim 15, wherein the second portion has a pressure in a range of 800 psig to 900 psig.

17. The method of claim 1, further comprising:
at least partially condensing the portion of the absorber overhead product stream prior to feeding the portion of the absorber overhead product stream back to the absorber.

18. The method of claim 1, further comprising:
cooling and at least partially condensing a portion of the stripper overhead product stream prior to feeding the stripper overhead product stream back to the absorber.

19. The method of claim 1, wherein the absorber is operated at a higher pressure than the stripper.

20. The method of claim 1, wherein the top reflux stream and the second reflux stream comprise primarily methane.

21. A system for removing heavy hydrocarbons from a feed gas, the system comprising:
a propane pre-cooling heat exchanger configured to cool an inlet gas;
an absorber, wherein the absorber is configured to receive a top reflux stream and a second reflux stream within a top portion of the absorber, receive an expanded feed gas stream at a bottom portion of the absorber, and produce an absorber bottom product stream and an absorber overhead product stream;
a stripper, wherein the stripper is configured to receive a feed liquid and the absorber bottom product stream and produce a stripper overhead product stream and a stripper bottom product stream;
a pressure reduction valve configured to reduce a pressure of the absorber bottom product stream between the absorber and the stripper; and
a compressor configured to pressurize the stripper overhead product stream from the stripper to form a compressed stripper overhead product stream, wherein the compressed stripper overhead product stream is configured to pass back to the absorber as the second reflux stream.

22. The system of claim 21, further comprising:
a cold box, wherein the cold box is configured to cool and at least partially condense the compressed stripper overhead product stream to form the second reflux stream, cool and at least partially condense a portion of the absorber overhead product stream to form the top reflux stream, and cool and partially condense the inlet gas to produce the feed gas and the feed liquid.

23. The system of claim 22, further comprising:
a separator, wherein the separator is configured to receive and separate the inlet gas into the feed gas and the feed liquid; and an expander, wherein the expander is configured to receive the feed gas from the separator and expand the feed gas to produce the expanded feed gas stream, wherein the expander is a turboexpander.

24. The system of claim 21, further comprising:
a first heat exchanger configured to further cool the inlet gas using a first part of the absorber overhead product stream;
a second heat exchanger configured to cool and at least partially condense a portion of a residue gas stream using a second part of the absorber overhead product stream, wherein a portion of the residue gas stream forms the top reflux;
a third heat exchanger configured to cool and at least partially condense the compressed stripper overhead product stream to form the second reflux stream using a third part of the absorber overhead product stream.

25. The system of claim 24, further comprising:
a separator, wherein the separator is configured to receive and separate the inlet gas into the feed gas and the feed liquid;
an expander, wherein the expander is configured to receive the feed gas from the separator and expand the feed gas to produce the expanded feed gas stream, wherein the expander is a turboexpander; and
a second compressor configured to compress a heat exchanged absorber overhead product stream to form the residue gas stream,
wherein the first part, second part, and third part of the absorber overhead product stream are configured to combine to form the heat exchanged absorber overhead product stream.

26. The system of claim 25, further comprising:
a LNG liquefaction plant, wherein the propane pre-cooling heat exchanger is relocated from the LNG liquefaction plant to a location upstream of the absorber for cooling the inlet gas.

27. The system of claim 21, wherein the stripper has an internal diameter less than 30% of an internal diameter of the absorber.

28. The system of claim 21, wherein the absorber and the stripper are integrated into a single column.

29. A system for removing heavy hydrocarbons from a feed gas, the system comprising:
a propane pre-cooling heat exchanger configured to cool an inlet gas;
an absorber section and a stripper section, wherein the absorber section is configured to operate at a pressure higher than the stripper section,
wherein the absorber section comprises:
an absorber, wherein the absorber is configured to receive a top reflux stream and a second reflux stream within a top portion of the absorber, receive an expanded feed gas stream at a bottom portion of the absorber, and produce an absorber bottom product stream and an absorber overhead product stream, and
wherein the stripper section comprises:
a stripper, wherein the stripper is configured to receive a feed liquid and a reduced pressure absorber bottom product stream and produce a stripper overhead product stream and a stripper bottom product stream;
a pressure reduction valve configured to reduce a pressure of the absorber bottom product stream to produce the reduced pressure absorber bottom product stream; and
a compressor configured to pressurize the stripper overhead product stream from the stripper to form the second reflux stream.

30. The system of claim 29, further comprising:
a heat exchanger, wherein the heat exchanger is configured to cool and at least partially condense the second reflux stream prior to the second reflux stream entering the absorber, cool and at least partially condense a portion of the absorber overhead product stream to form the top reflux stream, and cool and at least partially condense the inlet gas to produce the feed gas and the feed liquid.

31. The system of claim 30, further comprising:
a second pressure reduction valve, wherein the second pressure reduction valve is configured to reduce a pressure of the top reflux stream prior to the top reflux stream entering the absorber;
a separator, wherein the separator is configured to receive and separate the inlet gas into the feed gas and the feed liquid;
a third pressure reduction valve, the third pressure reduction valve configured to reduce a pressure of the feed liquid prior to the feed liquid entering the stripper;
an expander, wherein the expander is configured to receive the feed gas from the separator and expand the feed gas to produce the expanded feed gas stream, wherein the expander is a turboexpander.

32. The system of claim 29, further comprising:
a first heat exchanger configured to further cool the inlet gas using a first part of the absorber overhead product stream;
a second heat exchanger configured to cool and at least partially condense a portion of a residue gas stream using a second part of the absorber overhead product stream, wherein a portion of the residue gas stream forms the top reflux; and
a third heat exchanger configured to cool and at least partially condense the compressed stripper overhead product stream to form the second reflux stream using a third part of the absorber overhead product stream.

33. The system of claim 32, further comprising:
a separator, wherein the separator is configured to receive and separate the inlet gas into the feed gas and the feed liquid;
an expander, wherein the expander is configured to receive the feed gas from the separator and expand the feed gas to produce the expanded feed gas stream, wherein the expander is a turboexpander; and
a second compressor configured to compress a heat exchanged absorber overhead product stream to form the residue gas stream,
wherein the first part, second part, and third part of the absorber overhead product stream are configured to combine to form the heat exchanged absorber overhead product stream.

34. The system of claim 29, further comprising:
a LNG liquefaction plant, wherein the propane pre-cooling heat exchanger is absent from the LNG liquefaction plant and is located upstream of the absorber for cooling the inlet gas.

35. The system of claim 29, wherein the stripper has an internal diameter less than 30% of an internal diameter of the absorber.

36. The system of claim 29, wherein the absorber and the stripper are integrated into a single column.

* * * * *